(12) United States Patent
Nishikawa et al.

(10) Patent No.: US 12,101,694 B2
(45) Date of Patent: *Sep. 24, 2024

(54) INFORMATION PROVIDING METHOD AND INFORMATION PROVIDING APPARATUS

(71) Applicant: Panasonic Corporation, Osaka (JP)

(72) Inventors: Yuri Nishikawa, Kanagawa (JP); Jun Ozawa, Nara (JP)

(73) Assignee: PANASONIC CORPORATION, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/233,998

(22) Filed: Aug. 15, 2023

(65) Prior Publication Data

US 2023/0388751 A1    Nov. 30, 2023

Related U.S. Application Data

(63) Continuation of application No. 17/073,460, filed on Oct. 19, 2020, now Pat. No. 11,770,683, which is a
(Continued)

(30) Foreign Application Priority Data

Jun. 27, 2018 (JP) .................................. 2018-122085
Mar. 15, 2019 (JP) .................................. 2019-049057

(51) Int. Cl.
*H04W 4/029* (2018.01)
*G01C 21/36* (2006.01)
*G06Q 10/0835* (2023.01)

(52) U.S. Cl.
CPC ........ *H04W 4/029* (2018.02); *G01C 21/3617* (2013.01); *G06Q 10/08355* (2013.01)

(58) Field of Classification Search
CPC ...................................................... H04W 4/029
(Continued)

(56) References Cited

U.S. PATENT DOCUMENTS 4,752,777 A    6/1988 Franaszek
6,324,384 B1    11/2001 Nobuyasu
(Continued)

FOREIGN PATENT DOCUMENTS

WO    2015/182200    12/2015

OTHER PUBLICATIONS

International Search Report of PCT application No. PCT/JP2019/018851 dated Aug. 13, 2019.

*Primary Examiner* — Joseph Arevalo
(74) *Attorney, Agent, or Firm* — Wenderoth, Lind & Ponack, L.L.P.

(57) ABSTRACT

A visiting duration corresponding to a first current location is determined, on the basis of the first current location and a destination, a first traveling duration that is necessary for a user to travel from the first current location to the destination is calculated, on the basis of a first time, the visiting duration corresponding to the first current location, and the first traveling duration, a first expected arrival time is calculated, on the basis of a first scheduled delivery time and the first expected arrival time, a first difference is calculated, a first message in accordance with the first difference is transmitted to a first information terminal of the user, and the first information terminal displays the first message.

3 Claims, 58 Drawing Sheets

PACKAGE DB ___ DB17

| DESTINATION ID | USER ID | PACKAGE ID | SCHEDULED DELIVERY TIME | SENDER |
|---|---|---|---|---|
| D0020 | GUEST0020 | 1234-5678-90 | 13:00 1/1/2018 | GUEST0022 |
| D0030 | GUEST0030 | 0987-6543-21 | 13:10 1/1/2018 | GUEST0032 |
| D0040 | GUEST0040 | 1357-9024-68 | 16:15 1/1/2018 | GUEST0042 |
| ... | | ... | | |

Related U.S. Application Data continuation of application No. PCT/JP2019/018851, filed on May 13, 2019.

(58) Field of Classification Search
USPC ........ 455/456.3, 456.1, 456.2, 3, 1, 39, 522, 455/575.7, 3.01, 414.1, 456.5
See application file for complete search history.

(56) References Cited

U.S. PATENT DOCUMENTS

| | | | |
|---|---|---|---|
| 6,662,105 B1 * | 12/2003 | Tada | G01C 21/34 340/995.13 |
| 6,765,484 B2 | 7/2004 | Eagleson | |
| 7,248,160 B2 | 7/2007 | Mangan | |
| 7,656,813 B2 | 2/2010 | Kloper | |
| 8,145,536 B1 | 3/2012 | Goel | |
| 8,194,646 B2 | 6/2012 | Elliott | |
| 8,634,984 B2 * | 1/2014 | Sumizawa | G08G 1/096888 340/995.13 |
| 9,958,279 B2 * | 5/2018 | Saito | G08G 1/0141 |
| 10,057,736 B2 * | 8/2018 | Gruber | H04W 4/16 |
| 10,241,644 B2 * | 3/2019 | Gruber | G06F 3/04842 |
| 10,255,566 B2 * | 4/2019 | Gruber | H04W 4/02 |
| 2007/0150387 A1 | 6/2007 | Seubert | |
| 2013/0297175 A1 * | 11/2013 | Davidson | G08G 1/202 701/99 |
| 2013/0304349 A1 * | 11/2013 | Davidson | G08G 1/202 701/99 |
| 2015/0248795 A1 * | 9/2015 | Davidson | G01C 21/34 701/1 |
| 2017/0147929 A1 | 5/2017 | Tsunoda et al. | |
| 2018/0345082 A1 * | 12/2018 | Kimura | A63B 71/0686 |
| 2019/0208368 A1 | 7/2019 | Bessho | |
| 2019/0349426 A1 | 11/2019 | Smith | |
| 2019/0383622 A1 | 12/2019 | Aich | |
| 2020/0076758 A1 * | 3/2020 | Trussel | H04W 4/14 |
| 2020/0104770 A1 | 4/2020 | Aich | |
| 2020/0327491 A1 | 10/2020 | Nishikawa | |
| 2020/0387860 A1 | 12/2020 | Mohamed | |

* cited by examiner

FIG. 3

CURRENT LOCATION DB — DB31

| TIME | USER ID | LOCATION INFORMATION | CURRENT LOCATION |
|---|---|---|---|
| 19:00 | GUEST0020 | (35.478898, 139.635775) | PLATFORM OF OIMACHI STATION |
| 19:01 | GUEST0020 | (35.478896, 139.635777) | PLATFORM OF OIMACHI STATION |
| ... | ... | ... | ... |
| 19:20 | GUEST0020 | (35.480165, 139.639302) | XX YOGA STUDIO AT OIMACHI |
| 19:21 | GUEST0020 | (35.480167, 139.639303) | XX YOGA STUDIO AT OIMACHI |
| ... | ... | ... | ... |
| 20:45 | GUEST0020 | (35.606218, 139.734931) | YY STORE AT OIMACHI |
| ... | ... | ... | ... |

TYPE DB — DB32

| CURRENT LOCATION | TYPE |
|---|---|
| PLATFORM OF OIMACHI STATION | STATION |
| XX YOGA STUDIO AT OIMACHI | GYM |
| YY STORE AT OIMACHI | GROCERY STORE |
| ... | ... |

FIG. 4

VISITING DURATION DB — DB41

| TYPE | VISITING DURATION |
|---|---|
| STATION | 5 MINUTES |
| GROCERY STORE | 20 MINUTES |
| GYM | 2 HOURS |
| TAVERN | 4 HOURS |
| ... | ... |

DESTINATION DB — DB42

| USER ID | DESTINATION ADDRESS | MESSAGE ADDRESS |
|---|---|---|
| GUEST0020 | YOKOHAMA-SHI, KANAGAWA-KU, ... | abc@xyz.com |
| GUEST0030 | YOKOHAMA-SHI, NISHI-KU, ... | efg@uvw.com |
| ... | | |

PACKAGE DB — DB43

| USER ID | PACKAGE ID | SCHEDULED DELIVERY TIME | | SENDER |
|---|---|---|---|---|
| GUEST0020 | 1234-5678-90 | 13:00 | 1/1/2018 | GUEST0021 |
| GUEST0030 | 0987-6543-21 | 15:00 | 1/1/2018 | GUEST0031 |
| ... | | | | |

FIG. 5

CUSTOMER MESSAGE DB ~DB51

| MESSAGE ID | MESSAGE |
|---|---|
| G-MESSAGE001 | PACKAGE WILL BE DELIVERED AT AROUND XX:XX. |
| G-MESSAGE002 | PACKAGE WILL BE DELIVERED AT AROUND XX:XX. WILL YOU BE AT HOME? |
| G-MESSAGE003 | PACKAGE WILL BE DELIVERED AT AROUND XX:XX AND WILL BE LEFT IN A DELIVERY BOX IF IT HAS ROOM. |
| ... | ... |

DELIVERY PERSON MESSAGE DB ~DB52

| MESSAGE ID | MESSAGE |
|---|---|
| D-MESSAGE001 | EXPECTED ARRIVAL TIME IS XX:XX. RECEIVER IS LIKELY TO BE AT HOME. |
| D-MESSAGE002 | EXPECTED ARRIVAL TIME IS XX:XX. IT IS BEING CHECKED IF RECEPTION IS POSSIBLE. |
| D-MESSAGE003 | EXPECTED ARRIVAL TIME IS XX:XX. RECEIVER IS UNLIKELY TO BE AT HOME. |
| ... | ... |

FIG. 12

PACKAGE DB

| USER ID | PACKAGE ID | DELIVERY TIMEFRAME | LOADING COMPLETED | SCHEDULED DELIVERY TIME | SENDER |
|---|---|---|---|---|---|
| GUEST0020 | 1234-5678-90 | 13:00-15:00 | COMPLETED | 13:00 1/1/2018 | GUEST0021 |
| GUEST0030 | 0987-6543-21 | 13:00-15:00 | | 13:10 1/1/2018 | GUEST0031 |
| GUEST0040 | 1357-9024-68 | 16:00-18:00 | | 16:15 1/1/2018 | GUEST0041 |
| ... | ... | ... | | | |

PACKAGE DB
DB14

| USER ID | PACKAGE ID | DELIVERY TIMEFRAME | LOADING COMPLETED | SCHEDULED DELIVERY TIME | | VISIT COMPLETED | SENDER |
|---|---|---|---|---|---|---|---|
| GUEST0020 | 1234-5678-90 | 13:00-15:00 | COMPLETED | 13:00 | 1/1/2018 | COMPLETED | GUEST0021 |
| GUEST0030 | 0987-6543-21 | 13:00-15:00 | COMPLETED | 13:10 | 1/1/2018 | | GUEST0031 |
| GUEST0040 | 1357-9024-68 | 16:00-18:00 | | 16:15 | 1/1/2018 | | GUEST0041 |
| ... | ... | ... | | | | | |

FIG. 16

DESTINATION DB

| DESTINATION ID | DESTINATION ADDRESS | USER LIST |
|---|---|---|
| GUEST0020 | YOKOHAMA-SHI, KANAGAWA-KU, ... | GUEST0020, GUEST0021 |
| GUEST0021 | YOKOHAMA-SHI, NISHI-KU, ... | GUEST0030 |
| ... | | |

DB161

USER DB

| USER ID | NAME | MESSAGE ADDRESS |
|---|---|---|
| GUEST0020 | TARO TAKUHAI | taro.takuhai@xyz.com |
| GUEST0021 | HANAKO TAKUHAI | hanako.takuhai@xyz.com |
| ... | ... | |

PACKAGE DB

| DESTINATION ID | USER ID | PACKAGE ID | SCHEDULED DELIVERY TIME | SENDER |
|---|---|---|---|---|
| D0020 | GUEST0020 | 1234-5678-90 | 13:00 1/1/2018 | GUEST0022 |
| D0030 | GUEST0030 | 0987-6543-21 | 13:10 1/1/2018 | GUEST0032 |
| D0040 | GUEST0040 | 1357-9024-68 | 16:15 1/1/2018 | GUEST0042 |
| ... | | ... | | |

VISITING DURATION DB — DB19

| TYPE | VISITING DURATION | ADJUSTMENT POSSIBLE |
|---|---|---|
| STATION | 5 MINUTES | POSSIBLE |
| GROCERY STORE | 20 MINUTES | POSSIBLE |
| GYM | 2 HOURS | NOT POSSIBLE |
| TAVERN | 4 HOURS | NOT POSSIBLE |
| ... | ... | |

FIG. 23

MESSAGE TRANSMISSION HISTORY DB — DB231

| USER ID | TRANSMISSION TIME | MESSAGE ID | READ? |
|---|---|---|---|
| GUEST0020 | 11:00 1/1/2018 | G-MESSAGE001 | READ |
| GUEST0021 | 11:05 1/1/2018 | | |
| ... | ... | | |

THRESHOLD DB — DB232

| YET TO BE READ | READ |
|---|---|
| 20 MINUTES | 10 MINUTES |

FIG. 25

ADDRESS BOOK DB — DB251

| ADDRESS BOOK OWNER USER ID | REGISTERED USER ID |
|---|---|
| GUEST0020 | GUEST0050 |
| GUEST0020 | GUEST0051 |
| ... | ... |

*GUEST0050 KNOWS GUEST0020

THRESHOLD DB — DB252

| SENDER DOES NOT KNOW RECEIVER | SENDER KNOWS RECEIVER |
|---|---|
| 20 MINUTES | 30 MINUTES |

FIG. 27

PACKAGE DB — DB271

| DESTINATION ID | PACKAGE ID | PACKAGE TYPE | SCHEDULED DELIVERY TIME | | SENDER |
|---|---|---|---|---|---|
| D0020 | 1234-5678-90 | GENERAL | 13:00 | 1/1/2018 | GUEST0021 |
| D0030 | 0987-6543-21 | REFRIGERATED | 13:10 | 1/1/2018 | GUEST0031 |
| D0040 | 1357-9024-68 | GOLF | 16:15 | 1/1/2018 | GUEST0041 |
| ... | | | | | |

THRESHOLD DB — DB272

| PACKAGE TYPE | THRESHOLD |
|---|---|
| GENERAL | 20 MINUTES |
| REFRIGERATED | 30 MINUTES |
| GOLF | 50 MINUTES |
| ... | ... |

FIG. 29

PACKAGE DB — DB291

| DESTINATION ID | PACKAGE ID | PACKAGE CLASS | WEIGHT CLASS | SCHEDULED DELIVERY TIME | SENDER |
|---|---|---|---|---|---|
| D0020 | 1234-5678-90 | 60 | 2 kg OR LESS | 13:00 1/1/2018 | GUEST0021 |
| D0030 | 0987-6543-21 | 100 | 10 kg OR LESS | 13:10 1/1/2018 | GUEST0031 |
| D0040 | 1357-9024-68 | 140 | 15 kg OR LESS | 16:15 1/1/2018 | GUEST0041 |
| ... | | | | | |

THRESHOLD DB — DB292

| PACKAGE CLASS | WEIGHT CLASS | FIRST THRESHOLD |
|---|---|---|
| 60 | 2 kg OR LESS | 20 MINUTES |
| 100 | 10 kg OR LESS | 30 MINUTES |
| 140 | 15 kg OR LESS | 40 MINUTES |
| ... | ... | ... |

FIG. 31

PACKAGE DB — DB311

| DESTINATION ID | PACKAGE ID | SCHEDULED DELIVERY TIME | REQUIRED DURATION | SENDER |
|---|---|---|---|---|
| ... | ... | 13:00 1/1/2018 | | |
| D0020 | 1234-5678-90 | 13:10 1/1/2018 | 00:10 | GUEST0021 |
| D0030 | 0987-6543-21 | 13:30 1/1/2018 | 00:20 | GUEST0031 |
| D0040 | 1357-9024-68 | 13:35 1/1/2018 | 00:05 | GUEST0041 |
| ... | | | | |

THRESHOLD DB — DB312

| REQUIRED DURATION | FIRST THRESHOLD |
|---|---|
| 5 MINUTES OR LESS | 20 MINUTES |
| 10 MINUTES OR LESS | 30 MINUTES |
| 30 MINUTES OR LESS | 60 MINUTES |
| ... | |

FIG. 32

PACKAGE DB — DB321

| DESTINATION ID | PACKAGE ID | SCHEDULED DELIVERY TIME | DELIVERY DISTANCE | SENDER |
|---|---|---|---|---|
| ... | ... | | | |
| D0020 | 1234-5678-90 | 13:00 1/1/2018 | 2 km | GUEST0021 |
| D0030 | 0987-6543-21 | 13:10 1/1/2018 | 5 km | GUEST0031 |
| D0040 | 1357-9024-68 | 13:30 1/1/2018 | 15 km | GUEST0041 |
| ... | | 13:35 1/1/2018 | | |

THRESHOLD DB — DB322

| DELIVERY DISTANCE | FIRST THRESHOLD |
|---|---|
| 5 km OR LESS | 20 MINUTES |
| 10 km OR LESS | 30 MINUTES |
| 30 km OR LESS | 60 MINUTES |
| ... | |

FIG. 34

VISITING DURATION DB — DB34

| TYPE | VISITING DURATION (WEEKDAYS) | VISITING DURATION BEFORE 13:00 ON (WEEKENDS AND HOLIDAYS) | VISITING DURATION AFTER 13:00 ON (WEEKENDS AND HOLIDAYS) |
|---|---|---|---|
| GROCERY STORE | 20 MINUTES | 20 MINUTES | 30 MINUTES |
| DEPARTMENT STORE | 30 MINUTES | 60 MINUTES | 90 MINUTES |
| GYM | 70 MINUTES | 120 MINUTES | 120 MINUTES |
| ... | | | |

FIG. 36

VISITING DURATION DB　　　　　　　　　　　　　DB36

| USER ID | TYPE | VISITING DURATION |
|---|---|---|
| GUEST0020 | GROCERY STORE | 20 MINUTES |
| GUEST0020 | DEPARTMENT STORE | 30 MINUTES |
| GUEST0021 | GROCERY STORE | 10 MINUTES |
| GUEST0022 | DEPARTMENT STORE | 40 MINUTES |
| ... | ... | ... |

FIG. 37

VISITING DURATION DB

| USER ID | TYPE | VISITING DURATION (WEEKDAYS) | VISITING DURATION BEFORE 13:00 ON (WEEKENDS AND HOLIDAYS) | VISITING DURATION AFTER 13:00 ON (WEEKENDS AND HOLIDAYS) |
|---|---|---|---|---|
| GUEST0020 | GROCERY STORE | 20 MINUTES | 30 MINUTES | 50 MINUTES |
| GUEST0020 | DEPARTMENT STORE | 30 MINUTES | 40 MINUTES | 80 MINUTES |
| GUEST0021 | GROCERY STORE | 10 MINUTES | 20 MINUTES | 40 MINUTES |
| GUEST0022 | DEPARTMENT STORE | 40 MINUTES | 50 MINUTES | 90 MINUTES |
| ... | ... | | | |

CURRENT LOCATION DB ⟶ DB39

| TIME | USER ID | LOCATION INFORMATION | CURRENT LOCATION | ELAPSED TIME |
|---|---|---|---|---|
| 19:00 | GUEST0020 | (35.478898, 139.635775) | PLATFORM OF OIMACHI STATION | 00:00 |
| 19:01 | GUEST0020 | (35.478896, 139.635777) | PLATFORM OF OIMACHI STATION | 00:01 |
| ... | ... | ... | ... | ... |
| 19:20 | GUEST0020 | (35.480165, 139.639302) | XX YOGA STUDIO AT OIMACHI | 00:00 |
| 19:21 | GUEST0020 | (35.480167, 139.639303) | XX YOGA STUDIO AT OIMACHI | 00:01 |
| ... | ... | ... | ... | ... |
| 20:45 | GUEST0020 | (35.606218, 139.734931) | YY STORE AT OIMACHI | 00:00 |
| ... | ... | ... | ... | ... |

FIG. 44

STATION INFORMATION DB ─ DB45

| RAILWAY COMPANY | LINE NAME | STATION NAME | LOCATION | FIRST DEPARTURE TIME | SECOND DEPARTURE TIME | ... |
|---|---|---|---|---|---|---|
| J ELECTRIC RAILWAY | KT LINE | AA STATION | (36.497698, 139.697535) | 5:03 | 5:15 | ... |
| J ELECTRIC RAILWAY | KT LINE | BB STATION | (36.497698, 139.697535) | 5:28 | 5:40 | ... |
| ... | ... | ... | | ... | ... | ... |
| K ELECTRIC RAILWAY | MAIN LINE | AA STATION | (36.497699, 139.697536) | 5:50 | 6:17 | ... |
| K ELECTRIC RAILWAY | MAIN LINE | CC STATION | (36.497706, 139.697570) | 6:14 | 6:41 | ... |
| ... | ... | ... | | ... | ... | ... |

FIG. 46

TYPE DB

| USER ID | CURRENT LOCATION | TYPE | VISITING DURATION ||
|---|---|---|---|---|
| | | | SHORT | LONG |
| GUEST0020 | XX ENGLISH CONVERSATION SCHOOL IN FRONT OF YY STATION | ENGLISH CONVERSATION SCHOOL | 8 MINUTES | 60 MINUTES |
| GUEST0020 | HOSPITAL IN FRONT OF YY STATION | HOSPITAL | 10 MINUTES | 125 MINUTES |
| GUEST0020 | YY STORE AT OIMACHI | GROCERY STORE | 12 MINUTES | 35 MINUTES |
| ... | ... | ... | ... | ... |

TYPE DB

| USER ID | CURRENT LOCATION | TYPE | VISITING DURATION DB480 | | |
|---|---|---|---|---|---|
| | | | SHORT | AVERAGE | LONG |
| GUEST0020 | XX ENGLISH CONVERSATION SCHOOL IN FRONT OF YY STATION | ENGLISH CONVERSATION SCHOOL | 8 MINUTES | 45 MINUTES | 60 MINUTES |
| GUEST0020 | HOSPITAL IN FRONT OF YY STATION | HOSPITAL | 10 MINUTES | 15 MINUTES | 125 MINUTES |
| GUEST0020 | YY STORE AT OIMACHI | GROCERY STORE | 12 MINUTES | 22 MINUTES | 35 MINUTES |
| ... | ... | ... | ... | ... | ... |

FIG. 50

TYPE DB

| USER ID | CURRENT LOCATION | TYPE | POSSIBILITY THAT USER IS ABLE TO LEAVE IMMEDIATELY IN ACCORDANCE WITH ELAPSED TIME | | | | |
|---|---|---|---|---|---|---|---|
| | | | LESS THAN OR EQUAL TO 10 MINUTES | LESS THAN OR EQUAL TO 20 MINUTES | LESS THAN OR EQUAL TO 30 MINUTES | LESS THAN OR EQUAL TO 40 MINUTES | LESS THAN OR EQUAL TO 50 MINUTES |
| GUEST0020 | XX ENGLISH CONVERSATION SCHOOL IN FRONT OF YY STATION | ENGLISH CONVERSATION SCHOOL | 60% | 12% | 3% | 2% | 45% | ... |
| GUEST0020 | HOSPITAL IN FRONT OF YY STATION | HOSPITAL | 50% | 40% | 10% | 5% | 25% | ... |
| ... | ... | ... | ... | ... | ... | ... | ... |

VISITING HISTORY DB
DB520

| USER ID | CURRENT LOCATION | ARRIVAL TIME AND DATE | TYPE | VISITING DURATION |
|---|---|---|---|---|
| GUEST0020 | ENGLISH CONVERSATION SCHOOL A | 17:58 11/5/2017 | ENGLISH CONVERSATION SCHOOL | 65 MINUTES |
| GUEST0020 | ENGLISH CONVERSATION SCHOOL A | 17:56 11/12/2017 | ENGLISH CONVERSATION SCHOOL | 58 MINUTES |
| GUEST0020 | HOSPITAL B | 18:22 11/15/2017 | HOSPITAL | 8 MINUTES |
| ... | ... | ... | ... | ... |

FIG. 55

| TRAVELING ROUTE DB | DB550 |
|---|---|
| USER ID | TRAVELING ROUTE |
| GUEST0020 | WORKPLACE→ALONG ROAD 1 (ON FOOT)→B STATION→XX LINE (TRAIN)→C STATION→BAYSIDE STREET (BUS)→HOME |
| GUEST0020 | WORKPLACE→ALONG PREFECTURAL ROAD 40 (ON FOOT)→SHOP A→B STATION→XX LINE (TRAIN)→C STATION→BAYSIDE STREET (BUS)→HOME |
| GUEST0020 | WORKPLACE→ALONG ROAD 1 (ON FOOT)→B STATION→XX LINE (TRAIN)→C STATION→ROAD 246→D HOSPITAL→E PHARMACY→BAYSIDE STREET (BUS)→HOME |
| ... | ... |

FIG. 56

TRAVELING HISTORY DB

| USER ID | TIME AND DATE | CURRENT LOCATION |
|---|---|---|
| GUEST0020 | 17:50 11/10/2017 | WORKPLACE |
| GUEST0020 | 18:00 11/10/2017 | WORKPLACE |
| GUEST0020 | 18:10 11/10/2017 | ON PREFECTURAL ROAD 40 |
| ... | ... | ... |

DB560

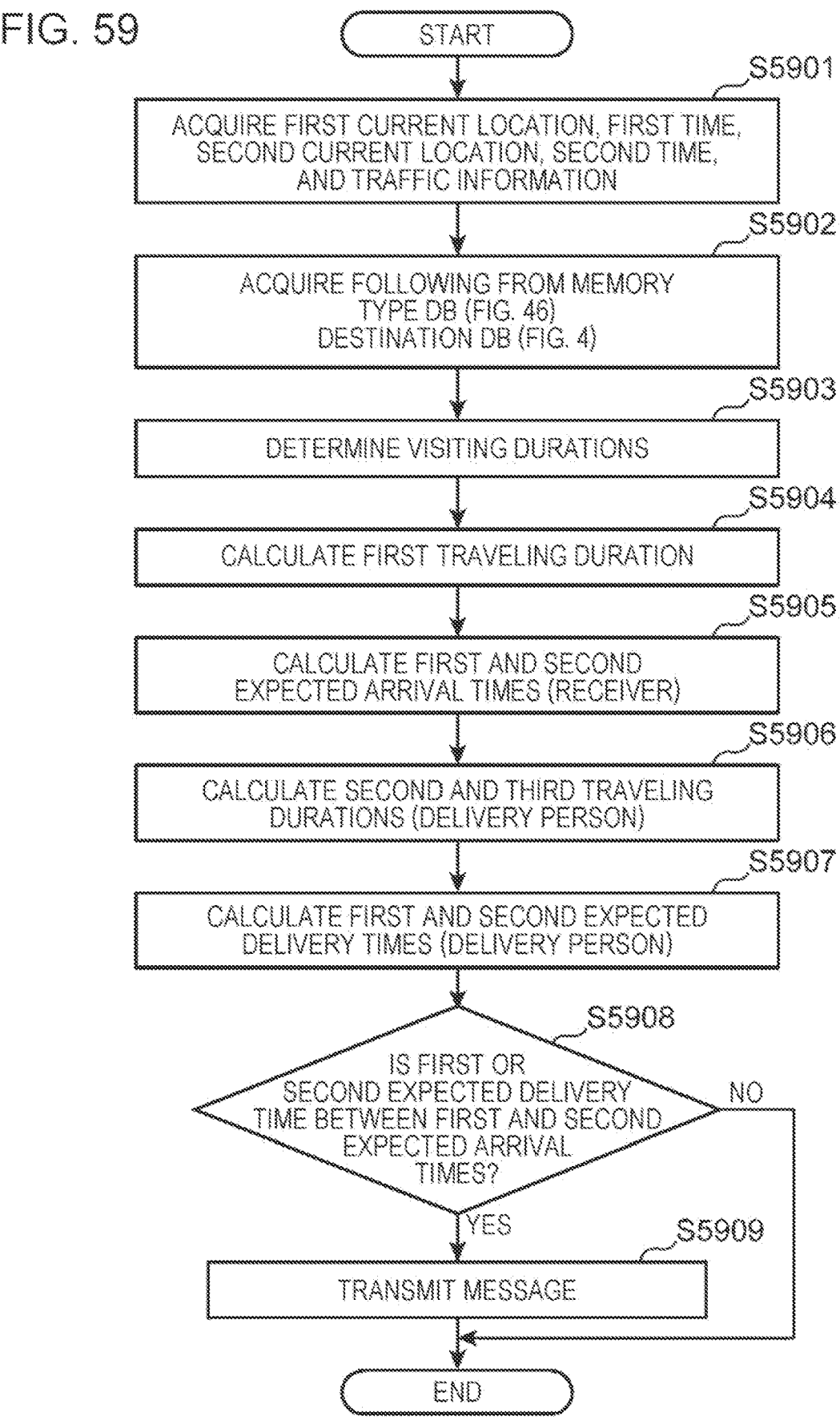

INFORMATION PROVIDING METHOD AND INFORMATION PROVIDING APPARATUS

BACKGROUND

1. Technical Field

The present disclosure relates to a technique that provides information regarding delivery of a package to a user.

2. Description of the Related Art

International Publication No. 2015/182200 discloses a technique that accumulates an activity log of a user from sensing data of various sensor devices, predicts the activity of the user on the basis of a current location and the activity log of the user, and determines a delivery place and a delivery time of a product to be delivered on a route of the predicted activity of the user so that a delivery car may deliver the product to the delivery place at the delivery time.

SUMMARY

However, an object of International Publication No. 2015/182200 is to deliver a product to a delivery place at a delivery time, the delivery place and delivery time being convenient for a user, and an object thereof is not to encourage a user to return to the delivery place. The present disclosure takes a different stance.

One non-limiting and exemplary embodiment provides a technique for calculating an expected arrival time at which a user returns from a current location to a destination with high accuracy so as to prevent redelivery effectively.

In one general aspect, the techniques disclosed here feature an information providing method performed by a computer in an information providing system that provides information to a user, the method including: acquiring, via a network, a first current location of the user and a first time at which the first current location is detected; reading, from a memory, a destination of a package addressed to the user, type information indicating a type of the first current location, a visiting duration associated with the type information, and a first scheduled delivery time; determining, on the basis of the type information and the visiting duration, the visiting duration corresponding to the first current location; calculating, on the basis of the first current location and the destination, a first traveling duration that is necessary for the user to travel from the first current location to the destination; calculating, on the basis of the first time, the visiting duration corresponding to the first current location, and the first traveling duration, a first expected arrival time; calculating, on the basis of the first scheduled delivery time and the first expected arrival time, a first difference; transmitting a first message in accordance with the first difference to a first information terminal of the user; and causing the first information terminal to display the first message.

It should be noted that general or specific embodiments may be implemented as an apparatus, a system, an integrated circuit, a computer program, a computer-readable storage medium, or any selective combination thereof. The computer-readable storage medium includes, for example, a non-volatile storage medium, such as a compact disc-read only memory (CD-ROM).

According to the present disclosure, it is possible to calculate an expected arrival time at which a user returns from a current location to a destination with high accuracy so as to prevent redelivery effectively. Additional benefits and effects of the embodiments of the present disclosure will become apparent from the specification and drawings. The benefits and/or effects may be individually obtained by some of the embodiments and features of the specification and drawings, which need not all be provided in order to obtain one or more of the same features.

BRIEF DESCRIPTION OF THE DRAWINGS

FIG. 3 illustrates examples of data structures of a current location database and a type database stored in a memory of a server;

FIG. 4 illustrates examples of data structures of a visiting duration database, a destination database, and a package database stored in the memory of the server;

FIG. 5 illustrates examples of data structures of a customer message database and a delivery person message database stored in the memory of the server;

FIG. 12 illustrates an example of a data structure of a package database in a second embodiment;

FIG. 14 illustrates an example of a data structure of a package database in a third embodiment;

FIG. 16 illustrates an example of a data structure of a destination database and a user database according to a fourth embodiment;

FIG. 17 illustrates an example of a data structure of a package database according to the fourth embodiment;

FIG. 19 illustrates an example of a data structure of a visiting duration database according to a fifth embodiment;

FIG. 23 illustrates examples of data structures of a message transmission history database and a threshold database according to a sixth embodiment;

FIG. 25 illustrates examples of data structures of an address book database and a threshold database according to the seventh embodiment;

FIG. 27 illustrates examples of data structures of a package database and a threshold database in an information providing system according to an eighth embodiment;

FIG. 29 illustrates examples of data structures of a package database and a threshold database according to a ninth embodiment;

FIG. 31 illustrates examples of data structures of a package database and a threshold database according to a tenth embodiment;

FIG. 32 illustrates examples of data structures of a package database and a threshold database according to a modification of the tenth embodiment;

FIG. 34 illustrates an example of a data structure of a visiting duration database according to an eleventh embodiment;

FIG. 36 illustrates an example of a data structure of a visiting duration database according to a twelfth embodiment;

FIG. 37 illustrates an example of a data structure of a visiting duration database according to a thirteenth embodiment;

FIG. 38 illustrates an example of a data structure of a current location database that accumulates a current location of a user;

FIG. 44 illustrates an example of a data structure of a station information database according to the sixteenth embodiment;

FIG. 46 illustrates an example of a data structure of a type database according to a seventeenth embodiment;

FIG. 48 illustrates an example of a data structure of a type database according to an eighteenth embodiment;

FIG. 50 illustrates an example of a data structure of a type database according to a nineteenth embodiment;

FIG. 52 illustrates an example of a data structure of a visiting history database according to a twenty-first embodiment;

FIG. 55 illustrates an example of a data structure of a traveling route database according to a twenty-second embodiment;

FIG. 56 illustrates an example of a data structure of a traveling history database that stores a traveling history of a certain user;

FIG. 59 is a flowchart illustrating an example of a process in an information providing system according to a twenty-third embodiment.

DETAILED DESCRIPTION

Figure 1:
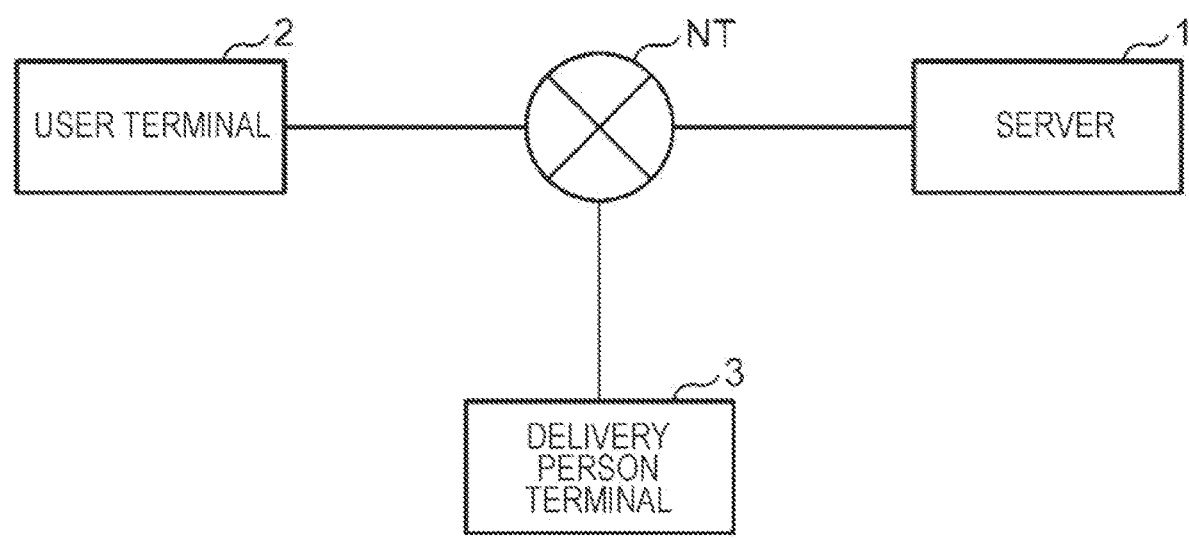
FIG. 1 illustrates an example of a network configuration of an information providing system according to a first embodiment of the present disclosure.

Underlying Knowledge Forming Basis of the Present Disclosure

In recent years, in the logistics industry, unfortunately, an increasing number of packages have failed to be delivered due to the absence of a user. Thus, Ministry of Land, Infrastructure, Transport and Tourism of Japan held an inquiry for users regarding redelivery in 2015. The inquiry shows that almost 40% users are not at home although they know that a package will be delivered.

Such users may think in the following manners: (1) it is troublesome to contact a package delivery company to tell that they are not able to receive a package; (2) it is difficult to predict whether they are actually at home until immediately before a scheduled delivery time; and (3) they do not feel guilty very much for being absent because they may pretend ignorance even if they are asked the reason why they are not able to receive a package, and they may ask for redelivery without cost.

According to a report of an investigative commission for reducing redelivery (September 2015), a certain number of people think that they may be at home at a scheduled delivery time and receive a package if they receive an advance notice.

Thus, if a message regarding delivery is sent beforehand to appropriately put pressure on a user, redelivery may be prevented. In this case, if the user not only receives a message, but also makes a reply indicating whether they are able to receive a package, they may be psychologically affected so as to be responsible for their words, and prevention of redelivery may be expected.

However, if all users are evenly notified of such a message requesting a reply, some users may feel it uncomfortable, which is not preferable. For example, a user may be expected to return to a destination from a current location way late, that is, an expected arrival time may be largely behind a scheduled delivery time. In this case, if such a user receives a message requesting a reply, they may feel uncomfortable, and the effect of preventing redelivery has not been expected. In addition, in a case where a user will return to a destination with a sufficient time before a scheduled delivery time, the user receiving such a message may also feel uncomfortable.

Thus, the present inventors have arrived at an idea of selecting a borderline customer, a customer who will return to a destination at around a scheduled delivery time, that is, at the very delivery time or immediately before or after the delivery time, and sending, to the borderline customer, a message requesting a reply indicating whether they are able to receive a package so as to prevent redelivery effectively.

To realize this idea, however, a technical issue arises in order to calculate the expected arrival time at which a customer will return from a current location to a destination with high accuracy.

International Publication No. 2015/182200 is a technique for delivering a package in accordance with the activity of a user, not a technique for selecting a borderline customer, and thus is not capable of addressing the issue of calculating the expected arrival time at the destination with high accuracy.

One non-limiting and exemplary embodiment provides a technique for calculating an expected arrival time at which a user returns from a current location to a destination with high accuracy so as to prevent redelivery effectively.

An information providing method according to an aspect of the present disclosure is an information providing method performed by a computer in an information providing system that provides information to a user, the method including:

acquiring, via a network, a first current location of the user and a first time at which the first current location is detected;

reading, from a memory, a destination of a package addressed to the user, type information indicating a type of the first current location, a visiting duration associated with the type information, and a first scheduled delivery time;

determining, on the basis of the type information and the visiting duration, the visiting duration corresponding to the first current location;

calculating, on the basis of the first current location and the destination, a first traveling duration that is necessary for the user to travel from the first current location to the destination;

calculating, on the basis of the first time, the visiting duration corresponding to the first current location, and the first traveling duration, a first expected arrival time;

calculating, on the basis of the first scheduled delivery time and the first expected arrival time, a first difference;

transmitting a first message in accordance with the first difference to a first information terminal of the user; and causing the first information terminal to display the first message.

According to this configuration, the visiting duration of the user is determined on the basis of the type (e.g., a grocery store or a workplace) of the first current location of the user, and the first expected arrival time at the destination is calculated by taking the visiting duration into account. Thus, the first expected arrival time may be calculated with high accuracy.

In addition, the first message is selected on the basis of the first difference between the first expected arrival time and the first scheduled delivery time read from the memory and is transmitted to the first information terminal of the user. Thus, the user is notified of an appropriate message in accordance with the first difference, and redelivery may be prevented effectively.

In the above aspect, the method may further include:

determining whether the first difference is less than or equal to a first threshold, in which, if the first difference is less than or equal to the first threshold, the first message regarding reception of the package is transmitted to the first information terminal, and the first message is displayed on the first information terminal.

According to this configuration, the user for whom the first difference is less than or equal to the first threshold, that is, a borderline customer for whom the difference between the first scheduled delivery time and the first expected arrival time is small, is extracted, and the message regarding reception of the package is transmitted to the borderline customer. Thus, it is possible to put pressure on the user more effectively to be at home than in a case where all users are evenly notified of the same message.

In the above aspect, the method may further include:

reading, from the memory, a customer list in which the destination and a person living with the user in the destination are stored in association with each other;

acquiring, via the network, a second current location of the person living with the user and a second time at which the second current location is detected;

determining, on the basis of the type information and the visiting duration, the visiting duration corresponding to the second current location;

calculating, on the basis of the second current location and the destination, a second traveling duration that is necessary for the person living with the user to travel from the second current location to the destination;

calculating, on the basis of the second time, the visiting duration corresponding to the second current location, and the second traveling duration, a second expected arrival time;

calculating, on the basis of the first scheduled delivery time and the second expected arrival time, a second difference;

determining whether the second difference is less than or equal to the first threshold;

transmitting, if the second difference is less than or equal to the first threshold, the first message regarding reception of the package to a second information terminal of the person living with the user; and causing the second information terminal to display the first message.

According to this configuration, for the person living with the user who is the receiver of the package, similarly for the receiver, the second expected arrival time at the destination is calculated by taking into account the visiting duration at the second current location. Thus, the expected arrival time of the person living with the user may also be calculated with high accuracy. In addition, the second difference between the second expected arrival time and the first scheduled delivery time is calculated, and, if the second difference is less than or equal to the first threshold, the first message regarding reception of the package is transmitted. Thus, even if the receiver is under a condition of being incapable of receiving the package, as long as the person living with the receiver corresponds to a borderline customer, it is possible to appropriately put pressure on the person living with the receiver to encourage them to be at home, thereby increasing the effect of preventing redelivery.

In the above aspect, the method may further include:

determining, on the basis of information that indicates whether the visiting duration is adjustable and that is associated with the visiting duration, whether the visiting duration corresponding to the first current location is adjustable;

determining, if the visiting duration corresponding to the first current location is adjustable, whether the first expected arrival time is after the first scheduled delivery time;

calculating, if the first expected arrival time is after the first scheduled delivery time, the first expected arrival time by assuming that the visiting duration corresponding to the first current location is 0;

determining whether the first difference calculated on the basis of the first expected arrival time calculated by assuming that the visiting duration is 0 and the first scheduled delivery time is less than or equal to 0;

transmitting, if the first difference is less than or equal to 0, to the first information terminal, a second message for inquiring of the user whether the user is able to leave the first current location immediately; and calculating, if information indicating that the user is able to leave the first current location immediately is acquired from the first information terminal via the network, the first expected arrival time by setting the visiting duration to 0.

According to this configuration, even if it is determined that, with the first expected arrival time calculated by using the initial visiting duration, the user is unable to return to the destination before the first scheduled delivery time, for the user for whom the first difference becomes less than or equal to 0 in a case where the visiting duration is assumed to be 0, the second message for inquiring of the user whether they are able to leave the first current location immediately is transmitted. If the user makes a reply indicating that they are able to leave immediately, the first expected arrival time calculated by setting the visiting duration to 0 is the expected arrival time of the user. In the above manner, according to this configuration, the user who is able to adjust the visiting duration to make the first difference less than or equal to 0, that is, the user who is able to return to the destination before the first scheduled delivery time, is encouraged to adjust the visiting duration. Thus, redelivery is unlikely to occur.

In the above aspect, the method may further include:

determining, on the basis of information that indicates whether the visiting duration is adjustable and that is associated with the visiting duration, whether the visiting duration corresponding to the first current location is adjustable;

determining, if the visiting duration corresponding to the first current location is adjustable, whether the first expected arrival time is after the first scheduled delivery time;

calculating, if the first expected arrival time is after the first scheduled delivery time, a leaving time at which the user needs to leave the first current location in order to make the first difference less than or equal to 0 on the basis of the first traveling duration and the first scheduled delivery time;

transmitting, to the first information terminal, a second message for inquiring of the user whether the user is able to leave the first current location before the leaving time; and calculating, if leaving-possible information indicating that the user is able to leave the first current location before the leaving time is acquired from the first information terminal via the network, the first expected arrival time by setting the visiting duration to a second difference between the leaving time and a second time at which the leaving-possible information is acquired.

According to this configuration, even if it is determined that, with the first expected arrival time calculated by using the initial visiting duration, the user is unable to return to the destination before the first scheduled delivery time, the leaving time at which the user needs to leave the first current location in order to make the first difference less than or equal to 0 is calculated, and the second message for inquiring of the user whether they are able to leave the first current location before the leaving time is transmitted. If the user makes a reply indicating that they are able to leave before the leaving time, the first expected arrival time is calculated by setting the visiting duration to the second difference between the leaving time and the second time at which the reply is made. In the above manner, according to this configuration, the user who is able to adjust the visiting duration to make the first difference less than or equal to 0, that is, the user who is able to return to the destination before the first scheduled delivery time, is encouraged to adjust the visiting duration. Thus, redelivery is unlikely to occur.

In the above aspect, the method may further include:

determining, on the basis of information that indicates whether the visiting duration is adjustable and that is associated with the visiting duration, whether the visiting duration corresponding to the first current location is adjustable;

determining, if the visiting duration corresponding to the first current location is adjustable, whether the first expected arrival time is after the first scheduled delivery time;

calculating, if the first expected arrival time is after the first scheduled delivery time, a leaving time at which the user needs to leave the first current location in order to make the first difference less than or equal to 0 on the basis of the first traveling duration and the first scheduled delivery time;

calculating a second difference between the first time and the leaving time; and calculating, on the basis of the second difference, a remaining duration the user is able to spend at the first current location and transmitting the remaining duration to the first information terminal.

According to this configuration, even if it is determined that, with the first expected arrival time calculated by using the initial visiting duration, the user is unable to return to the destination before the first scheduled delivery time, a leaving time at which the user needs to leave the first current location in order to make the first difference less than or equal to 0 is calculated, the remaining duration the user is able to spend at the first current location is calculated on the basis of the second difference between the leaving time and the first time, and the user is notified of the remaining duration. In the above manner, according to this configuration, the user who is able to adjust the visiting duration to make the first difference less than or equal to 0, that is, the user who is able to return to the destination before the first scheduled delivery time, is encouraged to adjust the visiting duration. Thus, redelivery is unlikely to occur.

In the above aspect, the method may further include:
if information indicating that the user has read a second message indicating the first scheduled delivery time before the first scheduled delivery time is received via the network, setting the first threshold to a small value.

According to this configuration, the second message indicating the first scheduled delivery time is transmitted in advance, the user who has read the second message knows of the first scheduled delivery time and is considered to be likely to receive the package, and the first threshold is set to a small value. Thus, the user is unlikely to be regarded as a borderline customer, and the user is unlikely to be notified of the first message regarding reception. This prevents the user from reading the first message.

In the above aspect, the method may further include:
reading, from the memory, information indicating a sender of the package and a previous customer list;
determining whether the sender is included in the previous customer list; and
if the sender is included in the previous customer list, setting the first threshold to a large value.

According to this configuration, in a case where the sender of the package is included in the customer list for the user, the sender is considered to know the user, the first threshold is set to a large value. Thus, the user who is to receive the package from the person who knows the user is likely to be regarded as a borderline customer, and the first message regarding reception of the package is likely to be transmitted. Accordingly, the user may be encouraged to receive the important package from the person who knows the user, and the important package is unlikely to be handled as a package for redelivery.

In the above aspect, the method may further include:
reading, from the memory, type information of the package; and changing the first threshold in accordance with the type information.

According to this configuration, the first threshold is changed depending on the package type. Thus, the first threshold may be set to an appropriate value in accordance with the package type. Accordingly, for example, if the package has a large degree of importance for reception, such as perishable foods, the user who is the receiver is likely to be regarded as a borderline customer, and the first message regarding reception of the package is likely to be transmitted. Thus, the user may be encouraged to receive the package with a large degree of importance for reception, and redelivery is unlikely to occur.

In the above aspect, the method may further include:
reading, from the memory, a second threshold regarding size or a third threshold regarding weight;
determining whether size of the package exceeds the second threshold or whether weight of the package exceeds the third threshold; and if the size of the package exceeds the second threshold or the weight of the package exceeds the third threshold, setting the first threshold to a large value.

According to this configuration, the first threshold is set to a large value for the package the size of which exceeds the second threshold or the package the weight of which exceeds the third threshold. Thus, the user who is the receiver of such a package with a high redelivery cost is likely to be regarded as a borderline customer, and this user may be encouraged to receive the package. As a result, the package with a high redelivery cost is unlikely to be redelivered.

In the above aspect, the method may further include:
reading, from the memory, a fourth threshold regarding a distance or a fifth threshold regarding a duration;
determining whether a delivery distance of the package exceeds the fourth threshold or whether a required delivery duration of the package exceeds the fifth threshold; and
if the delivery distance exceeds the fourth threshold or the required duration exceeds the fifth threshold, setting the first threshold to a large value.

According to this configuration, the first threshold is set to a large value for the package the delivery distance of which exceeds the fourth threshold or the required delivery duration of which exceeds the fifth threshold. Thus, the user who is the receiver of such a package with a high redelivery cost is likely to be regarded as a borderline customer, and this user may be encouraged to receive the package. As a result, the package with a high redelivery cost is unlikely to be redelivered.

In the above aspect, the visiting duration may be determined according to at least either one or more time slots or one or more days, and
the first traveling duration may be calculated by using the visiting duration corresponding to the first time.

In general, even at the same location, the visiting duration may vary according to one of the time slot and day. According to this configuration, since the visiting duration determined according to time slot and day is used, the first expected arrival time may be calculated with higher accuracy. As a result, the package is more unlikely to be redelivered.

In the above aspect, the visiting duration may be determined according to one or more first users, and
the first traveling duration is calculated by using the visiting duration corresponding to the one or more first users.

In general, even at the same location, the visiting duration may vary according to user. According to this configuration, since the visiting duration determined according to the first user is used, the first expected arrival time may be calculated with higher accuracy. As a result, the package is more unlikely to be redelivered.

In the above aspect, the visiting duration may be determined, on the basis of a previous traveling history of the user, in accordance with a visiting location, a time slot during which the user visits the visiting location, and a day on which the user visits the visiting location,
the first time may include information indicating the day, and
the first traveling duration may be calculated by using the visiting duration corresponding to the first time.

According to this configuration, since the visiting duration determined by taking into account the traveling history of the user, not a visiting duration that is common to all users, is used, the first expected arrival time may be calculated with higher accuracy. As a result, the package is more unlikely to be redelivered.

In the above aspect, the method may further include:
reading, from the memory, time-series information indicating a place where the user is present;
on the basis of the visiting duration and the time-series information, calculating a remaining duration during which the user spends time at the first current location; and
calculating the first expected arrival time by using the remaining duration as the visiting duration.

According to this configuration, the visiting duration of the user at the first current location before the first time is acquired on the basis of the time-series information, the remaining visiting duration (that is, the remaining duration) at the first current location is calculated, and the first expected arrival time is calculated by using the remaining duration. Thus, the first expected arrival time may be calculated with higher accuracy. As a result, redelivery is unlikely to occur.

In the above aspect, the method may further include:
acquiring information indicating a nearest station of the first current location;
on the basis of the information indicating the nearest station, acquiring route information of public transportation from the nearest station to the destination, the route information being information in which a third expected arrival time at the destination is before the first scheduled delivery time; and
transmitting the first message including the route information.

According to this configuration, the user is notified of the route information, which is the route information of public transportation from the nearest station to the destination, in which the third expected arrival time at the destination is before the first scheduled delivery time. Thus, this configuration may present, to the user, a material for determining the remaining duration they are able to spend at the first current location, and redelivery may be prevented more reliably.

In the above aspect, the method may further include:
reading, from the memory, station information indicating locations of stations and departure times of public transportation from each of the stations;
determining, on the basis of the first current location and the station information, a first nearest station of the first current location;
calculating a second traveling duration that is necessary for the user to travel from the first current location to the first nearest station;
calculating, on the basis of the first time and the second traveling duration, a second time that is an arrival time at the first nearest station;
determining, on the basis of the destination and the station information, a second nearest station of the destination;
calculating a third traveling duration from the second nearest station to the destination;
calculating, on the basis of the third traveling duration and the first scheduled delivery time, a third time at which the user needs to arrive at the second nearest station at the latest;
determining, on the basis of the station information, route information of the public transportation by which, after departing from the first nearest station at or after the second time, the user is able to arrive at the second nearest station before the third time, the route information including at least a departure time from the first nearest station; and
transmitting a second message indicating the route information to the first information terminal before the second time.

According to this configuration, the user is notified of the route information, which is the route information of public transportation by which, after departing from the first nearest station of the first current location at or after the second time, the second time being the arrival time at the first nearest station, the user is able to arrive at the second nearest station of the destination before the third time, the third time being the time at which the user needs to arrive at the second nearest station at the latest, the route information including at least a departure time from the first nearest station. Thus, this configuration may present, to the user, a material for determining the arrival time at the first nearest station, and redelivery may be prevented more reliably.

In the above aspect, the route information may further include an arrival time at the second nearest station.

According to this configuration, the user may also be notified of the arrival time at the second nearest station.

In the above aspect, if the route information includes a transfer station of the public transportation, the route information may further include at least one of an arrival time at the transfer station and a departure time from the transfer station.

According to this configuration, if the transfer station is included in a route from the first nearest station to the second nearest station, the user may be notified of at least one of the arrival time at the transfer station and the departure time from the transfer station.

In the above aspect, the package may include first packages, and
the user may include first users corresponding to the first packages, and the method may further include:
detecting first timing at which all of the first packages are loaded into a delivery car;
acquiring, at the first timing, the first current location and the first time of each of the first users; and
calculating, at the first timing, the first expected arrival time for each of the first packages.

According to this configuration, at the first timing at which all of the packages to be delivered are loaded into the delivery car, the first current location and the first time of each of the first users are acquired, and the first expected arrival time of each of the first users is calculated. Thus, compared with an aspect in which the first expected arrival time is calculated before loading of all of the first packages into the delivery car is completed, the first expected arrival time may be calculated at timing closer to the first scheduled delivery time, and the first expected arrival time may be calculated with higher accuracy even if it takes time to load the packages into the delivery car.

In the above aspect, the destination may include one or more first destinations corresponding to the first packages, and the method may further include:
detecting second timing representing delivery of each of the first packages to the one or more first destinations;
acquiring, at the second timing, the first current location and the first time of a first user of a first package that is to be delivered next in a delivery order;
calculating the first expected arrival time and the first difference; and transmitting the first message at the second timing to the first information terminal of the first user of the next first package.

According to this configuration, every time the first package is delivered, the first expected arrival time of the first user of the next first package and the first difference are calculated, and the first message in accordance with the first difference is transmitted to the first information terminal of the corresponding first user. Thus, the first expected arrival time of each first user may be calculated at timing closer to the first scheduled delivery time, and the first expected arrival time may be calculated with higher accuracy.

Another aspect of the present disclosure is an information providing method performed by a computer in an information providing system that provides information to a user, the method including:

acquiring, via a network, a current location of the user and a first time at which the current location is detected;

reading, from a memory, a destination of a package addressed to the user, type information indicating a type of the current location, visiting durations associated with the type information, and a scheduled delivery time;

determining, on the basis of the type information and the visiting durations, the visiting durations corresponding to the current location;

calculating, on the basis of the current location and the destination, a traveling duration that is necessary for the user to travel from the current location to the destination;

calculating, on the basis of the first time, the visiting durations corresponding to the current location, and the traveling duration, expected arrival times;

determining whether the scheduled delivery time is between the expected arrival times;

transmitting, if the scheduled delivery time is between the expected arrival times, a message regarding delivery of the package to an information terminal of the user; and causing the information terminal to display the message.

The visiting duration at the current location is not an even duration, but visiting durations are assumed. According to this configuration, on the basis of the type information indicating the type of the current location and the visiting durations associated with the type information, the visiting durations corresponding to the current location are determined. In addition, on the basis of the visiting durations and the traveling duration of the user from the current location to the destination, the expected arrival times at which the user is to arrive at the destination are calculated, and, if the scheduled delivery time of the package is between the expected arrival times, the message regarding delivery is presented to the user. Thus, it is possible to accurately determine whether the user corresponds to a borderline customer. Furthermore, since the message regarding delivery is transmitted to the user determined as a borderline customer, it is possible to appropriately put pressure on the user to encourage them to return to the destination, and redelivery may be prevented effectively.

In the above aspect, the type information may include information indicating a possibility that the user is able to leave the current location immediately in accordance with an elapsed time from a time the user has arrived at the current location to the first time, and the method may further include:

acquiring, via the network, a second time at which the user has arrived at the current location;

calculating, on the basis of the first time and the second time, the elapsed time;

determining, on the basis of the information indicating the possibility and the elapsed time, the possibility corresponding to the elapsed time;

determining whether the determined possibility is greater than or equal to a predetermined value; and setting, if the possibility is greater than or equal to the predetermined value, the visiting durations to 0.

For example, at an English conversation school, the user tends to leave before about 10 minutes after arrival to make a reservation without taking a lesson whereas they tend to leave after about 50 minutes when taking a lesson. From such a tendency, it is possible to obtain the possibility that the user leaves the current location immediately in accordance with the elapsed time from when the user arrives at the current location.

According to this configuration, on the basis of the first time at which the user being at the current location is detected and the second time at which the user has arrived at the current location, the elapsed time from the second time at which the user has arrived at the current location is calculated. On the basis of the elapsed time, the possibility that the user is able to leave the current location immediately is determined. If the possibility is greater than or equal to the predetermined value, the visiting duration at the visiting location is set to 0, that is, the user is considered to be able to leave the current location immediately, and the expected arrival time is calculated. In the above manner, since the expected arrival time is calculated by using the possibility that the user is able to leave the current location immediately in accordance with the elapsed time after the arrival at the current location, an appropriate expected arrival time may be calculated by taking into account the user's visiting characteristics.

In the above aspect, the type information may include information indicating a possibility that the user is able to leave the current location immediately in accordance with an elapsed time from a time the user has arrived at the current location to the first time, and the method may further include:

acquiring, via the network, a second time at which the user has arrived at the current location;

calculating, on the basis of the first time and the second time, the elapsed time;

determining, on the basis of the information indicating the possibility and the elapsed time, the possibility corresponding to the elapsed time;

determining whether the determined possibility is greater than or equal to a predetermined value; and setting, if the possibility is greater than or equal to the predetermined value, at least one of the visiting durations, other than a longest visiting duration, to 0.

According to this configuration, on the basis of the first time at which the user being at the current location is detected and the second time at which the user has arrived at the current location, the elapsed time from the second time at which the user has arrived at the current location is calculated. On the basis of the elapsed time, the possibility that the user is able to leave the current location immediately is determined. If the possibility is greater than or equal to the predetermined value, at least one of the visiting durations other than the longest visiting duration is set to 0, that is, the user is considered to be able to leave the current location immediately, and the expected arrival time is calculated. In the above manner, according to this aspect, since at least the expected arrival time calculated by determining that the user is able to leave the current location immediately and the longest visiting duration are employed as the expected arrival times, the borderline customer may be determined appropriately by taking into account the user's visiting characteristics.

In the above aspect, the possibility may be calculated from a previous visiting history of the user.

According to this configuration, since the previous visiting history of the user is used to calculate the possibility, the possibility may be accurately calculated.

Still another aspect of the present disclosure is an information providing method performed by a computer in an information providing system that provides information to a user, the method including:

acquiring, via a network, a current location of the user and a time at which the current location is detected;

reading, from a memory, a destination of a package addressed to the user, a traveling route of the user, a traveling history of the user, type information indicating a type of a location via which the user may travel to arrive at the destination, visiting durations associated with the type information, and a scheduled delivery time;

extracting the location on the basis of the current location, the traveling route of the user, and the traveling history of the user;

determining, on the basis of the type information and the visiting durations, the visiting durations corresponding to the extracted location;

calculating, on the basis of the current location, the location, and the destination, a traveling duration that is necessary for the user to travel from the current location to the destination via the location;

calculating, on the basis of the time, the visiting durations corresponding to the extracted location, and the traveling duration, expected arrival times;

determining whether the scheduled delivery time is between the expected arrival times;

transmitting, if the scheduled delivery time is between the expected arrival times, a message regarding delivery of the package to an information terminal of the user; and causing the information terminal to display the message.

According to this configuration, on the basis of the traveling route of the user, the traveling history, and the like, the location via which the user may travel to arrive at the destination is extracted, and, on the basis of the visiting durations at the extracted location, the expected arrival times at which the user is to arrive at the destination are calculated. Thus, if the user stops by a location from the current location, the expected arrival times of the user at the destination may be calculated accurately by taking into account the location to stop by. In addition, if the scheduled delivery time of the package is between the arrival times, the message regarding delivery is presented to the user. Thus, it is possible to appropriately put pressure on the user who stops by such a location to encourage them to return to the destination, and redelivery may be prevented effectively.

Still another aspect of the present disclosure is an information providing method performed by a computer in an information providing system that provides information to a user, the method comprising:

acquiring, via a network, a first current location of the user, a first time at which the first current location is detected, a second current location of a delivery person of a package addressed to the user, a second time at which the second current location is detected, and traffic information;

reading, from a memory, a destination of the package, type information indicating a type of the first current location, and visiting durations associated with the type information;

determining, on the basis of the type information and the visiting durations, the visiting durations corresponding to the first current location;

calculating, on the basis of the first current location and the destination, a first traveling duration that is necessary for the user to travel from the first current location to the destination;

calculating, on the basis of the first time, the visiting durations corresponding to the first current location, and the first traveling duration, an earliest first expected arrival time and a latest second expected arrival time;

calculating, on the basis of the second current location, the traffic information, and the destination, a shortest second traveling duration and a longest third traveling duration that are necessary for the delivery person to travel from the second current location to the destination;

calculating, on the basis of the second time and the second traveling duration, an earliest first expected delivery time;

calculating, on the basis of the second time and the third traveling duration, a latest second expected delivery time;

determining whether the first expected delivery time or the second expected delivery time is between the first expected arrival time and the second expected arrival time;

transmitting, if the first expected delivery time or the second expected delivery time is between the first expected arrival time and the second expected arrival time, a message encouraging the user to arrive at the destination to an information terminal of the user; and causing the information terminal to display the message.

According to this configuration, on the basis of the visiting durations at the first current location and the like, the earliest first expected arrival time and the latest second expected arrival time at which the user is to arrive at the destination are calculated. In addition, on the basis of the second current location, the traffic information, and the destination, the earliest first expected delivery time and the latest second expected delivery time at which the package is to arrive at the destination are calculated. Furthermore, if the first expected delivery time or the second expected delivery time is between the first expected arrival time and the second expected arrival time, the message regarding delivery is presented to the user. Thus, even in a case where the expected delivery time of the package to the destination fluctuates due to a traffic congestion or the like, it is possible to accurately determine whether the user is a borderline customer, and it is possible to appropriately put pressure on the user who is determined as a borderline customer to encourage them to return to the destination, and redelivery of the package may be prevented.

The present disclosure may also be implemented as a computer program causing a computer to perform the characteristic steps included in such a method or a system that operates by the computer program. In addition, it is needless to say that such a computer program may be circulated via a non-transitory computer-readable storage medium, such as a CD-ROM, or a communication network, such as the Internet.

Note that the embodiments described below illustrate specific examples of the present disclosure. Any numeric value, shape, structural element, step, order of steps, and the like illustrated in the following embodiments are examples and do not limit the present disclosure. In addition, among structural elements in the following embodiments, those not described in the broadest independent claim are optional. Furthermore, details of each of the embodiments may be combined.

First Embodiment

FIG. 1 illustrates an example of a network configuration of an information providing system according to a first embodiment of the present disclosure. The information providing system provides a service for encouraging a user, who is a receiver of a package, to be at a destination at a scheduled delivery time and preventing redelivery of the package. The information providing system includes a server 1, a user terminal 2 (first information terminal example), and a delivery person terminal 3. The server 1, the user terminal 2, and the delivery person terminal 3 are connected to one another via a network NT to be capable of communicating with one another. As the network NT, for example, an Internet network, a mobile phone communication network, or the like is employed. The server 1 may also be referred to as an information providing apparatus.

The server 1 is, for example, constituted by one or more computers and controls the entire information providing system. The user terminal 2 is, for example, constituted by a mobile information processing apparatus, such as a smartphone or a tablet terminal, and is owned by a user for whom the information providing system service is applied. The user terminal 2 detects its location and transmits the location to the server 1 on a regular basis and displays various messages sent from the server 1.

The delivery person terminal 3 is, for example, constituted by a mobile information processing apparatus, such as a smartphone or a tablet terminal, and displays various messages for a delivery person, who delivers a package. The delivery person terminal 3 in this example may be constituted by an information processing apparatus mounted on a delivery car that the delivery person drives, and may be implemented in, for example, an electronic control unit (ECU) or a car navigation system included in the delivery car. The delivery person terminal 3 may also be constituted by a dedicated mobile information processing apparatus that is developed for delivery persons of packages.

Note that FIG. 1 illustrates only the single user terminal 2 for the convenience of description. However, this is an example, and user terminals 2 may be included. In this case, data transmitted from these user terminals 2 is managed according to user by using user IDs of users who own the user terminals 2. Similarly, FIG. 1 illustrates only the single delivery person terminal 3. However, delivery person terminals 3 may be included. In this case, data transmitted from the delivery person terminals 3 is managed according to delivery person by using delivery person IDs individually assigned to the delivery person terminals 3.

Figure 2:
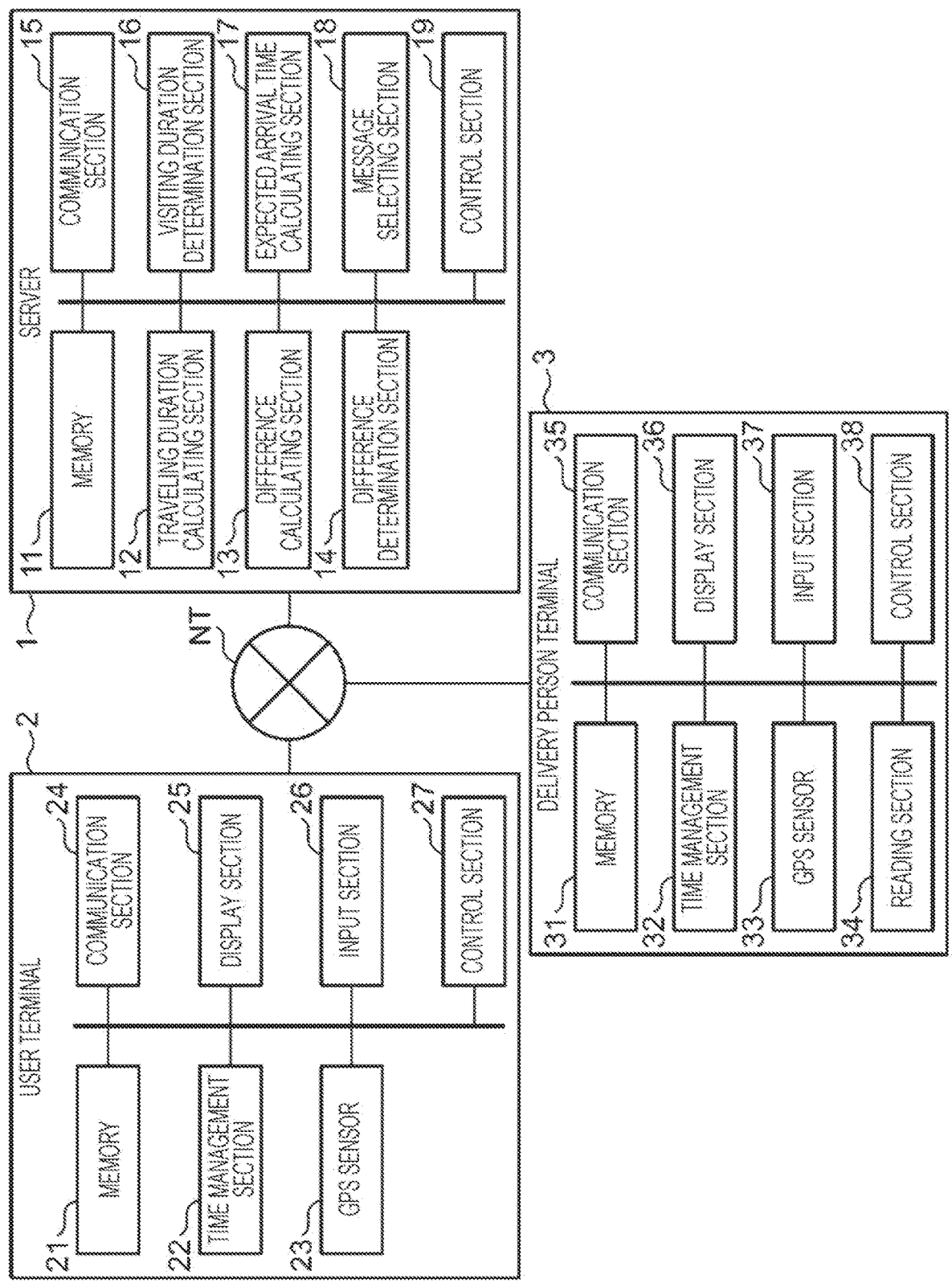
FIG. 2 is a block diagram illustrating an example of a configuration of the information providing system illustrated in FIG. 1.

FIG. 2 is a block diagram illustrating an example of a configuration of the information providing system illustrated in FIG. 1. The server 1 includes a memory 11, a traveling duration calculating section 12, a difference calculating section 13, a difference determination section 14, a communication section 15, a visiting duration determination section 16, an expected arrival time calculating section 17, a message selecting section 18, and a control section 19. Note that the traveling duration calculating section 12, the difference calculating section 13, the difference determination section 14, the visiting duration determination section 16, the expected arrival time calculating section 17, the message selecting section 18, and the control section 19 may be, for example, constituted by a processor such as a CPU or may be constituted by a dedicated hardware circuit. In this case, these structural elements may be constituted by separate hardware components or may be constituted by one processor executing a predetermined program.

The memory 11 is, for example, constituted by a semiconductor memory and stores, in advance, a destination of a package addressed to the user, type information indicating the type of a current location of the user, a visiting duration associated with the type information, and a scheduled delivery time of the package.

By using the type information and visiting duration stored in the memory 11 and a first current location of the user received by the communication section 15 from the user terminal 2, the visiting duration determination section 16 determines the visiting duration of the user at the first current location.

By using the first current location of the user and the destination stored in the memory 11, the traveling duration calculating section 12 calculates a first traveling duration that is necessary for the user to travel from the first current location to the destination. The traveling duration calculating section 12 in this example may, for example, determine an optimal route connecting the first current location and the destination from map information by using a route search algorithm and may calculate the first traveling duration by dividing the determined optimal route by a predetermined traveling speed. As the traveling speed, for example, a walking speed is employed if traveling on foot is expected for the optimal route, a car traveling speed is employed if traveling by car is expected for the optimal route, and a traveling speed of public transportation is employed if traveling by public transportation, such as a train or bus, is expected.

Alternatively, the traveling duration calculating section 12 may request a route search application to calculate the traveling duration by specifying the first current location and the destination and may employ an output traveling duration as the first traveling duration. Note that as the route search application, for example, a public route search site on the Internet may be employed.

By using a first time at which the first current location is detected by the user terminal 2, received by the communication section 15, the visiting duration determined by the visiting duration determination section 16, and the first traveling duration calculated by the traveling duration calculating section 12, the expected arrival time calculating section 17 calculates a first expected arrival time. The first expected arrival time in this example is calculated by adding the visiting duration and the first traveling duration to the first time.

The difference calculating section 13 calculates a first difference between a first scheduled delivery time for the destination of a package, stored in the memory 11, and the first expected arrival time calculated by the expected arrival time calculating section 17.

The difference determination section 14 determines whether the first difference calculated by the difference calculating section 13 is less than or equal to a first threshold, and, if the first difference is less than or equal to the first threshold, determines the corresponding user as a borderline customer. a customer who will return to the destination at around the scheduled delivery time, that is, at the very delivery time or immediately before or after the delivery time. The difference determination section 14 in this example may determine whether the absolute value of the first difference is less than or equal to the first threshold. Thus, a user for whom the first expected arrival time belongs to a time slot determined before and after the first scheduled delivery time by the first threshold is determined as a borderline customer. As the first threshold, for example, ten minutes may be employed. As the first threshold, for example, 10 minutes may be employed. In this case, a user for whom the first expected arrival time belongs to a period 10 minutes before and 10 minutes after the first scheduled delivery time is determined as a borderline customer. However, this is an example, and a value other than 10 minutes, such as 3 minutes, 5 minutes, or 15 minutes, may be employed as the first threshold.

In accordance with the first difference calculated by the difference calculating section 13, the message selecting section 18 selects the type of a message (first message example) for the user. The control section 19 controls the entire server 1.

The communication section 15 is constituted by a communication apparatus that connects the server 1 to the network NT and, for example, receives the first current location and the first time transmitted from the user terminal 2 and transmits the message selected by the message selecting section 18 to the user terminal 2.

The user terminal 2 includes a memory 21, a time management section 22, a global positioning system (GPS) sensor 23, a communication section 24, a display section 25, an input section 26, and a control section 27. The memory 21 is, for example, constituted by a semiconductor memory and stores an application or the like that is necessary to display a message.

The time management section 22 is, for example, constituted by a clock and measures the time. The GPS sensor 23 calculates the current location of the user terminal 2 by using radio waves from GPS satellites. The GPS sensor 23 in this example may, for example, calculate the current location at predetermined time intervals (e.g., 1 minute, 2 minutes, or 10 minutes).

The communication section 24 is constituted by a communication apparatus that connects the user terminal 2 to the network NT and transmits the current location calculated by the GPS sensor 23 to the server 1 as the first current location of the user. At this time, in association with the first current location, the communication section 24 transmits, to the server 1, the first time measured by the time management section 22. The communication section 24 also receives the message transmitted from the server 1. The first time is the time at which the GPS sensor 23 calculates the current location of the user terminal 2, that is, the time at which the GPS sensor 23 calculates the first current location. The time at which the first current location is calculated may also be referred to as a detection time of the first current location. The display section 25 is constituted by a display apparatus such as a liquid crystal display and displays various images including the message and the like. The input section 26 is, for example, constituted by a touch panel and receives various user operations. The control section 27 is constituted by a processor such as a CPU and controls the entire user terminal 2.

The delivery person terminal 3 includes a memory 31, a time management section 32, a GPS sensor 33, a reading section 34, a communication section 35, a display section 36, an input section 37, and a control section 38. The memory 31 is, for example, constituted by a semiconductor memory and stores an application or the like for displaying various messages transmitted from the server 1.

The time management section 32 is, for example, constituted by a clock and measures the time. The GPS sensor 33 calculates the current location of the delivery person terminal 3 by using radio waves from GPS satellites. The GPS sensor 33 in this example may, for example, calculate the current location at predetermined time intervals (e.g., 1 minute, 2 minutes, or 10 minutes).

The reading section 34 is, for example, constituted by a barcode reader that reads a barcode, a QR code (registered trademark), or the like on a package ticket adhered on a package. The barcode or QR code (registered trademark) in this example includes at least a package ID that is an identifier of the package. When loading a package into a delivery car at a delivery center, a delivery person makes the reading section 34 read the barcode or QR code (registered trademark) on a package ticket of the loaded package. Thus, by using the package ID read by the reading section 34 as a key, the delivery person terminal 3 may acquire package information such as the destination, the receiver, and the scheduled delivery time from the server 1 and may manage the package to be delivered.

The communication section 35 is constituted by a communication apparatus that connects the delivery person terminal 3 to the network NT and transmits, to the server 1, the current location detected by the GPS sensor 33 and the time measured by the time management section 32 in association with each other.

The display section 36 is constituted by a display apparatus such as a liquid crystal display and displays various images including a message transmitted from the server 1 and the like. The input section 37 is, for example, constituted by a touch panel and receives various user operations. The control section 38 is constituted by a processor such as a CPU and controls the entire delivery person terminal 3.

FIG. 3 illustrates examples of data structures of a current location database (DB) DB31 and a type database DB32 stored in the memory 11 of the server 1. The current location database DB31 is a database that stores the first current location of the user, and the first current location detected by the user terminal 2 is stored in a single record.

Specifically, the current location database DB31 stores "time", "user ID", "location information", and "current location" in association with one another. "Time" indicates the detection time of the first current location at which the user terminal 2 detects the first current location. In the "time" cell in this example, the time transmitted in association with the first current location is stored.

"User ID" indicates an identifier of the user for whom the first current location is detected. "User ID" in this example may be a user ID associated in advance with a communication address of the user terminal 2 that has transmitted the first current location. Alternatively, if the user ID is included in the first current location transmitted from the user terminal 2, "user ID" may be the user ID. Note that the first current location of the user with a user ID "GUEST0020" is illustrated in this example for the convenience of description. However, this is an example, and if the server 1 receives a first current location of another user, the current location database DB31 also stores the first current location of the other user.

"Location information" indicates location information of the first current location. The location information in this example is constituted by two-dimensional data of the latitude and longitude. However, this is an example, and the location information may also be constituted by three-dimensional data further including the altitude. "Current location" indicates the place of the first current location, such as "platform of Oimachi Station". Note that "current location" may be, for example, determined by the server 1 by referring to map information from the location information of the first current location transmitted from the user terminal 2, or, if the current location is transmitted from the user terminal 2 in association with the first current location, the transmitted current location may be employed.

The type database DB32 is a database that is used to determine the type corresponding to the first current location and that stores "current location" and "type" in association with each other, and a single current location is associated with a single record. "Current location" is the same as "current location" in the current location database DB31. "Type" indicates the type of "current location" and indicates, for example, the type of facility located at the current location. In this example, "station" indicating a station of public transportation, "gym" indicating a sport gym such as a yoga studio, and "grocery store" indicating a grocery store are stored in the "type" cell. The type database DB32 in this example is created in advance.

FIG. 4 illustrates examples of data structures of a visiting duration database DB41, a destination database DB42, and a package database DB43 stored in the memory 11 of the server 1. The visiting duration database DB41 is a database that is used to determine the visiting duration of the user at the first current location and that stores "type" and "visiting duration" in association with each other. "Type" is the same as "type" in the type database DB32. As "visiting duration", visiting duration is indicated during which the user is expected to spend time at the current location indicated by "type". As the visiting duration in this example, a duration calculated through analysis or machine learning of previous statistics data is employed. In this example, durations such as "5 minutes" for "station" and "20 minutes" for "grocery store" are employed.

The destination database DB42 is a database that stores a destination of a package, and a single destination is assigned to a single record. Specifically, the destination database DB42 stores "user ID", "destination address", and "message address" in association with one another. "User ID" is an identifier of a user who is a receiver of a package. "Destination address" is an address of a destination of a package. "Message address" is a communication address such as an email address of the user terminal 2 of a user who is a receiver.

The package database DB43 is a database that is used to determine the first scheduled delivery time for the destination of the package, and a single package is assigned to a single record. Specifically, the package database DB43 stores "user ID", "package ID", "scheduled delivery time", and "sender" in association with one another. "User ID" indicates a user ID of a user who is a receiver of a package. "Package ID" indicates a package ID that is an identifier for uniquely identifying a package. "Scheduled delivery time" is a first scheduled delivery time for a destination of a package. The first scheduled delivery time in this example is constituted by time, day, month, and year, as in "13:00 1/1/2018". Note that as the first scheduled delivery time, a scheduled delivery time that is calculated in advance by taking into account a user's desired delivery time, the destination, a package delivery route of a delivery car, and the like. "Sender" indicates a user ID of a sender of a package.

FIG. 5 illustrates examples of data structures of a customer message database DB51 and a delivery person message database DB52 stored in the memory 11 of the server 1. The customer message database DB51 is a database that stores a message to be selected by the message selecting section 18, and a single message is assigned to a single record. Specifically, the customer message database DB51 stores "message ID" and "message" in association with each other. "Message ID" indicates an identifier of a message. Content of a message is stored in the "message" cell. In the messages given here, the first scheduled delivery time is indicated at the part "XX:XX".

The message on the first row, "Package will be delivered at around XX:XX", is sent to, for example, a user for whom the first expected arrival time is before the first scheduled delivery time by a first threshold, that is, the user is likely to be at home.

The message on the second row, "Package will be delivered at around XX:XX. Will you be at home?", is sent to, for example, a user corresponding to the above-described borderline customer. Note that this message includes a question "will you be at home?" requesting a reply from the user. Thus, the user who receives this message operates the user terminal 2 to input the reply indicating whether they are at home and transmits the reply to the server 1.

The message on the third row, "Package will be delivered at around XX:XX and will be left in a delivery box if it has room" is sent to, for example, a user for whom the first expected arrival time is after the time obtained by adding the first threshold to the first scheduled delivery time, that is, the user who is unlikely to be at home.

The delivery person message database DB52 is a database that stores a message to be selected by the message selecting section 18, and a single message is assigned to a single record. Specifically, the delivery person message database DB52 stores "message ID" and "message" in association with each other. "Message ID" indicates an identifier of a message. "Message" indicates content of a message. Note that in the messages given here, the first expected arrival time is indicated at the part "XX:XX".

The delivery person message on the first row, "Expected arrival time is XX:XX, and receiver is likely to be at home", is sent to, for example, a delivery person who will deliver a package to a user who is likely to be at home at the first scheduled delivery time.

The delivery person message on the second row, "Expected arrival time is XX:XX, and it is being checked if reception is possible", is sent to, for example, a delivery person who will deliver a package to a borderline customer.

The delivery person message in the third row, "Expected arrival time is XX:XX, and receiver is unlikely to be at home" is sent to, for example, a delivery person who will deliver a package to a user who is unlikely to be at home at the first scheduled delivery time.

Figure 6:
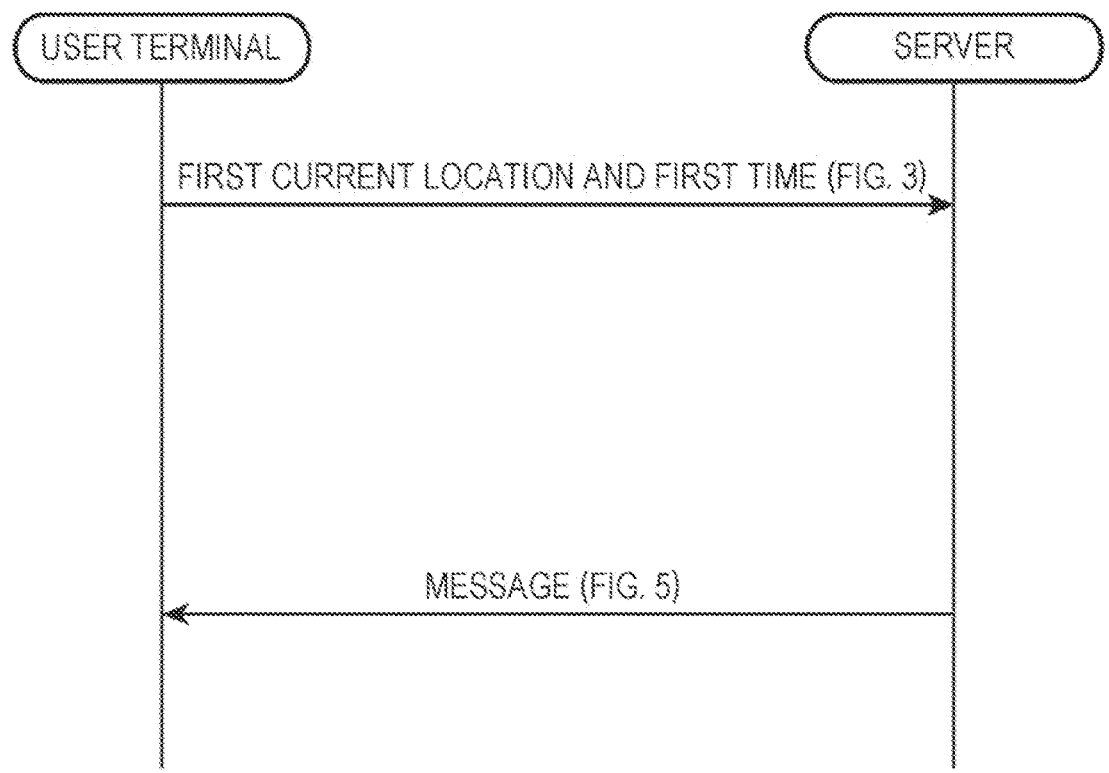
FIG. 6 is a sequence diagram illustrating an example of data transmission and reception between a user terminal and the server in the information providing system illustrated in FIG. 1.

FIG. 6 is a sequence diagram illustrating an example of data transmission and reception between the user terminal 2 and the server 1 in the information providing system illustrated in FIG. 1.

The user terminal 2 transmits, to the server 1, the first current location detected by the GPS sensor 23 and the first time at which the GPS sensor 23 detects the first current location in association with each other. This transmission is performed on a regular basis, and the transmitted first current location and first time are stored in the current location database DB31 illustrated in FIG. 3.

Subsequently, at predetermined processing timing, the server 1 selects a message in accordance with a comparison result between the first threshold and the first difference between the first expected arrival time and the first scheduled delivery time from the customer message database DB51 illustrated in FIG. 5 and transmits the message to the user terminal 2.

Figure 7:
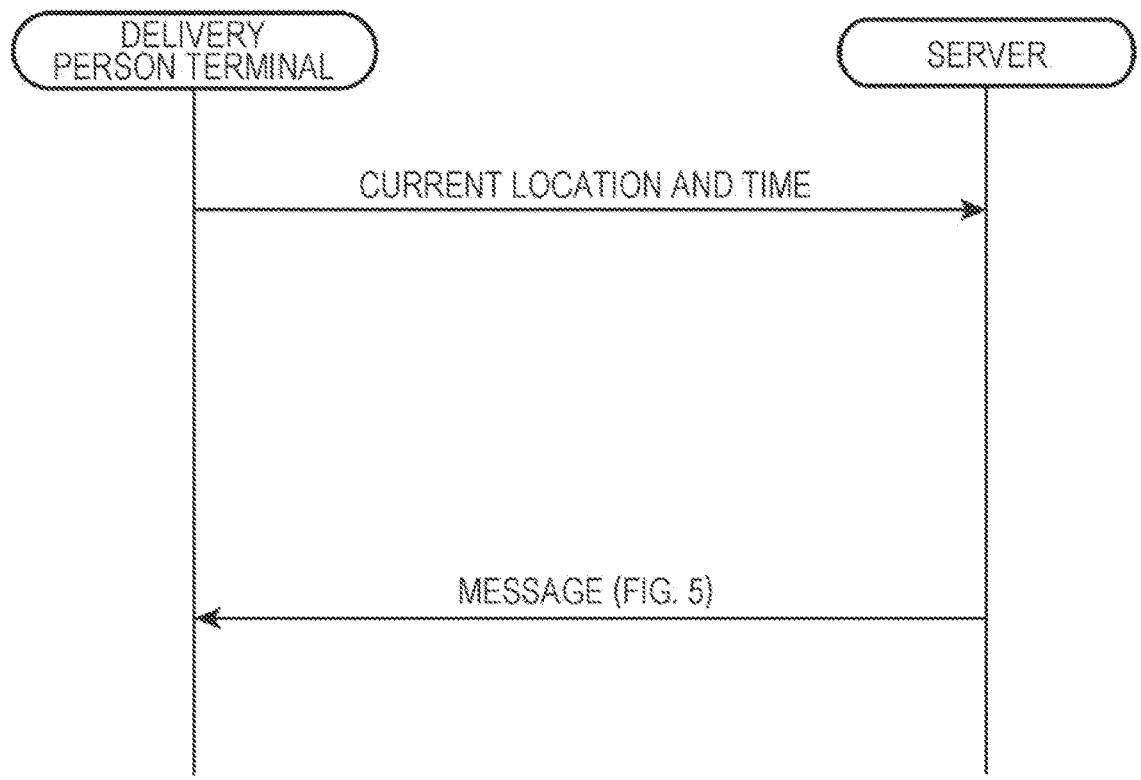
FIG. 7 is a sequence diagram illustrating an example of data transmission and reception between a delivery person terminal and the server in the information providing system in FIG. 1.

FIG. 7 is a sequence diagram illustrating an example of data transmission and reception between the delivery person terminal 3 and the server 1 in the information providing system in FIG. 1. The delivery person terminal 3 transmits the current location of a delivery person detected by the GPS sensor 33 and the detection time thereof in association with each other to the server 1. This transmission is performed on a regular basis, and the server 1 acquires the current location of the delivery person.

Subsequently, at predetermined processing timing, the server 1 selects a delivery person message in accordance with a comparison result between the first threshold and the first difference between the first expected arrival time and the first scheduled delivery time from the delivery person message database DB52 illustrated in FIG. 5 and transmits the message to the delivery person terminal 3.

Figure 8:
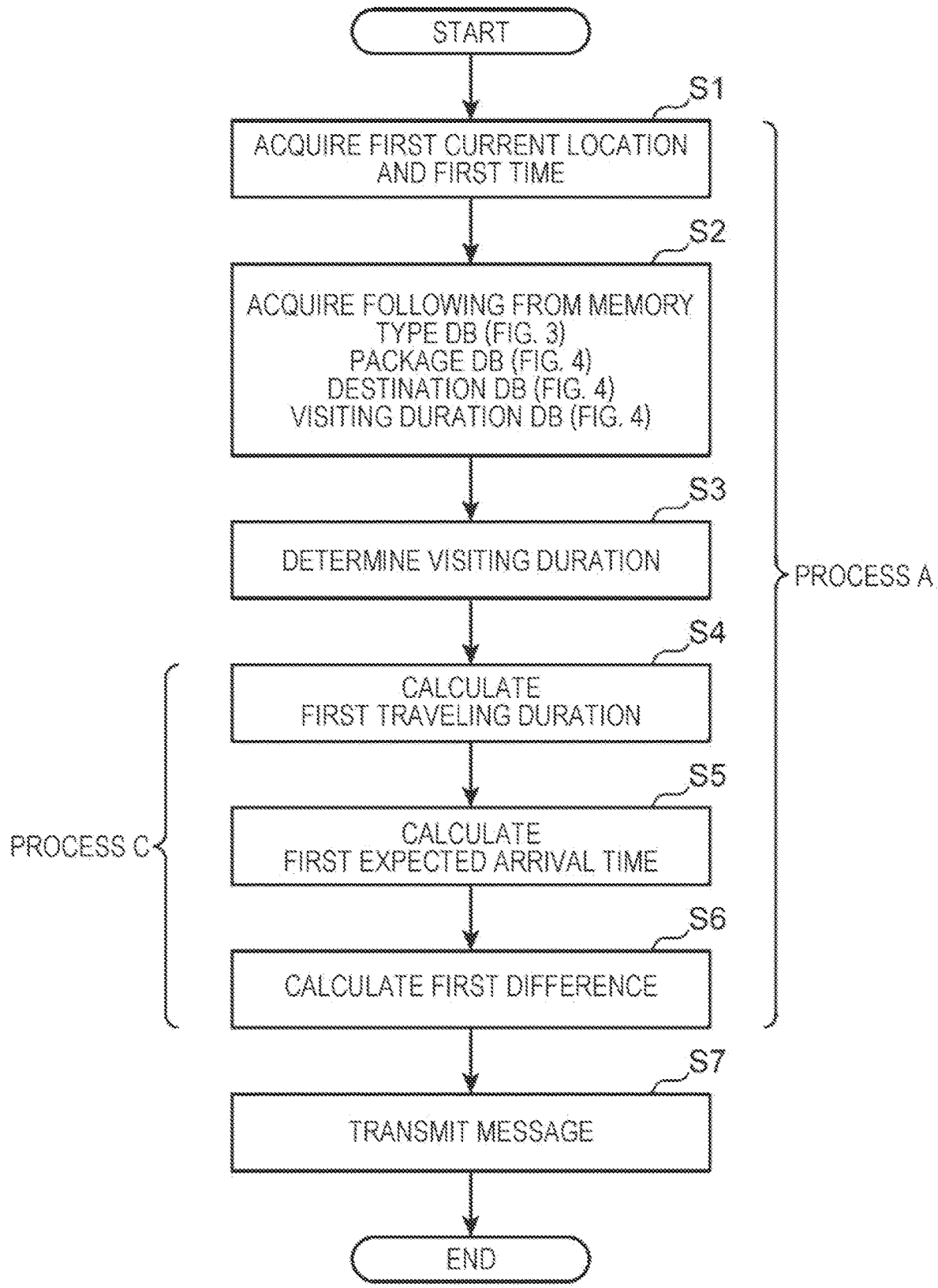
FIG. 8 is a flowchart illustrating an example of a process in the information providing system according to the first embodiment.

FIG. 8 is a flowchart illustrating an example of a process in the information providing system according to the first embodiment. In S1, the communication section 15 acquires the first current location and the first time transmitted from the user terminal 2. In S2, the control section 19 acquires the type database DB32, the package database DB43, the destination database DB42, and the visiting duration database DB41 from the memory 11.

In S3, the visiting duration determination section 16 determines the visiting duration. For example, in a case where the first current location acquired in S1 is "platform of Oimachi Station", "station" is determined as the type on the basis of the type database DB32 illustrated in FIG. 3, and "5 minutes" is determined on the basis of the visiting duration database DB41 illustrated in FIG. 4.

In S4, the traveling duration calculating section 12 calculates the first traveling duration that is necessary for the user to travel from the first current location acquired in 51 to the destination. For example, if the user ID of the user located at the first current location acquired in S1 is "GUEST0020", "Yokohama-shi, Kanagawa-ku, . . . " is determined as the destination on the basis of the destination database DB42. Subsequently, the optimal route between the first current location and the destination is determined, and by dividing the route by an expected traveling speed or requesting a route search application to calculate the traveling duration, the first traveling duration is calculated.

In S5, the expected arrival time calculating section 17 adds the visiting duration at the first current location determined in S3 and the first traveling duration calculated in S4 to the first time acquired in S1, thereby calculating the first expected arrival time of the user at the destination. In the above example of the platform of Oimachi Station, if the current time is 18:55, the visiting duration at "station" is "5 minutes", and the first traveling duration from the platform of Oimachi Station to the destination is calculated to be "20 minutes", by adding 5 minutes and 20 minutes to 18:55, the first expected arrival time is calculated to be 19:20.

In S6, from the first expected arrival time calculated in S5, the difference calculating section 13 subtracts the first scheduled delivery time of a corresponding package stored in the package database DB43 to calculate the first difference. For example, in the above example of the platform of Oimachi Station, if the first scheduled delivery time is "19:25", since the first expected arrival time is "19:20", the first difference is the difference of "19:25" from "19:20", which is "-5 minutes".

In S7, the message selecting section 18 selects a message in accordance with the first difference and transmits the message to the user terminal 2 of the corresponding user by using the communication section 15. For example, if the absolute value of the first difference is less than or equal to the first threshold, that is, if the corresponding user is a borderline customer, the message selecting section 18 transmits a message requesting a reply indicating whether reception is possible, indicated on the second row in the customer message database DB51.

In this case, first, the message selecting section 18 transmits a message indicating that it is being checked if reception is possible, indicated on the second row in the delivery person message database DB52, to the delivery person terminal 3. Then, if a reply indicating that reception is possible is received from the user, the message selecting section 18 may transmit a message indicating that reception is possible to the delivery person terminal 3. On the other hand, if a reply indicating that reception is not possible is received from the user, the message selecting section 18 may transmit a message indicating that reception is not possible to the delivery person terminal 3.

In addition, if the absolute value of the first difference is larger than the first threshold and the first expected arrival time is before the first scheduled delivery time, the message selecting section 18 transmits a message that is transmitted to a user who is likely to be at home, indicated on the first row in the customer message database DB51. In this case, for example, the message selecting section 18 may transmit a message indicating that the user is likely to be at home, indicated on the first row in the delivery person message database DB52, to the delivery person terminal 3. Thus, a delivery person is able to deliver a package without concerning about redelivery.

In addition, if the absolute value of the first difference is larger than the first threshold and the first expected arrival time is after the first scheduled delivery time, the message selecting section 18 transmits a message that is transmitted to a user who is unlikely to be at home, indicated on the third row in FIG. 5. In this case, for example, the message selecting section 18 may transmit a message indicating that the user is unlikely to be at home, indicated on the third row in the delivery person message database DB52, to the delivery person terminal 3. Thus, a delivery person is able to skip a destination of a corresponding package and go to the next destination so that packages will be delivered efficiently.

In the embodiment of the flow in FIG. 8, a message requesting a reply is transmitted to a user corresponding to a borderline customer, while a message requesting a reply is not transmitted to the other users. Thus, the users may be less bothered. On the other hand, a message requesting a reply is transmitted to a user corresponding to a borderline customer. This may psychologically affect a user who makes a reply indicating that reception is possible so as to be responsible for their words, and prevention of redelivery may be expected. On the other hand, from a user who makes a reply indicating that reception is not possible, a delivery person may receive a message indicating that reception is not possible so as to avoid delivery of the corresponding package to the destination, and prevention of redelivery may be expected.

Figure 9:
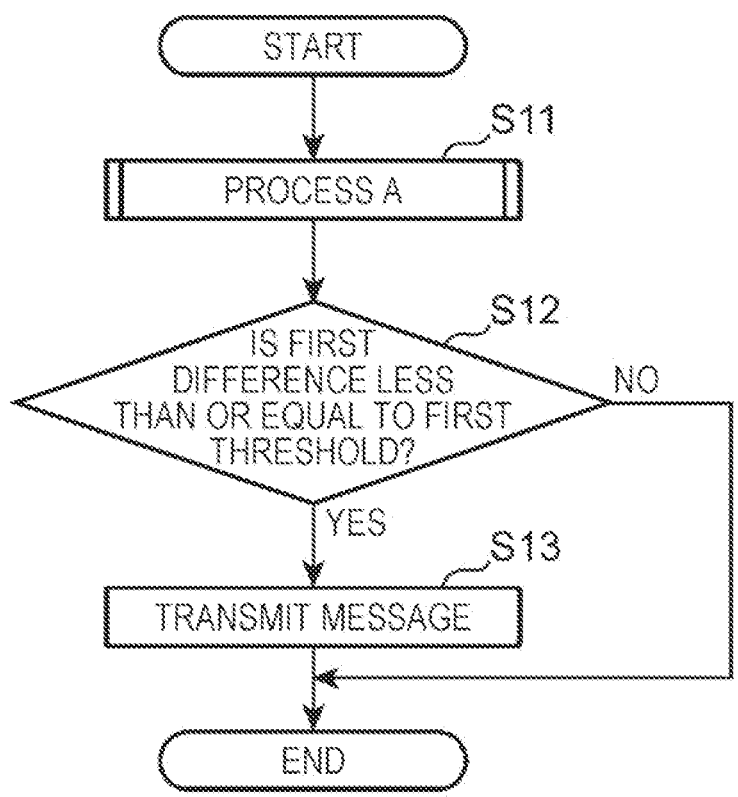
FIG. 9 is a flowchart illustrating another example of a process in the information providing system according to the first embodiment.

FIG. 9 is a flowchart illustrating another example of a process in the information providing system according to the first embodiment. Note that in this flow, a user corresponding to a borderline customer receives a message.

In S11, Process A is performed. Process A is the process illustrated in S1 to S6 in FIG. 8. In S12, the difference determination section 14 determines whether the absolute value of the first difference is less than or equal to the first threshold. If the absolute value of the first difference is less than or equal to the first threshold (YES in S12), the process proceeds to S13; if absolute value of the first difference is greater than the first threshold (NO in S12), the process ends.

In S13, the message selecting section 18 transmits a message encouraging a user to make a reply indicating whether reception is possible, indicated on the second row in the customer message database DB51, to the user terminal 2 by using the communication section 15 and also transmits a message indicating that it is being checked whether reception is possible, indicated on the second row in the delivery person message database DB52, to the delivery person terminal 3 by using the communication section 15.

Subsequently, if a reply indicating that reception is possible is received from the user, the message selecting section 18 transmits a message indicating that reception is possible to the delivery person terminal 3. On the other hand, if a reply indicating that reception is not possible is received from the user, the message selecting section 18 transmits a message indicating that reception is not possible to the delivery person terminal 3.

Figure 10:
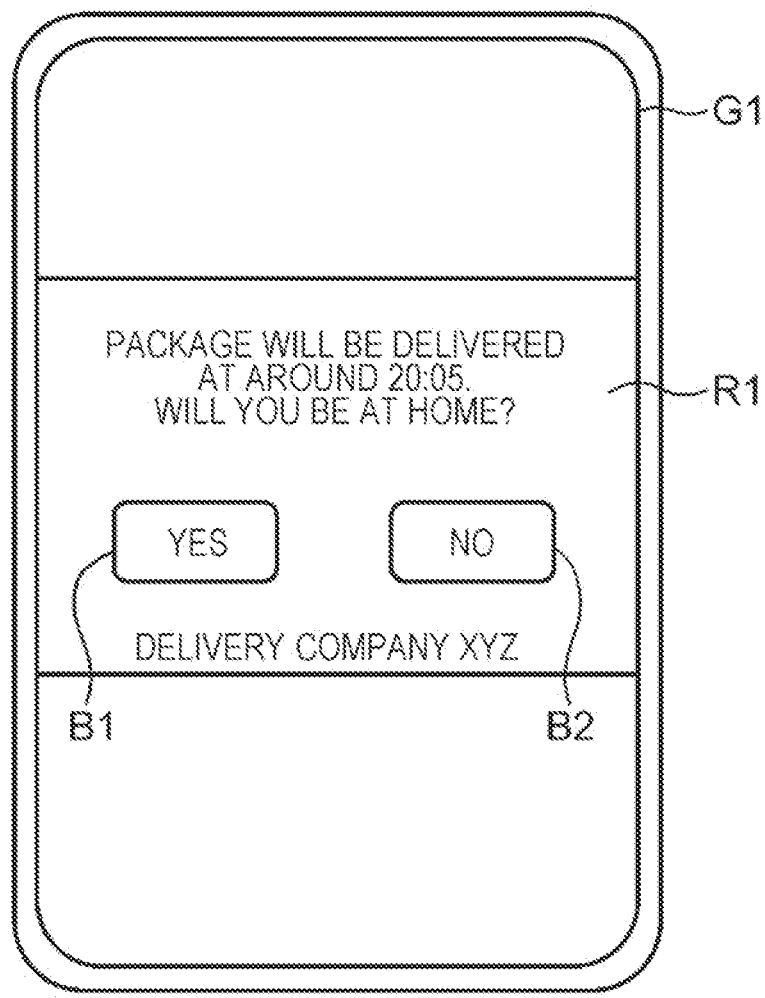
FIG. 10 illustrates an example of a message display screen displaying a message requesting a reply indicating whether reception of a package is possible.

FIG. 10 illustrates an example of a message display screen G1 displaying a message requesting a reply indicating whether reception of a package is possible. The message display screen G1 includes a display cell R1. In the display cell R1, a message "Package will be delivered at around 20:05. Will you be at home?", a button B1 labeled as "Yes", and a button B2 labeled as "No" are displayed.

In the message in the display cell R1, "20:05" indicates the first scheduled delivery time. The button B1 is selected if reception of the package at the first scheduled delivery time is possible, while the button B2 is selected if reception of the package at the first scheduled delivery time is not possible.

By viewing the message in the display cell R1, the user determines whether they will receive the package at 20:05 and selects the button B1 to receive the package or selects the button B2 not to receive the package.

If the input section 26 of the user terminal 2 detects a user operation of selecting the button B1, the control section 27 transmits a reply indicating that reception is possible to the server 1 by using the communication section 24. On the other hand, if the input section 26 detects a user operation of selecting the button B2, the control section 27 transmits a reply indicating that reception is not possible to the server 1 by using the communication section 24. Thus, the server 1 may determine whether the borderline customer is able to receive the package.

Figure 11:
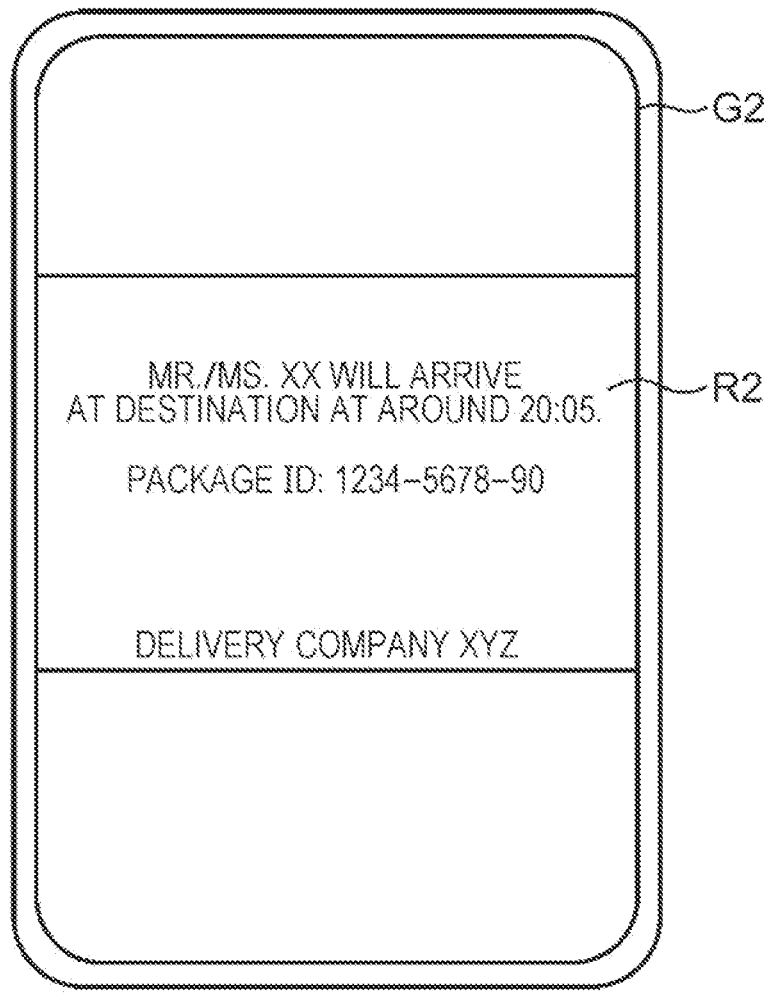
FIG. 11 illustrates an example of a message display screen displaying a delivery person message.

FIG. 11 illustrates an example of a message display screen G2 displaying a delivery person message. The message display screen G2 is displayed on the delivery person terminal 3 if the user makes a reply indicating that reception is possible. The message display screen G2 includes a display cell R2. In the display cell R2, a message "Mr./Ms. XX will arrive at the destination at around 20:05" is displayed. "Mr./Ms. XX" in this example is a name of the user who makes a reply indicating that reception is possible. "20:05" is the first expected arrival time of Mr./Ms. XX.

In the display cell R2, a package ID is also displayed. The package ID is determined from the package database DB43 and is included in a message transmitted from the server 1 to the delivery person terminal 3.

By viewing the message display screen G2, a delivery person is able to know that "Mr./Ms. XX" is able to receive a package and deliver a package without any concern.

In the above manner, according to the first embodiment, the visiting duration of the user is determined on the basis of the type (e.g., a grocery store or a workplace) of the first current location of the user, and the first expected arrival time at the destination is calculated by taking the visiting duration into account. Thus, the expected arrival time may be calculated with high accuracy.

Second Embodiment

An information providing system according to a second embodiment starts the process illustrated in the first embodiment at first timing at which loading of all packages into a delivery car is completed at a delivery center. Note that the same components as those in the first embodiment will be denoted by the same reference numerals in this embodiment, and will not be described. In addition, the overall configuration diagram and the block diagram in FIG. 1 and FIG. 2 are also employed in this embodiment. The same applies to the following embodiments. FIG. 12 illustrates an example of a data structure of a package database DB12 in the second embodiment. The package database DB12 further includes "delivery timeframe" and "loading completed" cells in the package database DB43. "Delivery timeframe" indicates a timeframe during which a delivery car leaves a delivery center, delivers loaded packages, and returns to the delivery center. As delivery timeframes in this example, timeframes such as "13:00-15:00" and "16:00-18:00" are employed. Since the scheduled delivery time of the package on the first row is 13:00, the delivery timeframe is 13:00-15:00. Since the scheduled delivery time of the package on the second row is 13:10, the delivery timeframe is 13:00-15:00.

In the "loading completed" cell, "completed" indicating completion of loading is set if corresponding packages are loaded into a delivery car at a delivery center, or the cell is blank if loading of corresponding packages into a delivery car is not completed.

In the example in FIG. 12, for the package on the second row, the delivery timeframe of which is 13:00-15:00, since the "loading completed" cell is blank, loading of all packages for this delivery timeframe is not completed.

Figure 13:
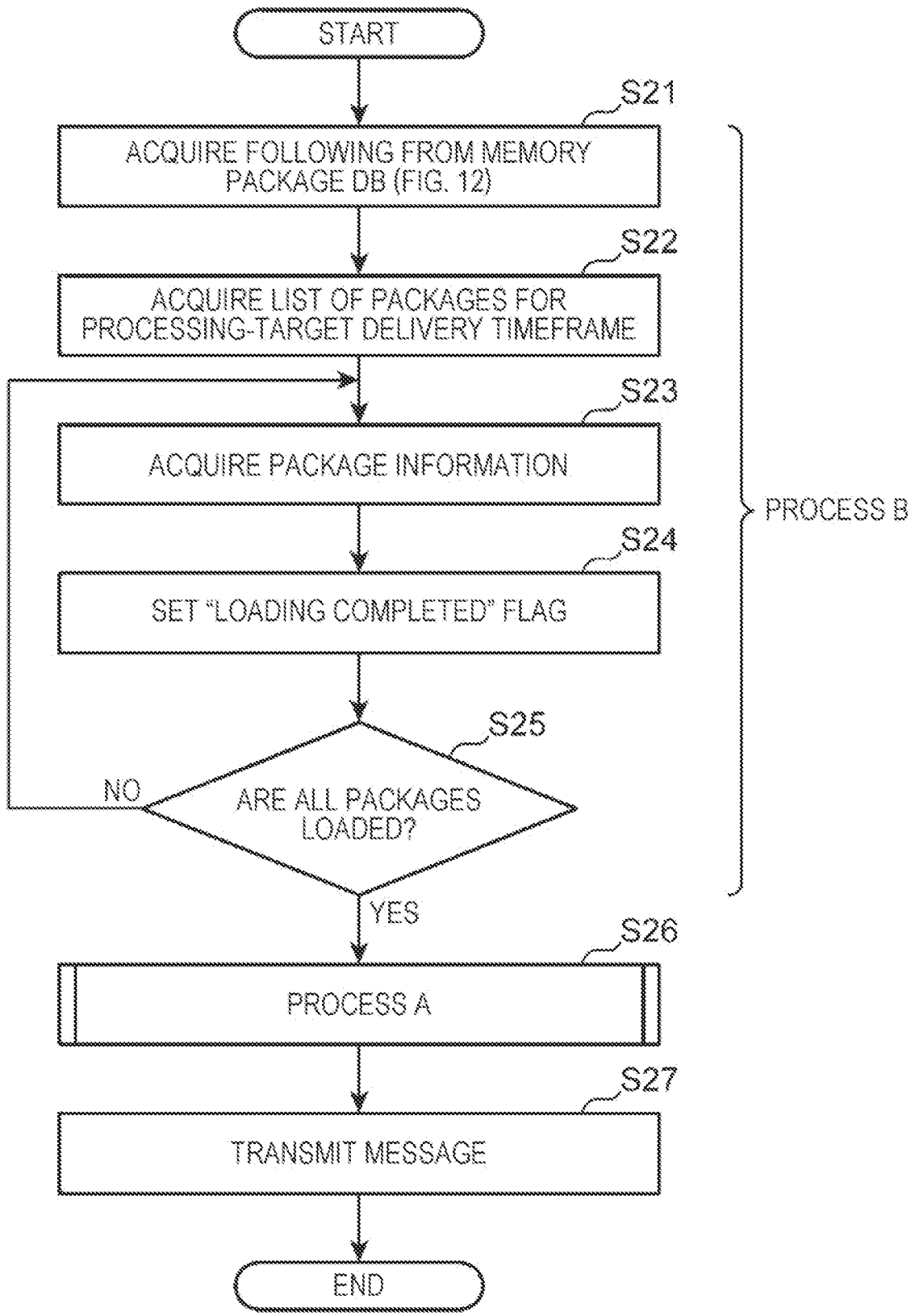
FIG. 13 is a flowchart illustrating an example of a process according to the second embodiment.

FIG. 13 is a flowchart illustrating an example of a process according to the second embodiment. Note that the flow in FIG. 13 starts, for example, at a certain time before a start time of a processing-target delivery timeframe. In S21, the control section 19 of the server 1 acquires the package database DB12 from the memory 11.

In S22, the control section 19 of the server 1 acquires a list of packages for the processing-target delivery timeframe from the package database DB12. For example, if the processing-target delivery timeframe is 13:00-15:00, a list of packages for the delivery timeframe 13:00-15:00 is acquired from the package database DB12.

In S23, the control section 19 of the server 1 acquires package information read by the reading section 34 of the delivery person terminal 3 by using the communication section 15.

In this example, at the delivery center, a delivery person makes the reading section 34 read a barcode or QR code (registered trademark) on a package ticket attached to a package so that the delivery person terminal 3 acquires package information before loading the package into the delivery car. The package information acquired by the delivery person terminal 3 is transmitted to the server 1. The package information in this example includes at least a package ID.

In S24, the control section 19 of the server 1 sets "completed" in the "loading completed" cell of a corresponding package in the package database DB12 so as to set a "loading completed" flag of the corresponding package.

In S25, the control section 19 of the server 1 determines whether all packages for the corresponding delivery timeframe are loaded. In this example, if "completed" is set in the "loading completed" cell of all packages for the corresponding delivery timeframe, it is determined that all packages are loaded.

If loading of all packages is not completed (NO in S25), the process returns to S23, and the delivery person continues loading packages. On the other hand, if loading of all packages is completed (YES in S25), the process proceeds to S26. In S16, Process A is performed on individual packages belonging to the target delivery timeframe. In S27, as in S7 in FIG. 8 or S13 in FIG. 9, a message is transmitted.

In this manner, in the second embodiment, at first timing at which all of the packages for the delivery timeframe are loaded into the delivery car, Process A is performed to calculate the first expected arrival time of each user. Thus, compared with an embodiment in which the first expected arrival time is calculated before loading of all packages into a delivery car is completed, the first expected arrival time may be calculated at timing closer to the first scheduled delivery time, and the first expected arrival time may be calculated with higher accuracy even if it takes time to load the packages into the delivery car.

Third Embodiment

An information providing system according to a third embodiment starts the process illustrated in the first embodiment at, in addition to the first timing at which loading of all of the packages into the delivery car is completed at the delivery center, every time a package is handed to a user (second timing).

FIG. 14 illustrates an example of a data structure of a package database DB14 in the third embodiment. The package database DB14 further includes a "visit completed" cell in the package database DB43. In the "visit completed" cell, "completed" indicating that visit is completed is set if a delivery person has visited a destination and has handed a package to a user, and the cell is blank if visit is not completed.

In the example in FIG. 14, since the package on the first row has been handed to a user, "completed" is set in the "visit completed" cell, and since the package on the second row has not been handed to a user, the "visit completed" cell is blank. In the example in FIG. 14, since the delivery car is delivering packages for the delivery timeframe 13:00-15:00, "completed" is set in the "loading completed" cell of the packages in the first row and the second row.

Figure 15:
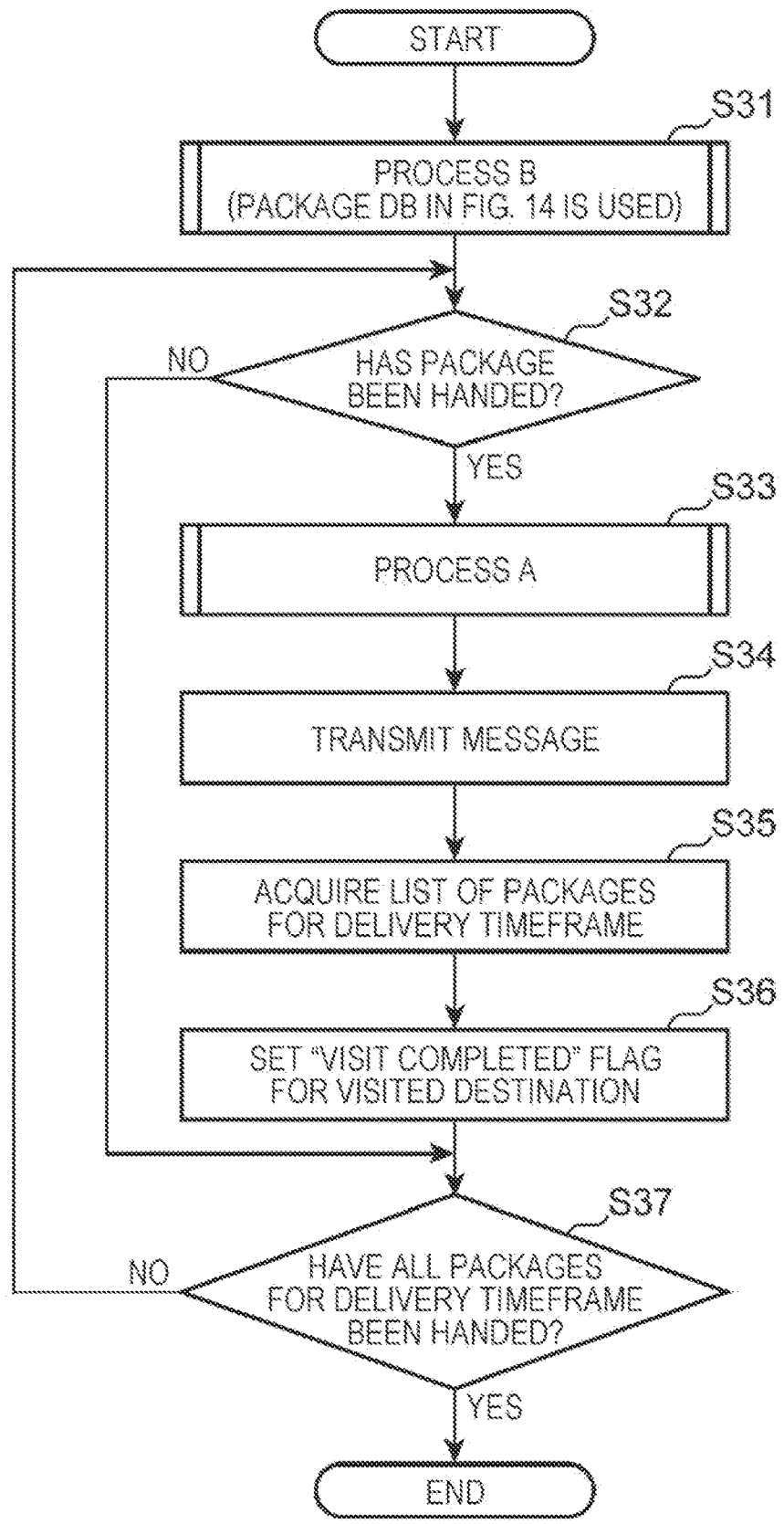
FIG. 15 is a flowchart illustrating an example of a process according to the third embodiment.

FIG. 15 is a flowchart illustrating an example of a process according to the third embodiment. Note that the flow in FIG. 15 starts, for example, at a certain time before a start time of a processing-target delivery timeframe. In S31, Process B is performed. Process B herein is the process from S21 to S25 in FIG. 13. However, in this example, the package database DB14 is used in place of the package database DB12.

In S32, the control section 19 of the server 1 determines whether a package has been handed. When handing a package to a user, a delivery person makes the reading section 34 read a barcode or QR code (registered trademark) on a package ticket so that the delivery person terminal 3 acquires package information and transmit it to the server 1. Thus, if the communication section 15 receives the package information from the delivery person terminal 3, the control section 19 of the server 1 may determine that the package has been handed.

If the package has been handed (YES in S32), the process proceeds to S33; if the package has not been handed yet (NO in S32), the process proceeds to S37. In S33, Process A is performed for a user a package for whom is to be delivered next. In the example in FIG. 14, packages are to be delivered in the order of a GUEST0020 user (hereinafter referred to as user U1) and a GUEST0030 user (hereinafter referred to as user U2). In this case, after a package has been handed to the user U1, Process A is performed for the user U2. Note that the packages in FIG. 14 are sorted in the order of delivery.

In S34, as in S7 in FIG. 8 or S13 in FIG. 9, a message is transmitted to the user U2. In S35, the control section 19 of the server 1 acquires a list of packages for a delivery timeframe from the package database DB14. In this example, a list of packages for the delivery timeframe 13:00-15:00 is acquired. In S36, the control section 19 of the server 1 sets "completed" in the "visit completed" cell of the package for the user U1 so as to set a "visit completed" flag of the corresponding package.

In S37, the control section 19 of the server 1 determines whether all packages for the delivery timeframe have been handed. If all packages have been handed (YES in S37), the process ends; if delivery of all packages is not completed (NO in S37), the process returns to S32, and it is determined whether a package for the next user has been handed.

According to the third embodiment, every time a package is delivered, Process A is performed for a user of the next package, and the first expected arrival time and the first difference are calculated, and a message in accordance with the first difference is transmitted to the user terminal 2 of the corresponding user. Thus, the first expected arrival time of each user may be calculated at timing closer to the first scheduled delivery time, and the first expected arrival time may be calculated with higher accuracy.

Forth Embodiment

In a fourth embodiment, it is determined whether a person living with a user who is a receiver of a package is a borderline customer. FIG. 16 illustrates an example of a data structure of a destination database DB161 and a user database DB162 according to the fourth embodiment. The destination database DB161 includes "destination ID" in place of "user ID" and "user list" in place of "message address" in the destination database DB42. "Destination ID" is an identifier of a destination of a package. "User list" stores user IDs of users living in a destination. In the example of the destination on the first row, user IDs "GUEST0020" and "GUEST0021" are stored in the "user list" cell. This shows that users indicated by these user IDs live in this destination.

The user database DB162 is a database that stores personal information of a user, and a single user is assigned to a single record. Specifically, the user database DB162 stores "user ID", "name", and "message address" in association with one another. Note that the user database DB162 is an example of a customer list.

FIG. 17 illustrates an example of a data structure of a package database DB17 according to the fourth embodiment. The package database DB17 further includes "destination ID" in the package database DB43. Referring to the package database DB17 on the basis of a package ID, a destination ID of a package and a user ID of a receiver of the package are determined, and referring to the user list in the destination database DB161 on the basis of the destination ID, a person living with the user is determined. In addition, referring to the user database DB162 on the basis of user IDs of the determined receiver and the person living with the receiver, message addresses of the receiver and the person living with the receiver are determined.

Figure 18:
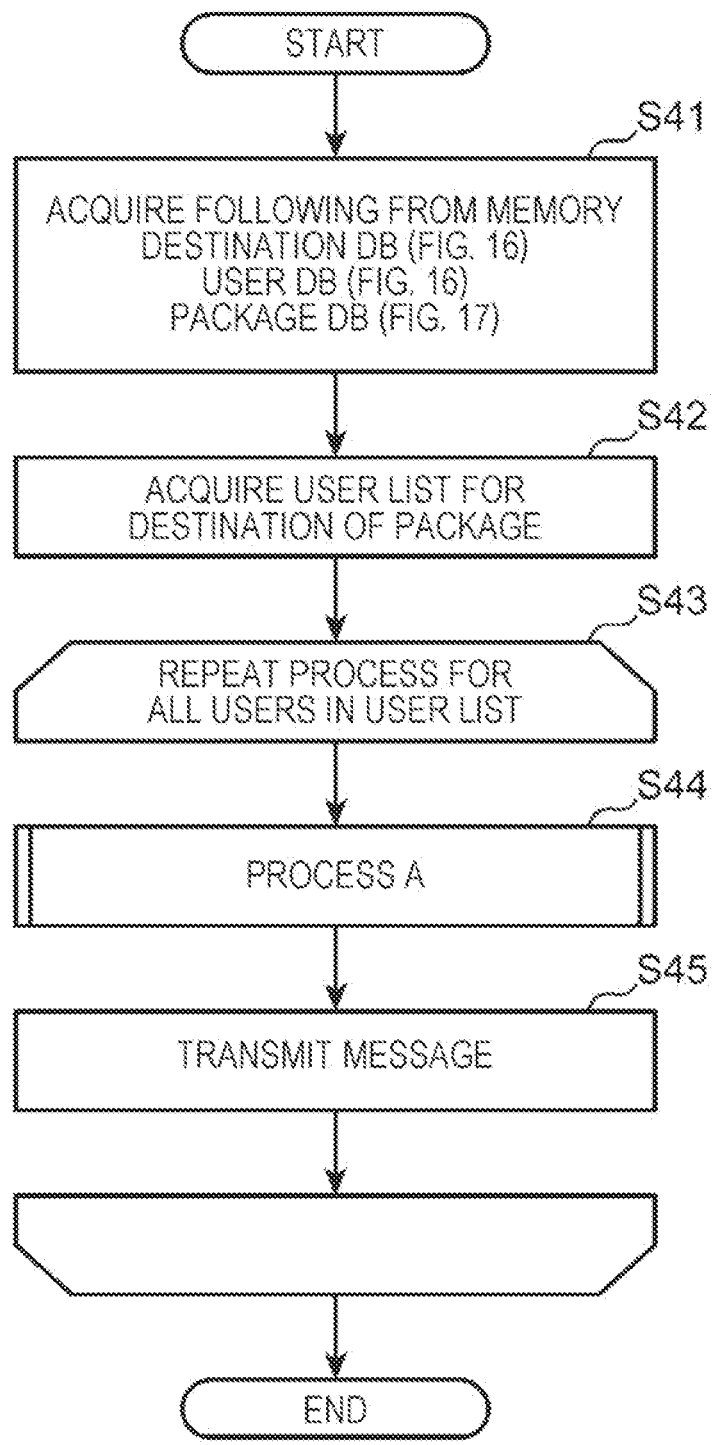
FIG. 18 is a flowchart illustrating an example of a process according to the fourth embodiment.

FIG. 18 is a flowchart illustrating an example of a process according to the fourth embodiment. In S41, the control section 19 of the server 1 acquires the destination database DB161, the user database DB162, and the package database DB17 from the memory 11. In S42, the control section 19 of the server 1 determines the destination ID by referring to the package database DB17 on the basis of the package ID of a target package and acquires a user list by referring to the destination database DB161 on the basis of the determined destination ID. Thus, the receiver and the person living with the receiver who live in the destination of the target package are determined.

In S43, the control section 19 of the server 1 repeats the process in S44 and S45 for all users including the receiver and the person living with the receiver included in the user list acquired in S42. In S44, Process A is performed. Process A is the process in S1 to S6 in FIG. 8. Note that in Process A, a current location of the person living with the receiver is an example of a second current location, and a detection time of the second current location is an example of a second time. In addition, in Process A, the first traveling duration, the first expected arrival time, and the first difference calculated for the person living with the receiver are examples of a second traveling duration, a second expected arrival time, and a second difference, respectively.

In S45, as in S7 in FIG. 8 or S13 in FIG. 9, the message selecting section 18 transmits a message in accordance with the first difference to the user terminal 2 of each user included in the user list by using the communication section 15.

In the above manner, in the fourth embodiment, similarly for the user who is the receiver of the package, the expected arrival time of the person living with the user at the destination is calculated by taking into account the visiting duration at the current location. Thus, the expected arrival time of the person living with the user may also be calculated with high accuracy. In addition, a message in accordance with a comparison result between the first threshold and the first difference is transmitted also to the person living with the user. Thus, even if the receiver is under a condition of being incapable of receiving the package, as long as the person living with the receiver corresponds to a borderline customer, it is possible to appropriately put pressure on the person living with the receiver to encourage them to be at home, thereby increasing the effect of preventing redelivery.

Fifth Embodiment

In a fifth embodiment, even if it is determined that, with the first expected arrival time calculated by using the initial visiting duration, the user is unable to return to the destination before the first scheduled delivery time, in a case where adjustment of the visiting duration causes the user to correspond to a borderline customer, a message encouraging the user to be at home is transmitted.

FIG. 19 illustrates an example of a data structure of a visiting duration database DB19 according to the fifth embodiment. The visiting duration database DB19 further includes "adjustment possible" in the visiting duration database DB41. "Adjustment possible" indicates whether the visiting duration is adjustable. For example, at a grocery store, a user may finish shopping and return home immediately. Thus, in this example, "possible" indicating that the visiting duration is adjustable is stored for "grocery store". On the other hand, at a training gym, it may be difficult to finish training and return home immediately. Thus, in this example, "not possible" indicating that the visiting duration is not adjustable is stored for "gym". Note that the visiting duration being adjustable/not adjustable illustrated in FIG. 19 is an example, and other embodiments may be employed.

Figure 20:
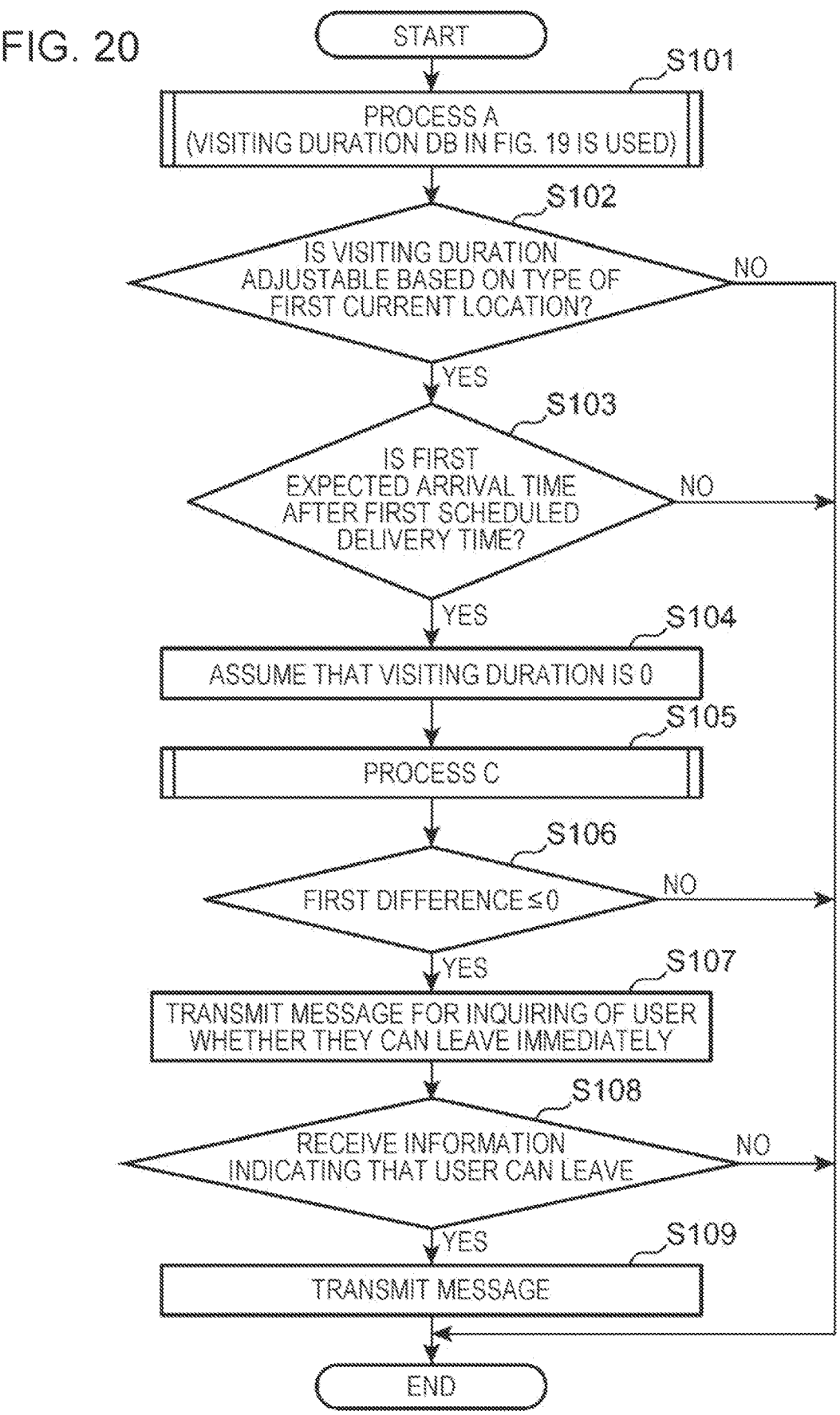
FIG. 20 is a flowchart illustrating a first example of a process in an information providing system according to the fifth embodiment.

FIG. 20 is a flowchart illustrating a first example of a process in an information providing system according to the fifth embodiment. In S101, Process A is performed. Process A is the process in S1 to S6 in FIG. 8. However, in this example, the visiting duration database DB19 is used as a visiting duration database.

In S102, by referring to the visiting duration database DB19, the control section 19 of the server 1 determines whether the visiting duration of a user at the first current location is adjustable. If it is adjustable (YES in S102), the process proceeds to S103; if it is not adjustable (NO in S102), the process ends. In S103, on the basis of a calculation result in S101, the control section 19 determines whether the first expected arrival time is after the first scheduled delivery time. If the first expected arrival time is after the first scheduled delivery time (YES in S103), the process proceeds to S104; if the first expected arrival time is before the first scheduled delivery time (NO in S103), the process ends.

In S104, the control section 19 assumes that the visiting duration determined through Process A is 0. In S105, Process C is performed. Process C is the process in S4 to S6 in FIG. 8. That is, the first traveling duration from the first current location to the destination is calculated, and by adding the first traveling duration to the first time, without adding the visiting duration, the first expected arrival time is calculated again. Subsequently, the first difference between the first expected arrival time and the first scheduled delivery time is calculated again.

In S106, it is determined whether the first difference calculated again is less than or equal to 0. If the first difference is less than or equal to 0 (YES in S106), the process proceeds to S107; if the first difference is greater than 0 (NO in S106), the process ends.

That is, if the first expected arrival time of the user may be changed to be before the first scheduled delivery time by the user finishing spending time at the first current location and returns home immediately, it is determined as YES in S106.

In S107, the message selecting section 18 transmits, to the user terminal 2 by using the communication section 15, a message (second message example) for inquiring of the user whether they are able to leave immediately.

In S108, the control section 19 determines whether the communication section 15 has received, from the user terminal 2, information indicating that the user is able to leave immediately. If the information indicating that the user is able to leave is received (YES in S108), the process proceeds to S109, if no information indicating that the user is able to leave is received (NO in S108), the process ends. In this example, the control section 19 may determine NO in S108 if, within a certain period of time after transmitting the message in S107, the communication section 15 receives information indicating that the user is unable to leave or receives no information.

In S109, the control section 19 sets the first expected arrival time calculated through Process C as the first expected arrival time of the user, and the message selecting section 18 transmits, to the delivery person terminal 3 by using the communication section 15, a message indicating that the user is able to be at home at the first expected arrival time.

Figure 21:
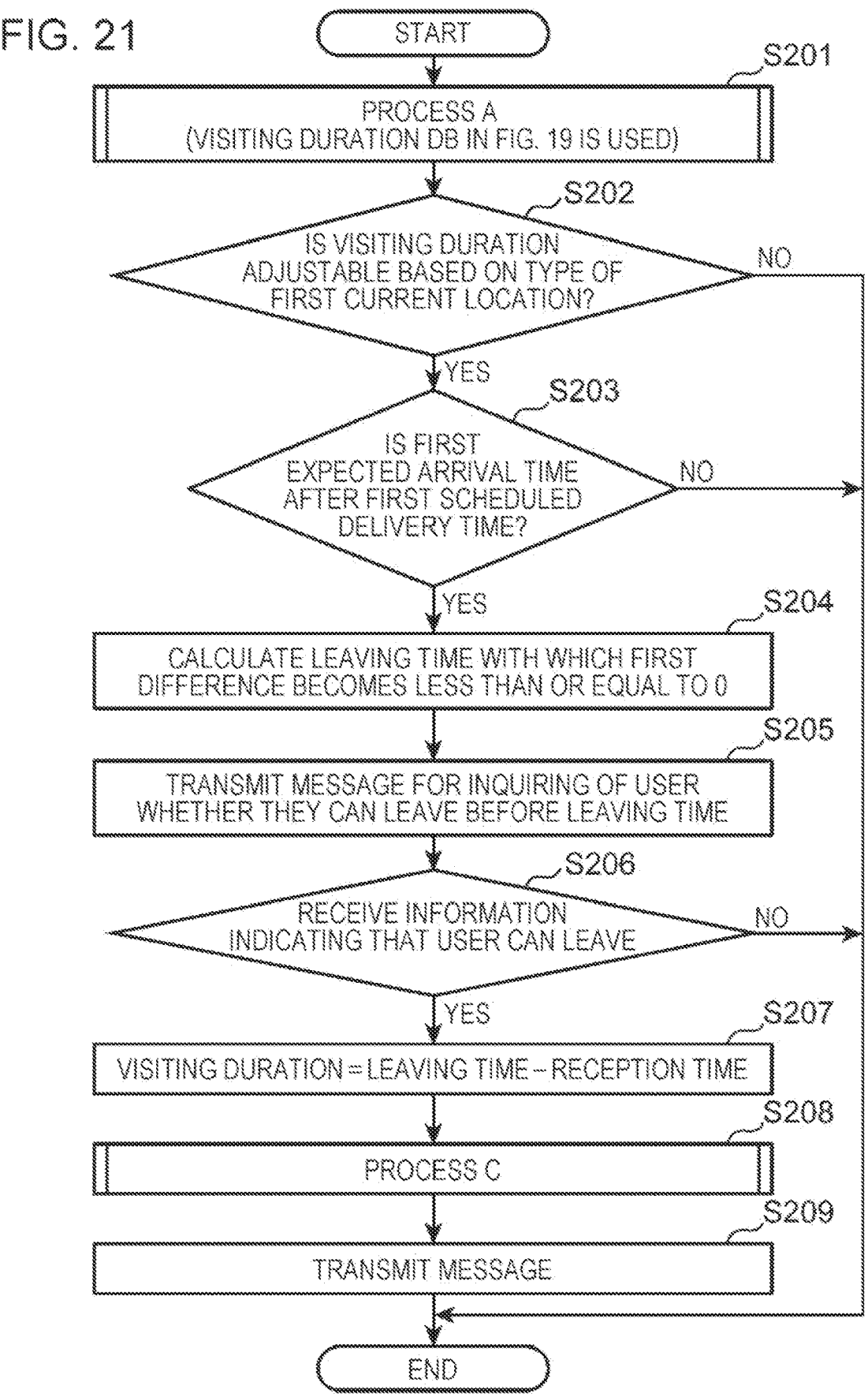
FIG. 21 is a flowchart illustrating a second example of the process in the information providing system according to the fifth embodiment.

FIG. 21 is a flowchart illustrating a second example of the process in the information providing system according to the fifth embodiment. The process in S201 to S203 is the same as the process in S101 to S103 in FIG. 20.

In S204, the control section 19 calculates a leaving time with which the first difference becomes less than or equal to 0 by using the calculation result obtained through Process A. In this example, if a user leaves the first current location at the leaving time, the first expected arrival time becomes before the first scheduled delivery time. Thus, the leaving time is calculated according to the following expression.

Leaving time=First time+(Visiting duration−First difference)

Note that the first time is the time at which the user being at the first current location is detected. The first difference is obtained by subtracting the first scheduled delivery time from the first expected arrival time. In this case, the first expected arrival time is after the first scheduled delivery time according to the determination as YES in S203, the first difference is positive. Note that if a value obtained by subtracting the first difference from the visiting duration is negative, it is not possible to set the first expected arrival time at the first scheduled delivery time. In this case, the process in and after S205 is not performed, and the process ends.

In S205, the message selecting section 18 transmits, to the user terminal 2 by using the communication section 15, a message (second message example) for inquiring of a user whether they are able to leave the first current location before the leaving time.

In S206, the control section 19 determines whether the communication section 15 has received, from the user terminal 2, information indicating that the user is able to leave before the leaving time. If the information indicating that the user is able to leave is received (YES in S206), the process proceeds to S207; if no information indicating that the user is able to leave is received (NO in S206), the process ends. In this example, the control section 19 may determine NO in S206 if, within a certain period of time after transmitting the message in S205, the communication section 15 receives information indicating that the user is unable to leave or receives no information.

In S207, the visiting duration determination section 16 determines that a time obtained by subtracting the information reception time in S206 from the leaving time calculated in S204 is a new visiting duration.

In S208, Process C is performed by using the visiting duration determined in S207. Process C is the process in S4 to S6 in FIG. 8. Thus, the first expected arrival time in a case where the user spends time at the first current location over the new visiting duration and then returns to the destination is calculated.

In S209, the control section 19 sets the first expected arrival time calculated through Process C as the first expected arrival time of the user, and the message selecting section 18 transmits, to the delivery person terminal 3 by using the communication section 15, a message indicating that the user is able to be at home at the first expected arrival time.

Figure 22:
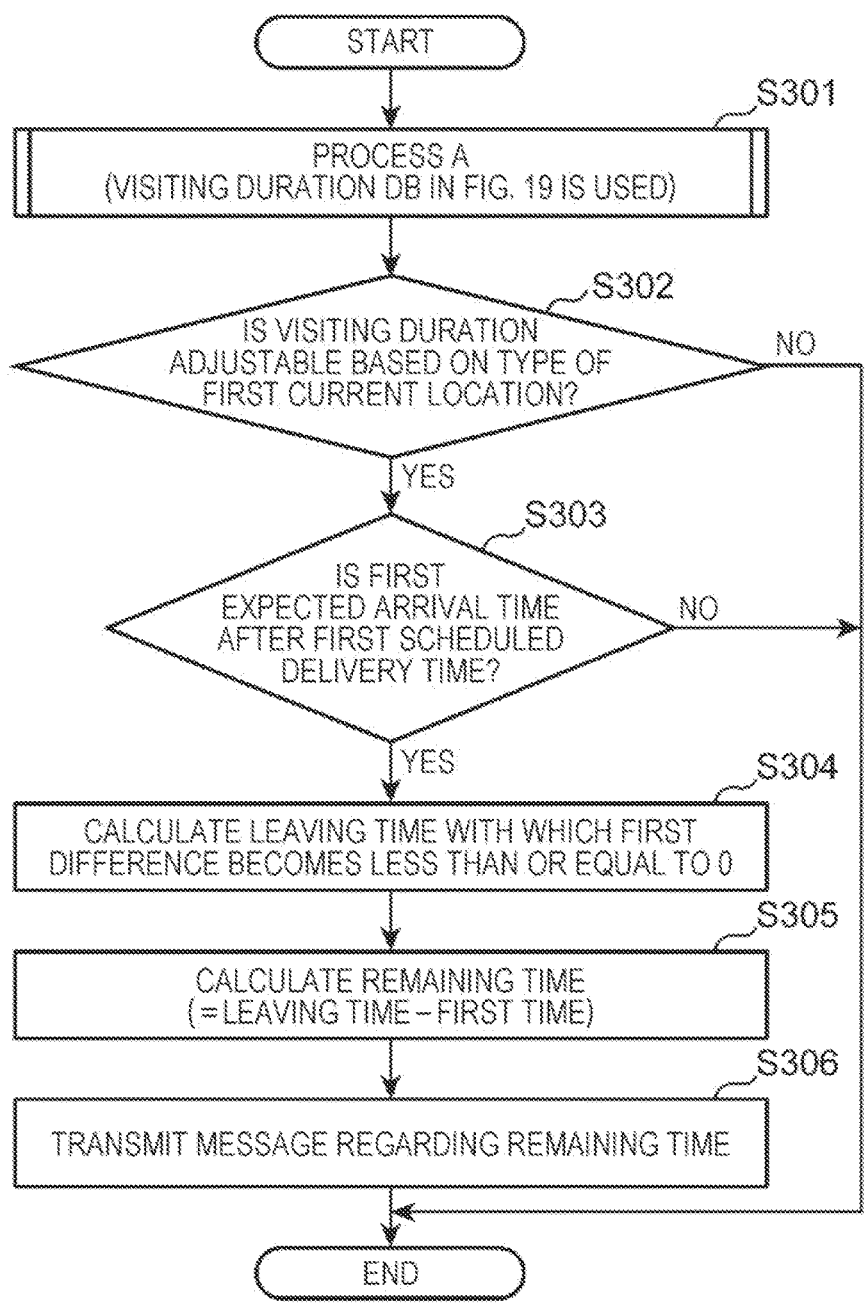
FIG. 22 is a flowchart illustrating a third example of the process in the information providing system according to the fifth embodiment.

FIG. 22 is a flowchart illustrating a third example of the process in the information providing system according to the fifth embodiment. The process in S301 to S304 is the same as the process in S201 to S204 in FIG. 21.

In S305, the control section 19 calculates a remaining duration (second difference example) the user is able to spend at the first current location. The remaining duration in this example is calculated by subtracting the first time from the leaving time calculated in S304.

In S306, the message selecting section 18 transmits the remaining duration to the user terminal 2 by using the communication section 15. Thus, the user is able to know how long they are able to spend time at the first current location in order to receive a package.

In the above manner, according to the fifth embodiment, the user who is able to adjust the visiting duration to make the first difference less than or equal to 0, that is, the user who is able to return to the destination before the first scheduled delivery time, is encouraged to adjust the visiting duration. Thus, redelivery is unlikely to occur.

Sixth Embodiment

In a sixth embodiment, if a user knows of the first scheduled delivery time, the first threshold is set to a small value.

FIG. 23 illustrates examples of data structures of a message transmission history database DB231 and a threshold database DB232 according to the sixth embodiment. The message transmission history database DB231 is a database that stores a transmission history of an advance message (second message example) for notifying a user of a first scheduled delivery time.

The message transmission history database DB231 stores "user ID", "transmission time", "message ID", and "read?" in association with one another. "User ID" is a user ID of a user who is a transmission target of an advance message. "Transmission time" is a transmission time of an advance message. "Message ID" is an identifier of a message transmitted to a user. In this example, the message on the first row in the customer message database DB51 is employed as an advance message. "Read?" is information indicating whether a user has opened an advance message, and "read" is set if the advance message is open, or the cell is blank if the advance message is not open yet. In this example, the advance message is transmitted at a predetermined time that is 24 hours before the scheduled delivery time, for example.

The threshold database DB232 is a database that stores the first threshold that is set in accordance with whether an advance message has been read or is yet to be read. In this example, the first threshold is set to 20 minutes if the advance message is yet to be read or is set to 10 minutes if the advance message has been read (open). However, these values are examples.

Figure 24:
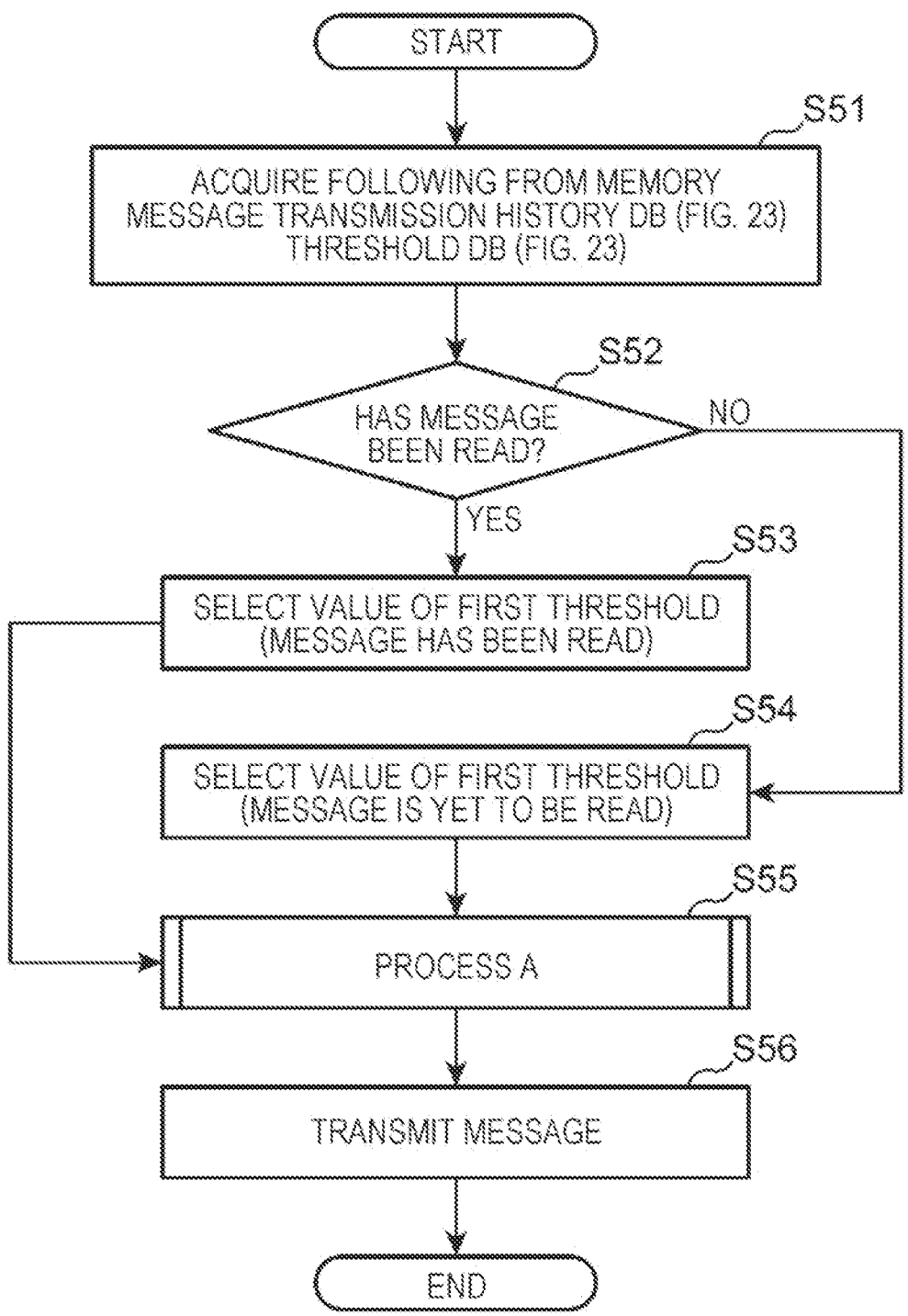
FIG. 24 is a flowchart illustrating an example of a process in an information providing system according to a seventh embodiment.

FIG. 24 is a flowchart illustrating an example of a process in an information providing system according to a seventh embodiment. In S51, the control section 19 of the server 1 acquires the message transmission history database DB231 and the threshold database DB232 from the memory 11.

In S52, by referring to the message transmission history database DB231, the control section 19 determines whether a user of a target package has read an advance message. If the user has read the advance message (YES in S52), the process proceeds to S53; if the user is yet to read the advance message (NO in S52), the process proceeds to S54.

In S53, since the advance message has been read, by referring to the threshold database DB232, the control section 19 selects the first threshold for the message having been read (=10 minutes), and the process proceeds to S55. In S54, since the advance message is yet to be read, by referring to the threshold database DB232, the control section 19 selects the first threshold for the message being yet to be read (=20 minutes), and the process proceeds to S55.

In S55, Process A is performed by using the selected first threshold. Process A is the process in S1 to S6 in FIG. 8. In S56, as in S7 in FIG. 8 or S13 in FIG. 9, a message in accordance with the first difference calculated through Process A is transmitted to the user terminal 2.

The user who has read the advance message knows of the first scheduled delivery time and is considered to be likely to receive a package. Thus, in this embodiment, the first threshold is set to a small value for the user who has read the advance message. Thus, the user is unlikely to be regarded as a borderline customer. This prevents the user from reading a message that is transmitted to a borderline customer.

Seventh Example

In a seventh embodiment, if a sender of a package knows a receiver of the package and they are in a close relationship, the first threshold is set to a large value. The sender knowing the receiver herein includes a family member, a friend, a relative, and the like. FIG. 25 illustrates examples of data structures of an address book database DB251 and a threshold database DB252 according to the seventh embodiment. The address book database DB251 is a database that stores a receiver and a sender who previously sent a package to the receiver in association with each other and includes "address book owner user ID" and "registered user ID". "Address book owner user ID" is a user ID of the receiver, and the "registered user ID" is a user ID of the sender.

In the example in FIG. 25, a user represented as GUEST0050 previously sent a package to a user represented as GUEST0020, and the former user is considered to know the latter user.

The threshold database DB252 is a database that stores the first threshold that is set depending on whether the sender knows the receiver. In this example, the first threshold is set to 30 minutes if the sender knows the receiver, and is set to 20 minutes if the sender does not know the receiver. However, these values are examples.

Figure 26:
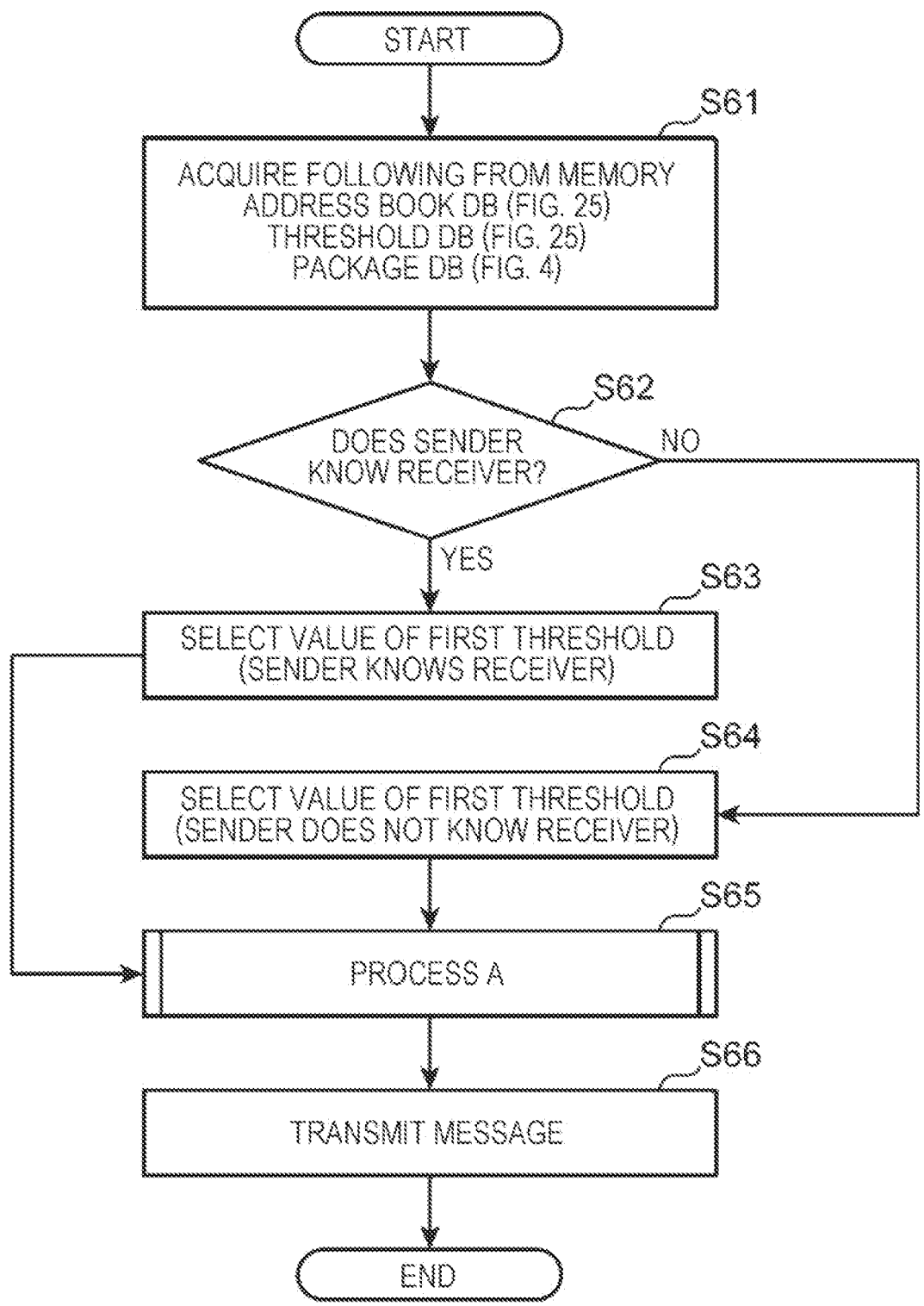
FIG. 26 is a flowchart illustrating an example of a process in the information providing system according to the seventh embodiment.

FIG. 26 is a flowchart illustrating an example of a process in the information providing system according to the seventh embodiment. In S61, the control section 19 of the server 1 acquires the address book database DB251, the threshold database DB252, and the package database DB43 from the memory 11.

In S62, the control section 19 determines whether a sender of a target package knows a receiver thereof. In this example, on the basis of the package database DB43, user IDs of the receiver and the sender of the target package are determined. By referring to the address book database DB251 on the basis of these user IDs, if the user ID of the sender is stored in the "registered user ID" cell, it is determined that the sender knows the receiver. On the other hand, if the user ID of the sender is not stored in the "registered user ID" cell, it is determined that the sender does not know the receiver.

If it is determined that the sender knows the receiver (YES in S62), the process proceeds to S63; if it is determined that the sender does not know the receiver (NO in S62), the process proceeds to S64.

In S63, since the sender knows the receiver, by referring to the threshold database DB252, the control section 19 selects 30 minutes as the first threshold, and the process proceeds to S65. In S64, since the sender does not know the receiver, by referring to the threshold database DB252, the control section 19 selects 20 minutes as the first threshold, and the process proceeds to S65. S65 and S66 are the same as S55 and S56 in FIG. 24.

In the above manner, according to this embodiment, in a case where the sender of the package knows the receiver, the first threshold is set to a larger value than that in a case where the sender of the package does now know the receiver. Thus, the user who is to receive the package from the person who knows the user is likely to be regarded as a borderline customer. Accordingly, the user may be encouraged to receive the important package from the person who knows the user, and the important package is unlikely to be handled as a package for redelivery.

Eighth Embodiment

In an eighth embodiment, the first threshold is changed depending on a package type. FIG. 27 illustrates examples of data structures of a package database DB271 and a threshold database DB272 in an information providing system according to the eighth embodiment. The package database DB271 includes "destination ID" in place of "user ID" and further includes "package type" in the package database DB43. "Package type" is type information indicating the package type, such as "general", "refrigerated", or "golf". "General" indicates that the package is a general package. "Refrigerated" indicates that the package is perishable foods (raw foods). "Golf" indicates that the package is a golf bag.

The threshold database DB272 is a database that stores the first threshold in accordance with the package type. In this example, the first threshold is set to a larger value as the degree of importance for reception is larger.

Figure 28:
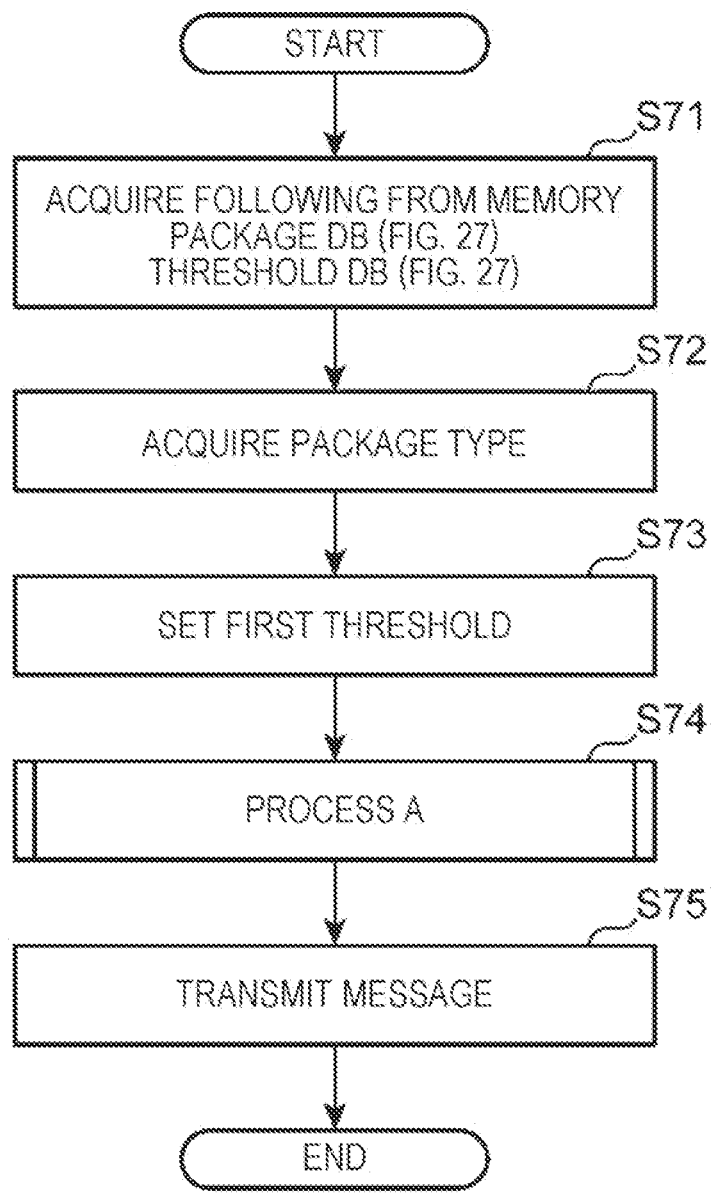
FIG. 28 is a flowchart illustrating an example of a process in the information providing system according to the eighth embodiment.

FIG. 28 is a flowchart illustrating an example of a process in the information providing system according to the eighth embodiment. In S71, the control section 19 of the server 1 acquires the package database DB271 and the threshold database DB272 from the memory 11.

In S72, the control section 19 acquires the package type of a target package from the package database DB271. In S73, the control section 19 sets the first threshold corresponding to the type from the threshold database DB272.

In S74, Process A is performed by using the first threshold set in S73. Process A is the process in S1 to S6 in FIG. 8. S75 is the same as S66 in FIG. 26.

In the above manner, according to this embodiment, for example, if the package has a large degree of importance for reception, such as a golf bag or perishable foods, the user who is the receiver is likely to be regarded as a borderline customer. Thus, the user may be encouraged to receive the package with a large degree of importance for reception, and redelivery is unlikely to occur.

Ninth Embodiment

In a ninth embodiment, the first threshold is changed depending on the size and weight of a package. FIG. 29 illustrates examples of data structures of a package database DB291 and a threshold database DB292 according to the ninth embodiment. The package database DB291 includes "package class" and "weight class" in place of "package type" in the package database DB271. "Package class" indicates a package class determined by a total value of three sides of a package. The total value of three sides of the package is the total value of the height, width, and depth of the package. For example, for a package in a box, the total value of the height, width, and depth of the box is the total value of three sides. For a package other than a box, the total value of the height, width, and depth of a rectangular parallelepiped circumscribing the package is the total value of three sides.

In this example, as the package class, "60" is employed for packages with the total value of three sides being 60 cm or less, "100" is employed for packages with the total value of three sides being greater than 60 cm and 100 cm or less, and "140" is employed for packages with the total value of three sides being greater than 100 cm and 140 cm or less.

The weight class indicates the class of a package determined by the weight of the package. In this example, the weight class is determined as "2 kg or less", "greater than 2 kg and 10 kg or less", and "greater than 10 kg and 15 kg or less".

The threshold database DB292 is a database that stores the first threshold corresponding to a combination of "package class" (second threshold example) and "weight class" (third threshold example). In this example, the first threshold is set to a larger value as the package is larger and as the package is heavier.

Figure 30:
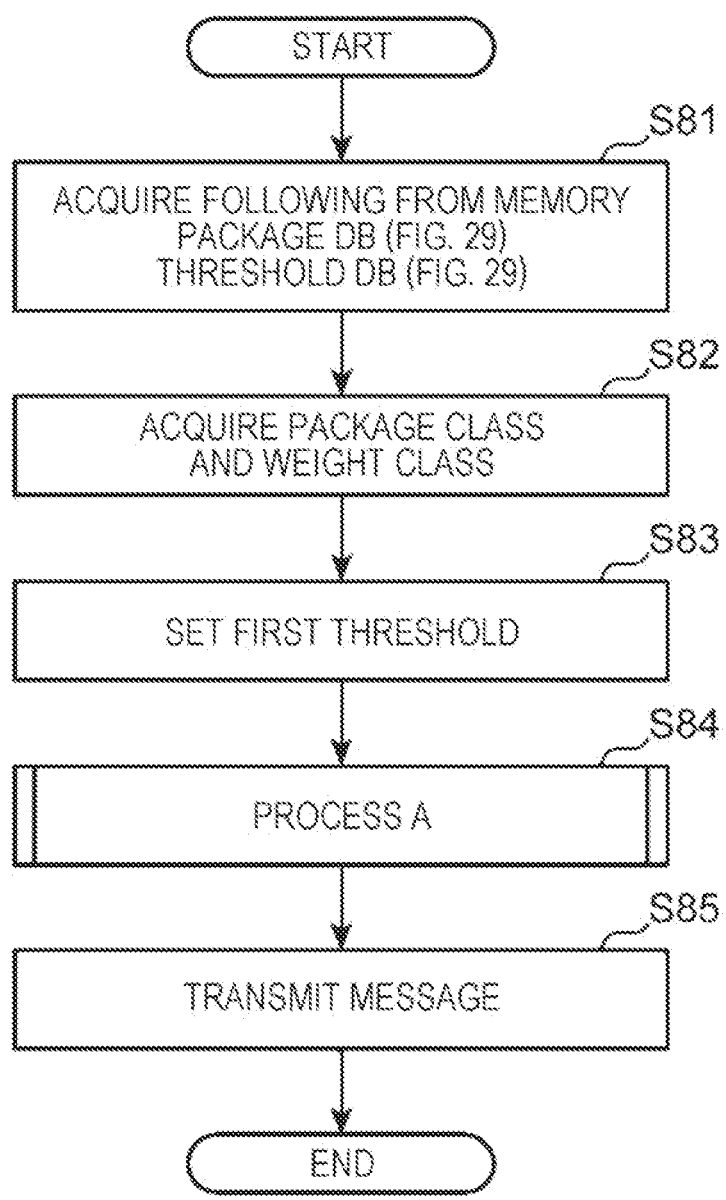
FIG. 30 is a flowchart illustrating an example of a process in an information providing system according to the ninth embodiment.

FIG. 30 is a flowchart illustrating an example of a process in an information providing system according to the ninth embodiment. In S81, the control section 19 of the server 1 acquires the package database DB291 and the threshold database DB292 from the memory 11.

In S82, the control section 19 acquires the package class of a target package and the weight class thereof from the package database DB291. In S83, the control section 19 sets the first threshold corresponding to the package class and the weight class from the threshold database DB292. For example, since the package class on the first row in the package database DB291 is "60" and the weight class thereon is "2 kg or less", the first threshold is set to 20 minutes.

In S84, Process A is performed by using the threshold set in S83. Process A is the process in S1 to S6 in FIG. 8. S85 is the same as S66 in FIG. 26.

In the above manner, according to this embodiment, the first threshold is set to a large value for a large and heavy package. Thus, the user who is the receiver of such a package with a high redelivery cost is likely to be regarded as a borderline customer, and this user may be encouraged to receive the package. As a result, the package with a high redelivery cost is unlikely to be redelivered.

Note that the first threshold is determined by using the package class and the weight class in the ninth embodiment. However, the first threshold may be determined by using one of the classes.

Tenth Embodiment

In a tenth embodiment, the first threshold is set to a larger value as it takes a longer time to deliver a package. FIG. 31 illustrates examples of data structures of a package database DB311 and a threshold database DB312 according to the tenth embodiment. The package database DB311 includes "required duration" in place of "package type" in the package database DB271. "Required duration" indicates a duration to deliver a package. In this example, in the "required duration" cell, a duration required to deliver a first package from a delivery center and a duration required after delivery of the previous package to deliver the following package in a delivery order are stored. Note that the required duration is calculated in accordance with a delivery route determined for a delivery car to deliver all packages belonging to a delivery timeframe. The delivery route in this example is calculated by using a route search algorithm by setting a destination of a package belonging to the delivery timeframe on map information.

The threshold database DB312 is a database that stores the first threshold corresponding to "required duration" (fifth threshold example). In this example, the first threshold is set to a larger value as the required duration becomes longer.

Figure 33:
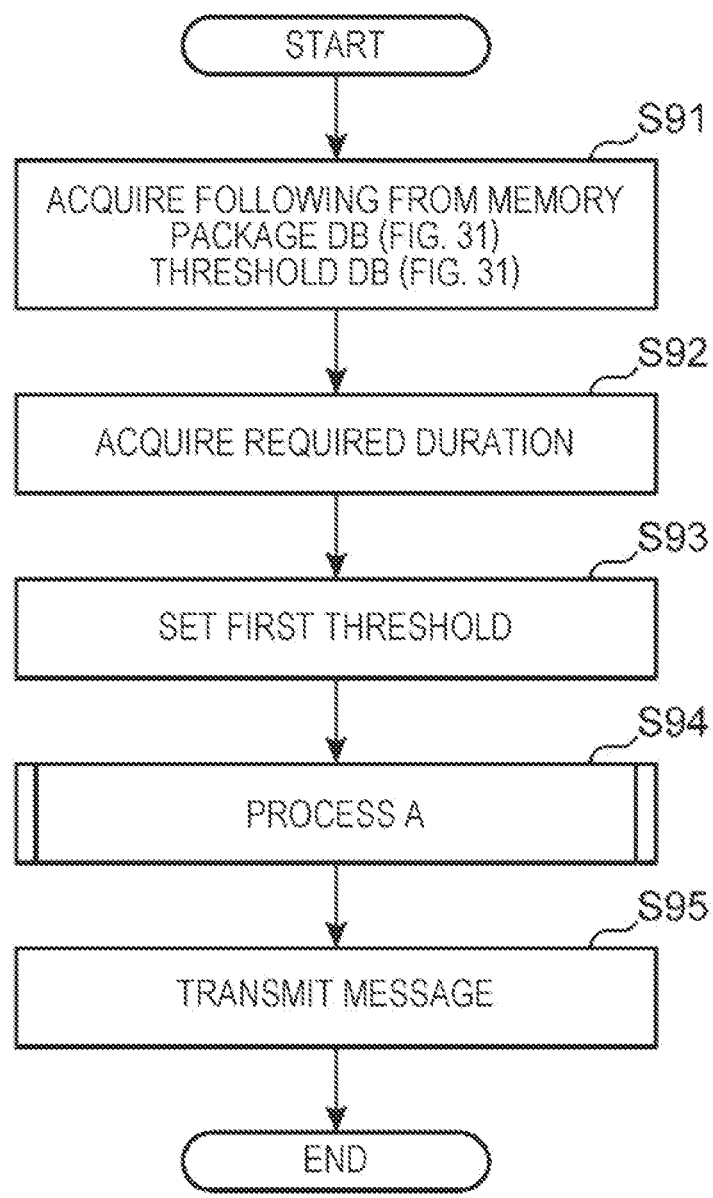
FIG. 33 is a flowchart illustrating an example of a process in an information providing system according to the tenth embodiment.

FIG. 33 is a flowchart illustrating an example of a process in an information providing system according to the tenth embodiment. In S91, the control section 19 of the server 1 acquires the package database DB311 and the threshold database DB312 from the memory 11.

In S92, the control section 19 acquires the required duration of a target package from the package database DB311. In S93, the control section 19 sets the first threshold in accordance with the required duration of the package on the basis of the threshold database DB312. For example, since the required duration of the package on the second row in the package database DB311 is 10 minutes, the first threshold is set to 30 minutes.

In S94, Process A is performed by using the first threshold set in S93. Process A is the process in S1 to S6 in FIG. 8. S95 is the same as S66 in FIG. 26.

Note that in this embodiment, the first threshold may be set in accordance with a delivery distance instead of the required duration. FIG. 32 illustrates examples of data structures of a package database DB321 and a threshold database DB322 according to a modification of the tenth embodiment. The package database DB321 includes "delivery distance" in place of "required duration" in the package database DB311. "Delivery distance" indicates a distance to deliver a package. In this example, in the "delivery distance" cell, a distance to deliver a first package from a delivery center and a distance from a destination of the previous package to a destination of the following package in a delivery order are stored. Note that the delivery distance is calculated in accordance with a delivery route determined for a delivery car to deliver all packages belonging to a delivery timeframe by using a route search algorithm.

The threshold database DB322 is a database that stores the first threshold corresponding to "delivery distance" (fourth threshold example). In this example, the first threshold is set to a larger value as the delivery distance becomes longer.

In the above manner, according to this embodiment, the first threshold is set to a larger value for the package the required delivery duration of which is longer or the delivery distance of which is longer. Thus, the user who is the receiver of such a package with a high redelivery cost is likely to be regarded as a borderline customer, and this user may be encouraged to receive the package. As a result, the package with a high redelivery cost is unlikely to be redelivered.

Eleventh Embodiment

In an eleventh embodiment, the visiting duration is changed depending on a time slot and a day in and on which a user is at the first current location. FIG. 34 illustrates an example of a data structure of a visiting duration database DB34 according to the eleventh embodiment.

The visiting duration database DB34 is a database that stores the visiting duration in accordance with the day and time slot according to the type of the first current location. The visiting duration database DB34 stores "type", "visiting duration (weekdays)", "visiting duration (before 13:00 on weekends and holidays)", and "visiting duration (after 13:00 on weekends and holidays)" in association with one another.

"Type" indicates the type of the first current location. "Visiting duration (weekdays)" indicates the visiting duration on weekdays. "Visiting duration (before 13:00 on weekends and holidays)" indicates the visiting duration on Saturdays, Sundays, and holidays before 13:00. "Visiting duration (after 13:00 on weekends and holidays)" indicates the visiting duration on Saturdays, Sundays, and holidays at and after 13:00.

In this example, considering that the user's schedule has more room on weekends and holidays than on weekdays, the entire visiting durations on weekends and holidays are set to a longer duration than the visiting durations on weekdays. In addition, considering that the user's schedule has more room in the afternoon on weekends and holidays than in the morning on weekends and holidays, the entire visiting durations on weekends and holidays at and after 13:00 are set to a longer duration than the visiting durations on weekends and holidays before 13:00. However, this is an example, and if the visiting duration at the first current location tends to be longer on weekdays than on weekends and holidays, the visiting durations on weekdays may be set to a longer duration than the visiting durations on weekends and holidays. In addition, the visiting duration is not set according to time slot for weekdays in this example. However, the visiting duration may be set according to time slot. Furthermore, the visiting duration is set according to two time slots in this example, which are before 13:00 and at and after 13:00. However, this is an example, and the visiting duration may be set according to three or more time slots. Furthermore, the visiting duration is briefly classified into two categories in this example, which are weekdays and weekends and holidays. However, the visiting duration may be classified according to day, such as Mondays, Tuesdays, Wednesdays, and the like.

Figure 35:
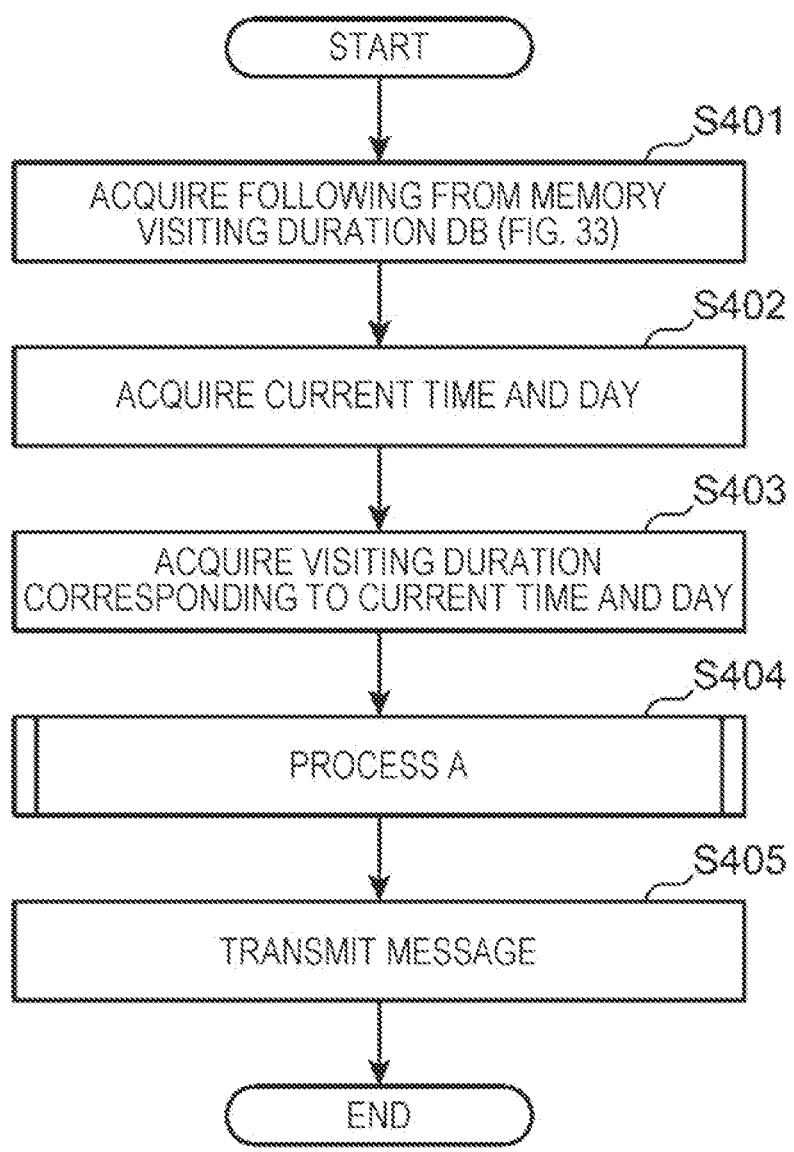
FIG. 35 is a flowchart illustrating an example of a process in an information providing system according to the eleventh embodiment.

FIG. 35 is a flowchart illustrating an example of a process in an information providing system according to the eleventh embodiment. In S401, the control section 19 of the server 1 acquires the visiting duration database DB34 from the memory 11. In S402, the control section 19 acquires the current time and day by using a clock included in the server 1.

In S403, the visiting duration corresponding to the current time and day is acquired from the visiting duration database DB34. For example, if the current time is 10:00 and the day is Saturday, the visiting duration stored in the "visiting duration (before 13:00 on weekends and holidays)" column is acquired. If the day is a weekday, the visiting duration stored in the "visiting duration (weekdays)" column is acquired.

In S404, Process A is performed by using the visiting duration acquired in S403. Process A is the process in S1 to S6 in FIG. 8. S405 is the same as S66 in FIG. 26.

In the above manner, according to this embodiment, since the visiting duration determined according to time slot and day is used, the first expected arrival time may be calculated with higher accuracy. As a result, the package is more unlikely to be redelivered.

Note that although the visiting duration is determined according to time slot and day in the eleventh embodiment, the visiting duration may be determined by using either one of them.

Twelfth Embodiment

In a twelfth embodiment, a different visiting duration is set for each user. FIG. 36 illustrates an example of a data structure of a visiting duration database DB36 according to the twelfth embodiment. The visiting duration database DB36 is a database that stores the visiting duration at the first current location according to user. The visiting duration database DB36 further includes "user ID" in the visiting duration database DB41.

For example, for "grocery store", a user with the user ID "GUEST0020" tends to spend a longer time than a user with the user ID "GUEST0021". Thus, the visiting duration for the former user is set to a longer duration than that for the latter user. In this example, the visiting duration stored in the visiting duration database DB36 may be calculated from a traveling history of each user, or a value set by the user may be employed.

Note that the flow in this embodiment may be the flow in FIG. 35. In this case, the visiting duration database DB41 may be acquired in S401, the user ID of the user at the destination may be acquired in S402, and the visiting duration of the user may be acquired from the visiting duration database DB36 in S403.

In the above manner, according to this embodiment, since the visiting duration determined according to user is used, the first expected arrival time may be calculated with higher accuracy. As a result, the package is more unlikely to be redelivered.

Thirteenth Embodiment

In a thirteenth embodiment, the visiting duration at the first current location is determined on the basis of a previous traveling history of a user. FIG. 37 illustrates an example of a data structure of a visiting duration database DB37 according to the thirteenth embodiment. The visiting duration database DB37 further includes "user ID" in the visiting duration database DB34 and stores visiting durations at first current locations calculated from the previous traveling history of the user.

The visiting duration database DB37 is determined by calculating, for example, from the previous traveling history of each user, an average visiting duration on weekdays, an average visiting duration before 13:00 on weekends and holidays, and an average visiting duration at and after 13:00 on weekends and holidays according to "type" of the place. For example, for a user with the user ID "GUEST0020", the average visiting duration on weekdays for the type "grocery store" is 20 minutes through analysis of their previous traveling history. Thus, "20 minutes" is stored as the visiting duration on weekends on the first row in the visiting duration database DB37. In this manner, for other time slots and other users, the visiting duration in each time slot is calculated by using the previous traveling history.

Although the visiting duration is calculated according to three time slots in the visiting duration database DB37, the visiting duration may be calculated from the previous traveling history according to day, such as Mondays, Tuesdays, Wednesdays, and the like, or the visiting duration may be calculated from the previous traveling history according to day and four or more time slots.

In addition, the control section 19 of the server 1 may manage the traveling history according to user by accumulating, in the memory 11 according to user, location information transmitted from the user terminal 2 on a regular basis.

In the above manner, according to this embodiment, since the visiting duration determined by taking into account the traveling history of the user is used, the first expected arrival time may be calculated with higher accuracy. As a result, the package is more unlikely to be redelivered.

Fourteenth Embodiment

In a fourteenth embodiment, a remaining visiting duration is estimated by taking into account the time elapsed after the user has arrived at the first current location. FIG. 38 illustrates an example of a data structure of a current location database DB39 that accumulates a current location of a user. The current location database DB39 (time-series information example) is a database that stores "time", "user ID", "location information", "current location", and "elapsed time" in association with one another. In this example, the location information of a user with the user ID "GUEST0020" is stored at every minute. In addition, this example indicates that the user arrives at the platform of Oimachi Station at 19:00, arrives at XX yoga studio at Oimachi at 19:20, and arrives at YY store at Oimachi at Note that the "current location" cell stores a place determined by the control section 19 of the server 1 collating the location information transmitted from the user terminal 2 with map information. In addition, the "elapsed time" cell stores the elapsed time after the user has arrived at the place stored in the "current location" cell.

Figure 39:
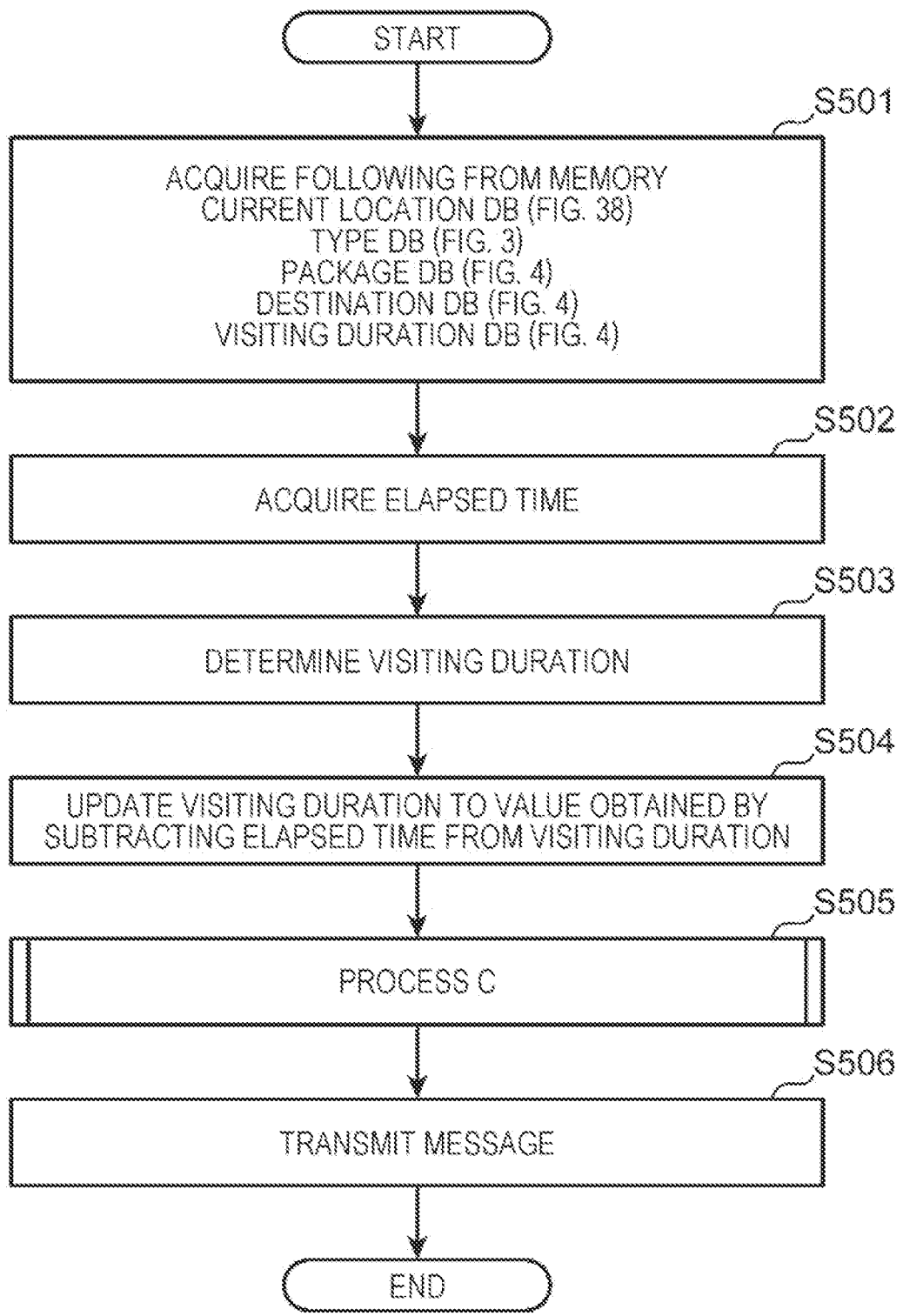
FIG. 39 is a flowchart illustrating an example of a process in an information providing system according to a fourteenth embodiment.

FIG. 39 is a flowchart illustrating an example of a process in an information providing system according to the fourteenth embodiment. In S501, the control section 19 of the server 1 acquires the current location database DB39, the type database DB32, the package database DB43, the destination database DB42, and the visiting duration database DB41 from the memory 11.

In S502, the control section 19 acquires the elapsed time after the user has arrived at the first current location from the current location database DB39. For example, if the current time is 19:01, "1 minute" is acquired as the elapsed time.

In S503, the visiting duration determination section 16 determines the visiting duration in accordance with the type of the first current location by referring to the type database DB32 and the visiting duration database DB41. Since the user is on the platform of Oimachi Station in the above example, the visiting duration "5 minutes" of the type "station" is acquired from the visiting duration database DB41.

In S504, the visiting duration determination section 16 updates the visiting duration to a value obtained by subtracting the elapsed time acquired in S502 from the visiting duration determined in S503. In the above example, the updated visiting duration is "4 minutes", which is a value obtained by subtracting the elapsed time "1 minute" from the visiting duration "5 minutes".

In S505, Process C is performed by using the visiting duration updated in S504. Process C is the process in S4 to S6 in FIG. 8. In S506, as in S7 in FIG. 8 or S13 in FIG. 9, a message in accordance with the first difference calculated through Process C is transmitted to the user terminal 2.

In the above manner, according to this embodiment, the elapsed time after the user has arrived at the first current location is acquired from the current location database DB39, the value (remaining duration) obtained by subtracting the elapsed time from the default visiting duration (the visiting duration stored in the visiting duration database DB41) at the first current location is calculated, and the remaining duration is employed as the visiting duration to calculate first expected arrival time. Thus, the first expected arrival time may be calculated with higher accuracy. As a result, redelivery is unlikely to occur.

Fifteenth Embodiment

In a fifteenth embodiment, a message transmitted to a user corresponding to a borderline customer includes a route list of public transportation used in a case where the user returns to the destination from a first nearest station of the first current location. The route list is information including a list of routes using public transportation by which the user is able to return to the destination before the first scheduled delivery time from the first nearest station by using public transportation. The public transportation includes a railway, a bus, and the like.

Figure 40:
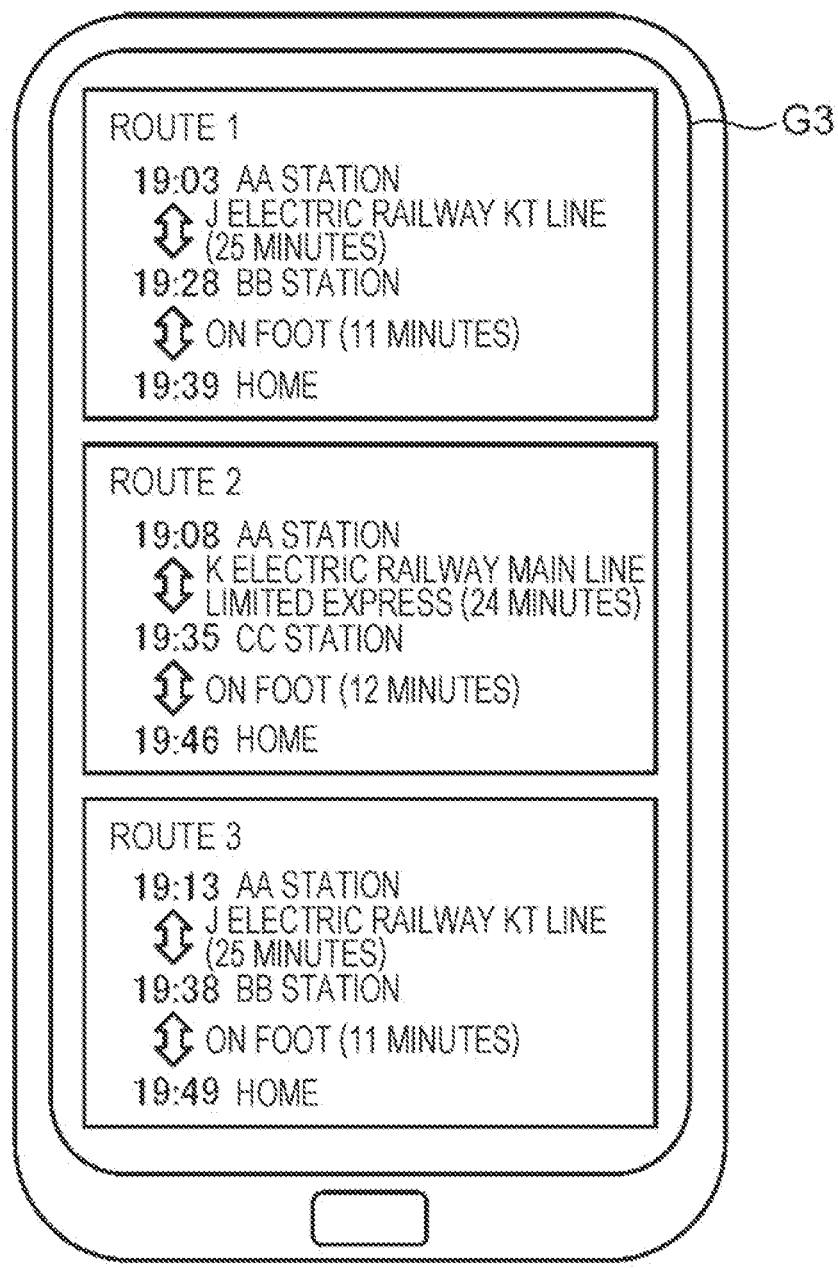
FIG. 40 illustrates an example of a display screen of a route list for a user in a fifteenth embodiment.

FIG. 40 illustrates an example of a display screen G3 of a route list for a user in the fifteenth embodiment. In the example of the display screen G3, "AA Station" is determined as the first nearest station. In addition, the route list includes three routes by which the user is able to return home before a first scheduled delivery time from "AA Station" by using public transportation. The three routes are displayed in the order from the earliest expected arrival time.

For example, by the first route, if the user leaves "AA Station" at 19:03 and travels by a train on KT Line of J Electric Railway for 25 minutes, they will arrive at "BB Station", which is the nearest station of the destination at 19:28 and, by taking 11-minute walk from "BB Station", will arrive at "home", which is the destination, at 19:39.

In addition, by the third route, if the user leaves "AA Station" at 19:13 and travels by a train on KT Line of J Electric Railway, they are able to return home before the first scheduled delivery time.

Thus, by viewing the route list displayed on the display screen G3, the user is able to determine the remaining duration they are able to spend at the first current location. For example, if an important package is to be delivered, the user is able to determine to return home by the first route to have a sufficient time. If the user prefers spending as much time as possible at the first current location, they are able to determine to return home by the third route just in time.

Figure 41:
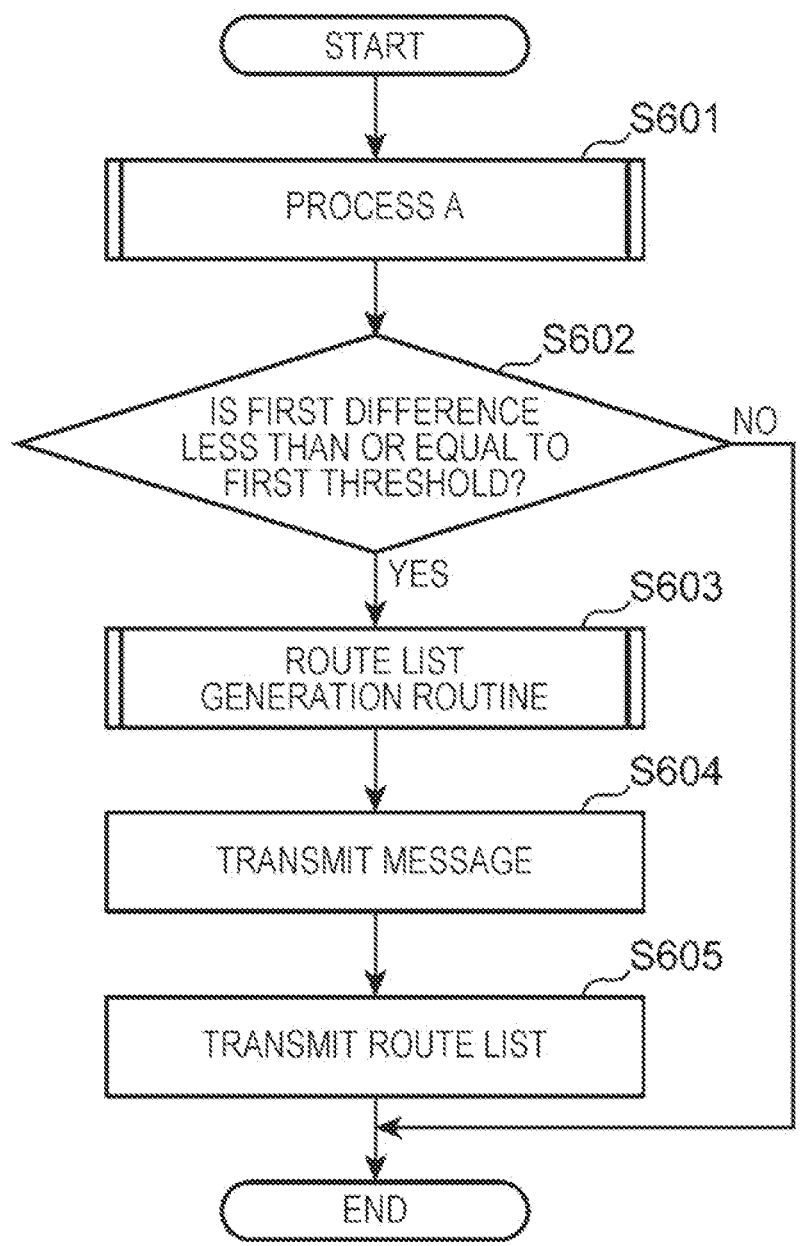
FIG. 41 is a flowchart illustrating an example of a process in an information providing system according to the fifteenth embodiment.

FIG. 41 is a flowchart illustrating an example of a process in an information providing system according to the fifteenth embodiment. In S601, Process A is performed. Process A is the process in S1 to S6 in FIG. 8. In S602, the difference determination section 14 determines whether the first difference calculated through Process A is less than or equal to the first threshold. If the first difference is less than or equal to the first threshold (YES in S602), the process proceeds to S603; if the first difference is greater than the first threshold (NO in S602), the process ends. That is, the process in and after S603 is applied to a user who is determined as a borderline customer.

In S603, a route list generation routine is performed. Details of this process will be described later. In S604, the message selecting section 18 transmits a message requesting a reply indicating whether a user will be at home at the first expected arrival time, illustrated in FIG. 10, to the user terminal 2 by using the communication section 15. In S605, the message selecting section 18 transmits a route list to the user terminal 2 by using the communication section 15.

Figure 42:
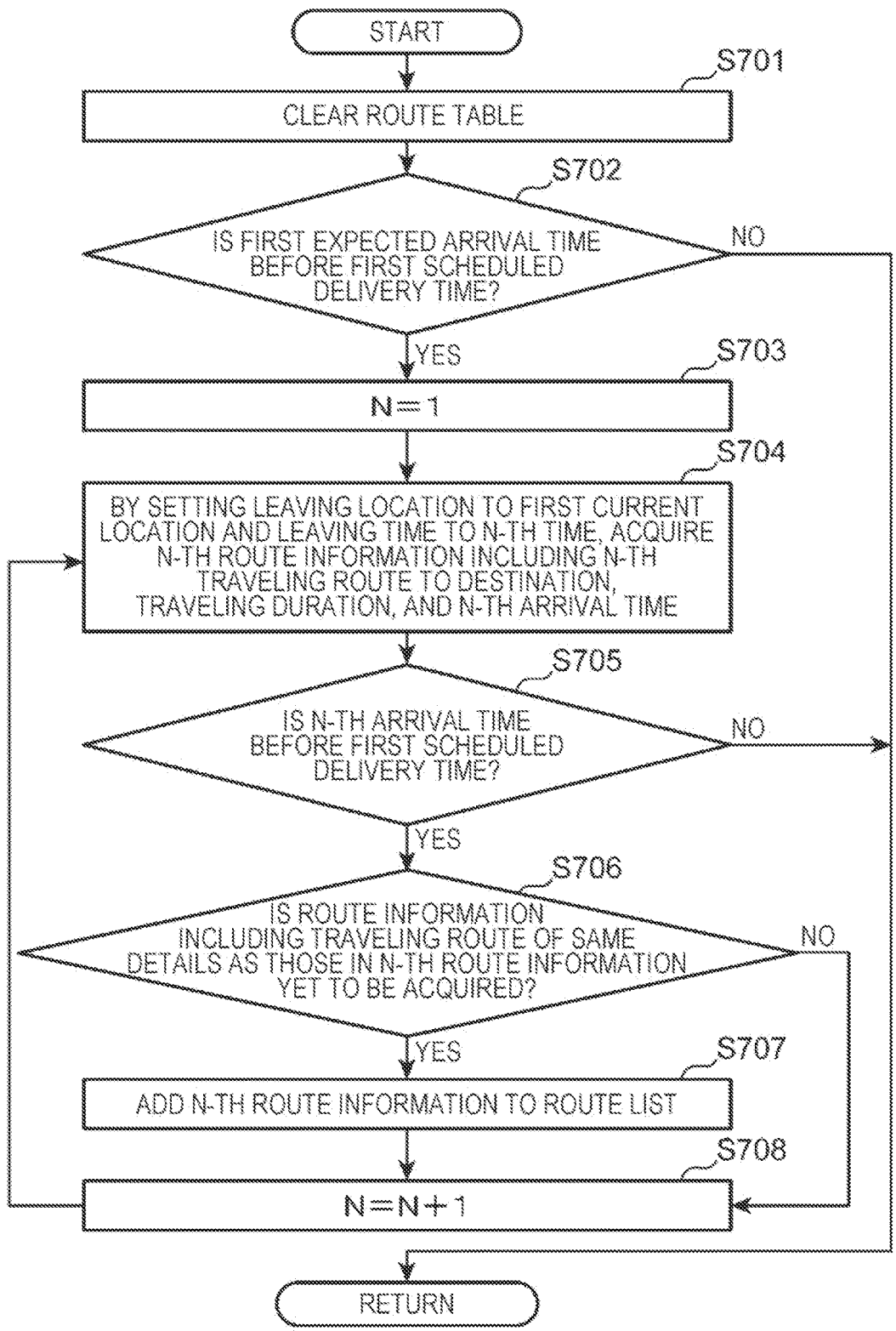
FIG. 42 is a flowchart illustrating details of a route list generation routine.

FIG. 42 is a flowchart illustrating details of the route list generation routine. In S701, the control section 19 clears a route table for storing route information to be included in the route list. In S702, the control section 19 determines whether the first expected arrival time obtained through Process A is before the first scheduled delivery time stored in the package database DB43. If the first expected arrival time is before the first scheduled delivery time (YES in S702), the process proceeds to S703; if the first expected arrival time is after the first scheduled delivery time (NO in S702), the process returns. That is, in this flow, even if a user is a borderline customer, if their first expected arrival time is after the first scheduled delivery time, they are excluded from the process.

In S703, the control section 19 sets a variable N representing the number of loops from S704 to S708 to 1, which is the initial value.

In S704, by setting a leaving location to the first current location and a leaving time to an N-th time, the control section 19 acquires N-th route information including an N-th traveling route to the destination, a traveling duration, and an N-th arrival time.

Specifically, the control section 19 transmits, to a route search site by using the communication section 15, a request for search for a route in which the leaving location is the first current location, the leaving time is the N-th time, and a goal is the destination. Subsequently, by receiving route information transmitted as a response from the route search site, the control section 19 may acquire the N-th route information.

In this example, the response from the route search site includes the first nearest station of the first current location, the leaving time of public transportation from the first nearest station, the details and duration of the public transportation from the first nearest station to a second nearest station of the destination, an arrival time at the second nearest station, a traveling duration from the second nearest station to the destination, and an arrival time at the destination (third expected arrival time example).

In an example of the first route in FIG. 40, the first nearest station is AA Station, the N-th time is 19:03, the traveling route is J Electric Railway KT Line, the traveling duration is 25 minutes, the second nearest station is BB Station, and the N-th arrival time is 19:39.

Note that if a transfer station of public transportation is included between the first nearest station and the second nearest station, the response from the route search site may include the transfer station, an arrival time at the transfer station, and a leaving time from the transfer station. In this case, the display screen G3 may include the arrival time at the transfer station and the leaving time from the transfer station.

In S705, the control section 19 determines whether the N-th arrival time is before the first scheduled delivery time. If the N-th arrival time is before the first scheduled delivery time (YES in S705), the process proceeds to S706. On the other hand, if the N-th arrival time is after the first scheduled delivery time (NO in S705), since the user is unable to return to the destination before the first scheduled delivery time by the route represented by the N-th route information acquired in S704. In this case, since it is no use presenting this route to the user, the process ends.

In S706, the control section 19 determines whether route information including a traveling route of the same details of public transportation as those in the N-th route information is yet to be acquired. Note that the traveling route of the same details of public transportation means the same line and the same time slot of public transportation to take from the first nearest station to the second nearest station.

If YES is determined in S706, the process proceeds to S707; if NO is determined in S706, the process proceeds to S708. In S707, the control section 19 adds the N-th route information to the route list. In S708, the control section 19 increments the variable N by 1, and the process returns to S704.

That is, in this flow, the N-th route information is acquired (S704) while incrementing N in the N-th time, which is the leaving time from the first current location, by 1 (e.g., 1 minute) (S708). Thus, if the N-th time is incremented by 1, it is assumed that route information including a traveling route of the same details of public transportation is successively acquired. Accordingly, this flow provides S706 in which, if route information including a traveling route of the same details of public transportation is acquired, the route information is discarded (NO in S706), preventing routes including traveling routes of the same details of public transportation from being presented to the user.

In this manner, through the flow in FIG. 42, the route list includes the N-th route information by which the user is able to return home before the first scheduled delivery time. Thus, since the route list is transmitted to the user terminal 2 in S605 in FIG. 41, the user terminal 2 may display, on the display section 25, the display screen G3 including the route list by which the user is able to return home before the first scheduled delivery time.

In the above manner, according to this embodiment, the user is notified of the route information, which is the route information of public transportation from the first nearest station to the destination, in which the expected arrival time at the destination is before the first scheduled delivery time. Thus, a material for determining the remaining duration they are able to spend at the first current location may be presented to the user, and redelivery may be prevented more reliably.

Sixteenth Embodiment

Figure 43:
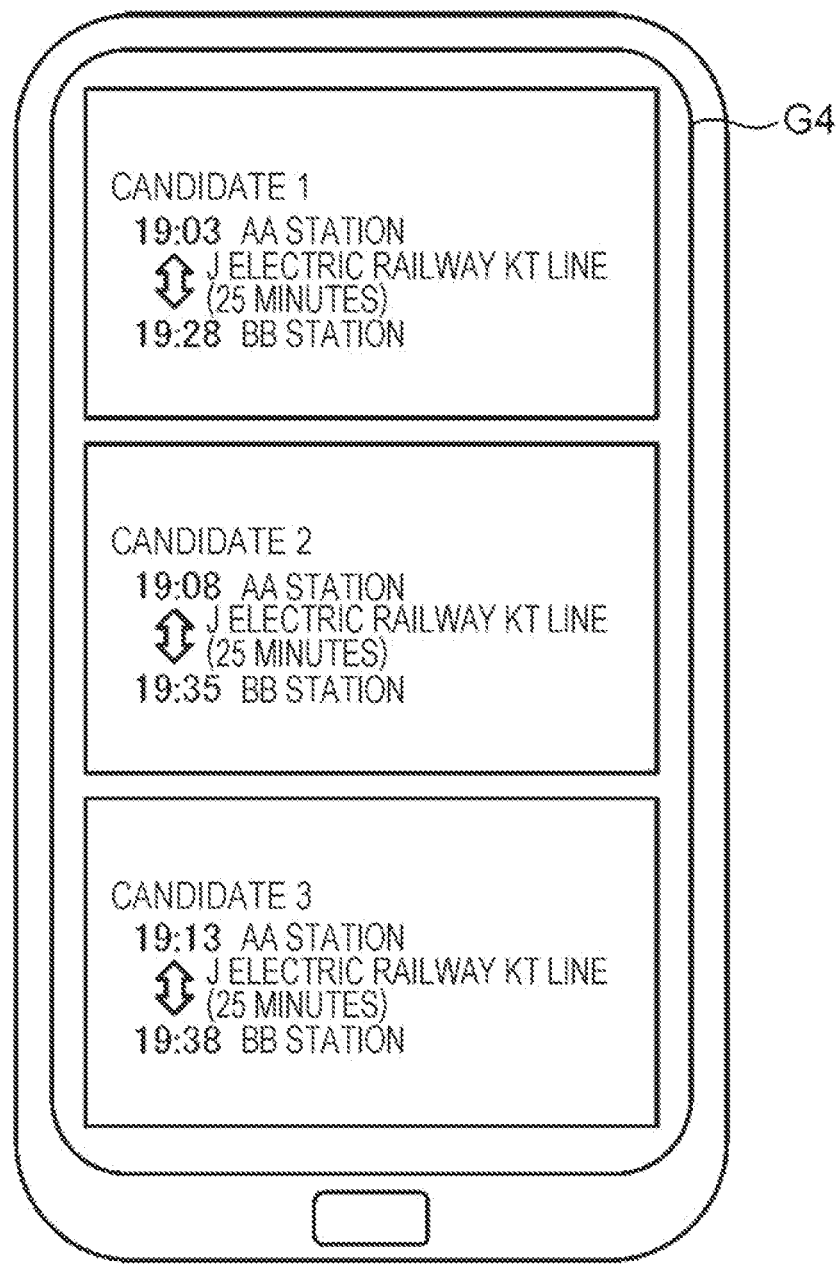
FIG. 43 illustrates an example of a display screen of a route list for a user in a sixteenth embodiment.

In a sixteenth embodiment, the route list including the route using public transportation by which a user is able to return home before the first scheduled delivery time is presented to the user. FIG. 43 illustrates an example of a display screen G4 of the route list for the user in the sixteenth embodiment. The display screen G4 is different from the display screen G3 in displaying route information of public transportation from the first nearest station "AA Station" to the second nearest station "BB Station" and not displaying the traveling duration from the second nearest station to the destination. Note that if a transfer station is included between the first nearest station and the second nearest station, the route list on the display screen G4 may display an arrival time at the transfer station and a leaving time from the transfer station.

FIG. 44 illustrates an example of a data structure of a station information database DB45 according to the sixteenth embodiment. The station information database DB45 is a database that stores station information indicating locations of stations and departure times of public transportation from each of the stations. The station information database DB45 stores "electric railway company", "line name", "station name", "location", "first departure time", "second departure time", and the like in association with one another. In the example on the first row, departure times of KT Line of J Electric Railway at "AA Station" on a day are stored as "first departure time", "second departure time", and the like. The station information database DB45 also stores location information indicating the location of each station by the latitude and longitude. Since "AA Station" also has Main Line of K Electric Railway, departure times of this line on a day are also stored.

Note that in the example in FIG. 44, J Electric Railway KT Line on the "first departure time" column on the successive first and second rows indicates the same train that departs from AA Station at 05:03 and departs from BB Station at 05:28. In addition, K Electric Railway Main Line on the "first departure time" column on the successive fourth and fifth rows indicates the same train that departs from AA Station at 05:50 and departs from CC station at 06:14. The same applies to the other departure time columns.

In addition, the station information database DB45 may store station information about all stations in an area to which the subject information providing service is applied. The area to which the service is applied may be a country, a region, or a prefecture.

Figure 45:
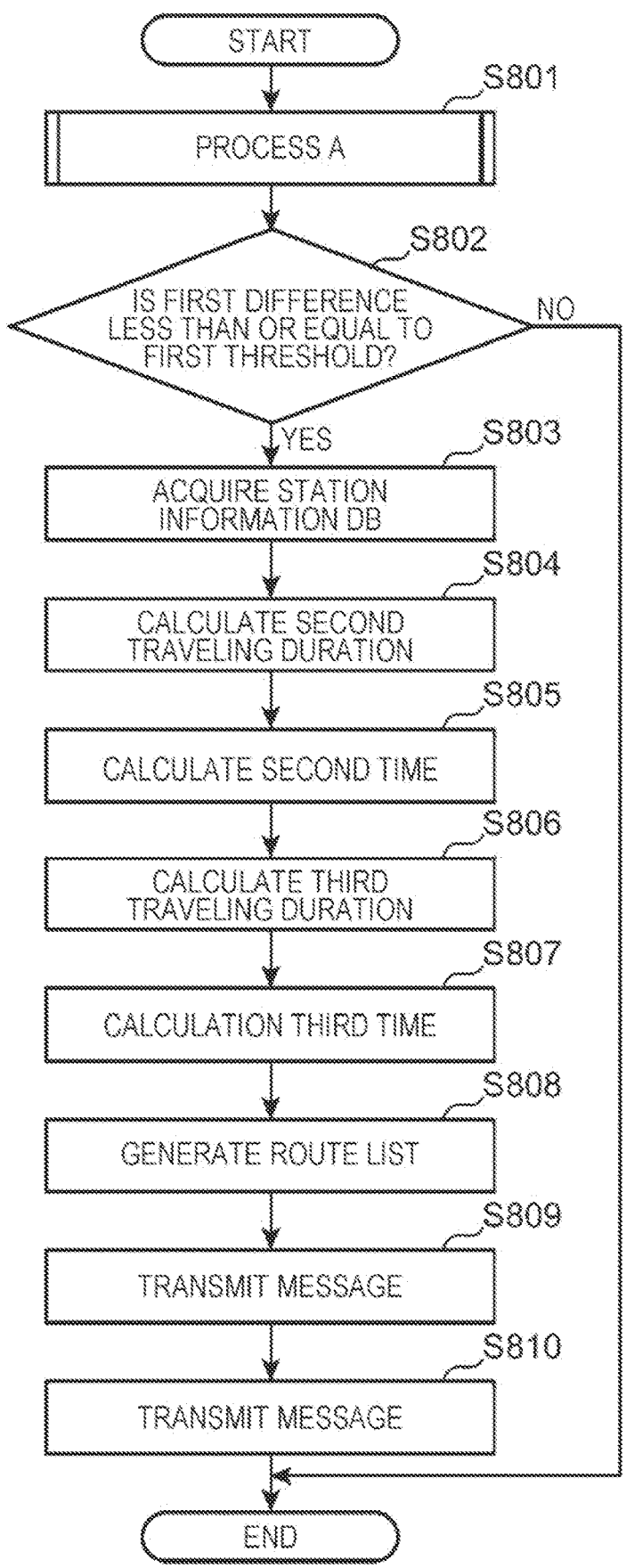
FIG. 45 is a flowchart illustrating an example of a process in an information providing system according to the sixteenth embodiment.

FIG. 45 is a flowchart illustrating an example of a process in an information providing system according to the sixteenth embodiment. In S801, Process A is performed. Process A is the process illustrated in S1 to S6 in FIG. 8. In S802, the difference determination section 14 determines whether the first difference calculated through Process A is less than or equal to the first threshold. If the first difference is less than or equal to the first threshold (YES in S802), the process proceeds to S803; if the first difference is greater than the first threshold (NO in S802), the process ends. That is, the process in and after S803 is applied to a user determined as a borderline customer.

In S803, the control section 19 acquires the station information database DB45 from the memory 11. In S804, the traveling duration calculating section 12 calculates the second traveling duration that is necessary for the user to travel from the first current location to the first nearest station. In this example, first, the traveling duration calculating section 12 collates the location information of the first current location with the location information of each station stored in the station information database DB45 and determines a station that is the nearest to the first current location as the first nearest station. Then, the traveling duration calculating section 12 determines an optimal route from the first current location to the first nearest station from map information and calculates the second traveling duration by dividing the distance of the optimal route by the traveling speed (walking speed in this example) of the user. Note that the traveling duration calculating section 12 may calculate the second traveling duration by assuming that a distance obtained by adding a predetermined margin to a linear distance from the first current location to the first nearest station is the distance of the optimal route.

In S805, the traveling duration calculating section 12 calculates an arrival time at the first nearest station as the second time. In this example, the traveling duration calculating section 12 may calculate the second time by adding the second traveling duration to the first time.

In S806, the traveling duration calculating section 12 calculates a third traveling duration that is necessary for the user to travel from the second nearest station to the destination. In this example, the traveling duration calculating section 12 may collate the location information of the destination with the location information of each station stored in the station information database DB45, determine a station that is the nearest to the destination as the second nearest station, and calculate the third traveling duration by the same method as that for the second traveling duration.

In S807, the traveling duration calculating section 12 calculates a third time at which the user needs to arrive at the second nearest station at the latest by using the third traveling duration and the first scheduled delivery time. In this example, the traveling duration calculating section 12 may calculate the third time by, for example, subtracting the third traveling duration from the first scheduled delivery time or subtracting the predetermined margin from the time.

In S808, by using the station information database DB45, the second time, and the third time, the control section 19 generates a route list including route information of public transportation by which, after departing from the first nearest station at or after the second time, the user is able to arrive at the second nearest station before the third time.

In this example, the control section 19 extracts, from the station information database DB45, all trains on lines that, after departing from "AA Station" at or after the second time, arrive at "BB Station" before the third time. In the example in FIG. 44, the second time is 05:00, and the third time is 06:00. In this case, the train that departs from AA Station at or after 05:00 and that may arrive at BB Station before 06:00 corresponds to a train on KT Line of J Electric Railway that departs from AA Station at 05:03 and that departs from BB Station at 05:28 on the first and second rows and a train on KT Line of J Electric Railway that departs from the AA Station at 05:15 and that departs from BB Station at 05:40 on the first and second rows. Thus, in this case, a route list including two pieces of route information indicating these two trains is generated.

In S809, the message selecting section 18 transmits a message encouraging the user to make a reply indicating whether reception is possible, indicated on the second row in the customer message database DB51, to the user terminal 2 by using the communication section 15.

In S810, the message selecting section 18 transmits the route list generated in S808 to the user terminal 2 by using the communication section 15. Thus, the display screen G4 is displayed on the user terminal 2. In the above manner, according to this embodiment, the user is notified of the route information of public transportation by which, after departing from the first nearest station at or after the second time at which the user arrives at the first nearest station, the user is able to arrive at the second nearest station before the third time at which the user needs to arrive at the second nearest station at the latest. Thus, this configuration may present a material for determining when to arrive at the first nearest station to the user, and redelivery may be prevented more reliably.

Note that in this embodiment, the user may be unable to travel from the first nearest station to the second nearest station by a single line in some cases. In such a case, the control section 19 extracts, from the station information database DB45, trains on lines and transfer stations by which the user is able to depart from the first nearest station at and after the second time and is able to arrive at the second nearest station before the third time by changing trains. The control section 19 may generate route information including the extracted trains on lines and transfer stations, arrival times at the transfer stations, and departure times from the transfer stations.

Alternatively, in a case where it is determined that the user is unable to travel from the first nearest station to the second nearest station by a single line, the control section 19 may access a route search site and transmit a route search request in which the leaving location is the first nearest station and the leaving time is the second time. Among pieces of route information that is found, the route list may include route information by which the user is able to arrive at the second nearest station before the third time.

Seventeenth Embodiment

In a seventeenth embodiment, expected arrival times of the user at the destination are calculated according to visiting durations of the user assumed at a current location. If the scheduled delivery time of the package is between the expected arrival times, the user is regarded as a borderline customer.

FIG. 46 illustrates an example of a data structure of a type database DB460 according to the seventeenth embodiment. The type database DB460 is a database in which visiting durations at a current location are registered according to user, and a single current location of a single user is associated with a single record. Specifically, the type database DB460 further includes "user ID" and "visiting duration" in the type database DB32 illustrated in FIG. 3. The "visiting duration" cell stores visiting durations of a user at a current location. In this example, the visiting durations include "short" and "long" visiting duration. The "short" cell stores a short visiting duration of the user at the current location. The "long" cell stores a long visiting duration of the user at the current location. In this example, as the short visiting duration and the long visiting duration, durations that are set in advance on the basis of the previous visiting history of the user are employed. The visiting history is created by, for example, the server 1 monitoring the location information of the user terminal 2 as needed. For example, the short visiting duration is the shortest visiting duration in the visiting history of the user at the current location, and the long visiting duration is the longest visiting duration in the visiting history of the user at the current location.

In the example on the first row in the type database DB460, for a user with the user ID "GUEST0020" at "XX English Conversation School in front of YY Station", "8 minutes" is stored as the short visiting duration and "60 minutes" is stored as the long visiting duration. In addition, "English conversation school" is stored as the type of "XX English Conversation School in front of YY Station".

Figure 47:
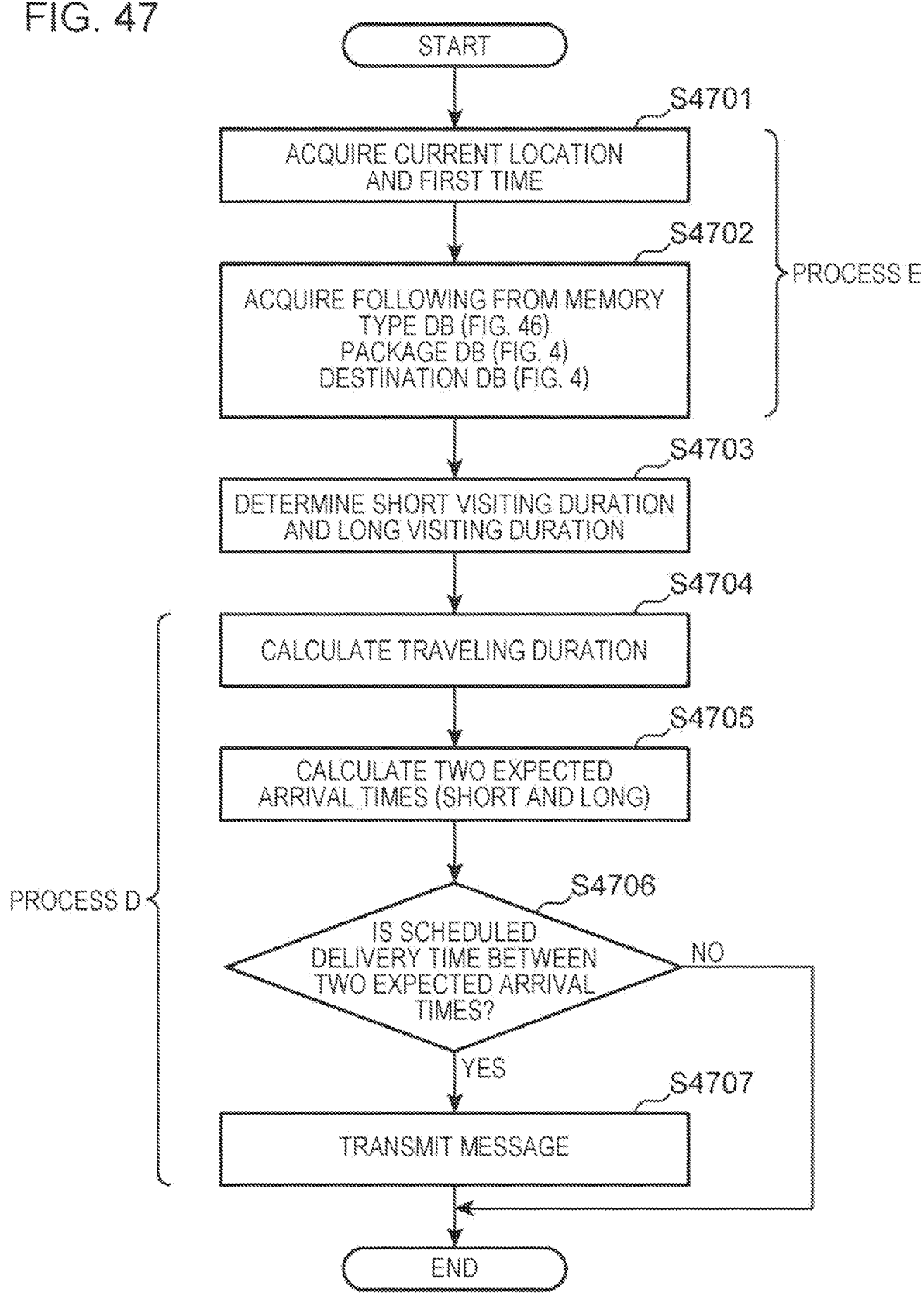
FIG. 47 is a flowchart illustrating an example of a process in an information providing system according to the seventeenth embodiment.

FIG. 47 is a flowchart illustrating an example of a process in an information providing system according to the seventeenth embodiment. In this example, a process for a certain user is illustrated. In addition, this flow starts when the user arrives at the current location. In S4701, the communication section 15 acquires the current location and the first time, which is the detection time of the current location, transmitted from the user terminal 2.

In S4702, the control section 19 acquires the type database DB460, the package database DB43, and the destination database DB42 from the memory 11. In S4703, the visiting duration determination section 16 determines the short and the long visiting durations of the corresponding user at the current location by referring to the type database DB460. For example, if the current location of the user with the user ID "GUEST0020" is "XX English Conversation School in front of YY Station", it is determined that the short visiting duration is "8 minutes", and the long visiting duration is "60 minutes".

In S4704, the traveling duration calculating section 12 calculates a traveling duration that is necessary for the user to travel from the current location acquired in S4701 to the destination. Details of the calculation of the traveling duration are the same as those in S4 in FIG. 8.

In S4705, the expected arrival time calculating section 17 calculates two expected arrival times, which are an expected arrival time (short) corresponding to the short visiting duration and an expected arrival time (long) corresponding to the long visiting duration. Specifically, the expected arrival time calculating section 17 calculates the expected arrival time (short) by adding the short visiting duration determined in S4703 and the first traveling duration calculated in S4704 to the first time. In addition, the expected arrival time calculating section 17 calculates the expected arrival time (long) by adding the long visiting duration determined in S4703 and the first traveling duration calculated in S4704 to the first time.

In S4706, the message selecting section 18 determines whether the scheduled delivery time of a package is between the two expected arrival times, that is, between the expected arrival time (short) and the expected arrival time (long). In this example, the message selecting section 18 may determine the scheduled delivery time of the corresponding package by referring to "scheduled delivery time" in the package database DB43.

If the scheduled delivery time is between the two expected arrival times (YES in S4706), the message selecting section 18 determines that the corresponding user is a borderline customer and transmits a message to the corresponding user (S4707). In this case, the message selecting section 18 transmits a message requesting a reply indicating whether reception is possible, indicated on the second row in the customer message database DB51. On the other hand, if the scheduled delivery time is not between the two expected arrival times (NO in S4706), the message selecting section 18 does not transmit a message, and the process ends.

Although no message is transmitted if NO is determined in S4706 in the above description, the present disclosure is not limited to this. For example, if the scheduled delivery time is before the expected arrival time (short), the user is unlikely to be at home, and thus, the message selecting section 18 may transmit a message for a user who is unlikely to be at home, stored on the third row in the customer message database DB51. On the other hand, if the scheduled delivery time is after the expected arrival time (long), the user is likely to be at home, and thus, the message selecting section 18 may transmit a message for a user who is likely to be at home, stored on the first row in the customer message database DB51.

In the above manner, according to this embodiment, the two expected arrival times are calculated by taking into account the visiting durations at the current location, and if the scheduled delivery time of the package is between the two expected arrival times, the message is transmitted. Thus, it is possible to appropriately put pressure on the user to encourage them to return to the destination, and redelivery may be prevented effectively. In addition, since the type database DB460 stores two visiting durations according to user, the two expected arrival times may be calculated accurately.

Eighteenth Embodiment

In an eighteenth embodiment, a different type database from the type database in the seventeenth embodiment is used. FIG. 48 illustrates an example of a data structure of a type database DB480 according to the eighteenth embodiment. In the type database DB480, "average" is further added to "visiting duration" in the type database DB460. "Average" is an average visiting duration.

Figure 49:
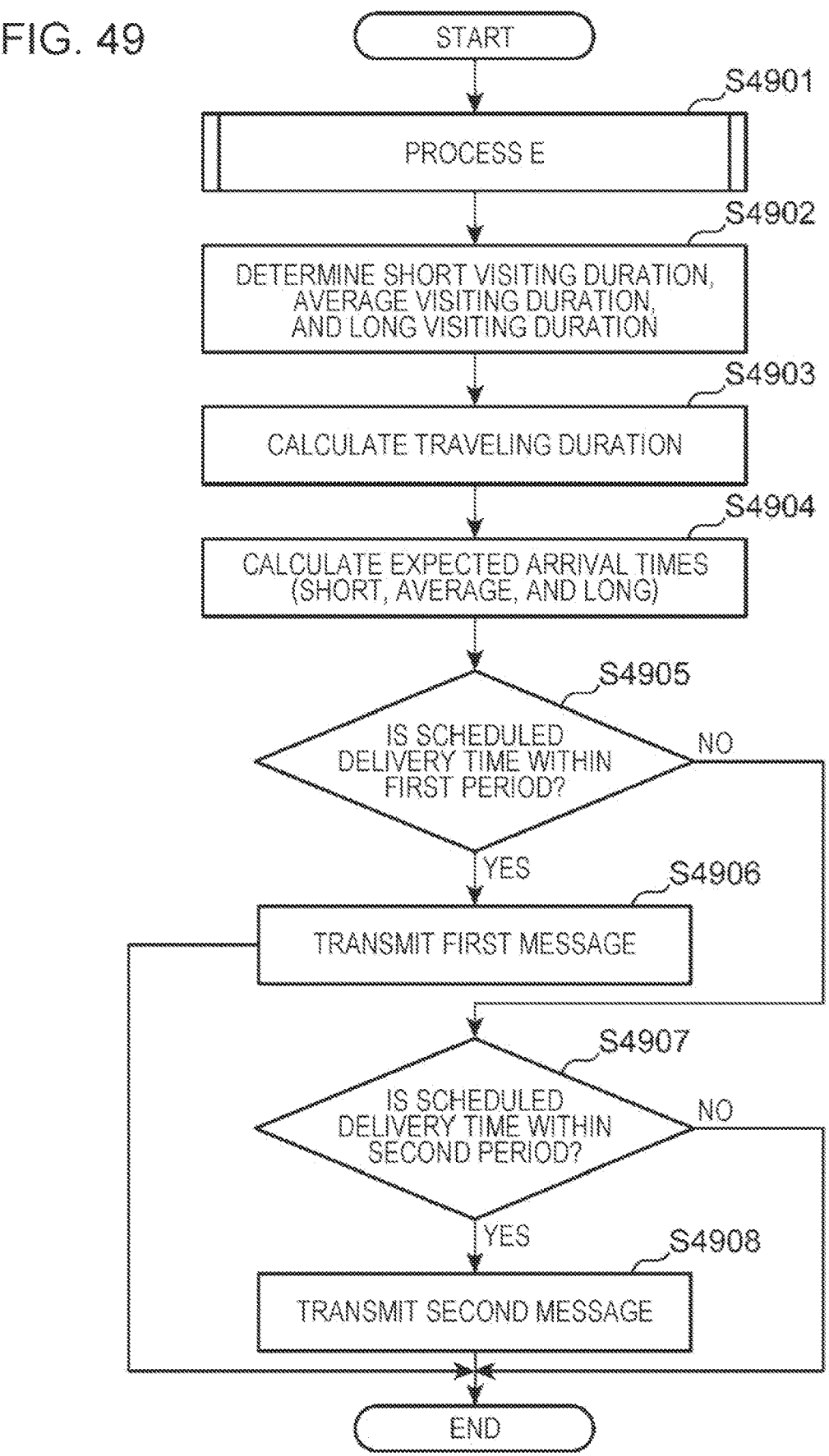
FIG. 49 is a flowchart illustrating an example of a process in an information providing system according to the eighteenth embodiment.

FIG. 49 is a flowchart illustrating an example of a process in an information providing system according to the eighteenth embodiment. In S4901, Process E is performed. Process E is S4701 to S4702 in FIG. 47. However, in S4901, the type database DB480 instead of the type database DB460 is acquired from the memory 21.

In S4902, the visiting duration determination section 16 determines a short visiting duration, an average visiting duration, and a long visiting duration of a corresponding user by referring to the type database DB480. In S4903, as in S4704, the traveling duration calculating section 12 calculates a traveling duration that is necessary for the user to travel from the current location to the destination.

In S4904, the expected arrival time calculating section 17 calculates an expected arrival time (short) corresponding to the short visiting duration, an expected arrival time (average) corresponding to the average visiting duration, and an expected arrival time (long) corresponding to the long visiting duration. In this example, the expected arrival time (average) is calculated by adding the average visiting duration and the traveling duration calculated in S4903 to the first time. Note that the expected arrival time (short) and the expected arrival time (long) are each calculated as in S4705 in FIG. 47.

In S4905, the message selecting section 18 determines whether the scheduled delivery time is within a first period between the expected arrival time (short) and the average. If the scheduled delivery time is within the first period (YES in S4905), the message selecting section 18 transmits a first message to the user terminal 2 of a corresponding user (S4906). On the other hand, if the scheduled delivery time is not within the first period (NO in S4905), the process ends.

In S4907, the message selecting section 18 determines whether the scheduled delivery time is within a second period between the average and the expected arrival time (long).

If the scheduled delivery time is within the second period (YES in S4907), the message selecting section 18 transmits a second message to the user terminal 2 of the corresponding user (S4908). On the other hand, if the scheduled delivery time is not within the second period (NO in S4907), the process ends.

For example, if the scheduled delivery time is within the first period, the user is unlikely to be able to receive a package unless they return home immediately. Thus, a high pressure is preferably put on the user to encourage them to return home. On the other hand, if the scheduled delivery time is within the second period, the user is likely to able to return to the destination without returning home immediately. Thus, the pressure to encourage them to return home may be lower than that in a case where the scheduled delivery time is within the first period.

Accordingly, in this embodiment, in both cases where the scheduled delivery time is within the first period and where the scheduled delivery time is within the second period, the message selecting section 18 transmits a message requesting a reply indicating whether reception is possible to the corresponding user. However, if the scheduled delivery time is within the first period, a first message that puts a high pressure to encourage the user to return home is transmitted compared with a case where the scheduled delivery time is within the second period. An example of the first message is "Package will be delivered at around XX:XX. Will you be at home? You need to return home immediately to receive it.". An example of a second message that is transmitted if the scheduled delivery time is within the second period is "Package will be delivered at around XX:XX. Will you be at home? You need to return home early to receive it.".

In the above manner, according to the eighteenth embodiment, the first message or the second message with a different pressure to encourage the user to return home is transmitted depending on whether the scheduled delivery time is within the first period or the second period. Thus, the user is able to know of the urgency to travel from the current location to the destination. As a result, it is possible to avoid a situation in which the user leaves the current location unnecessarily early or leaves the current location late to fail to receive the package.

Nineteenth Embodiment

In a nineteenth embodiment, it is determined whether a message is to be transmitted on the basis of a possibility that the user is able to leave the current location immediately in accordance with an elapsed time from the time at which the user has arrived at the current location.

FIG. 50 illustrates an example of a data structure of a type database DB500 according to the nineteenth embodiment. The type database DB500 includes a "possibility that user is able to leave immediately in accordance with elapsed time" cell 501 in place of "visiting duration" in the type database DB460. The type database DB500 stores current locations and the possibility in accordance with the elapsed time at each current location in association with each other according to user. The cell 501 stores the possibility in accordance with the elapsed time in every 10 minutes. For example, for a user with the user ID "GUEST0020", the cell 501 stores the possibility in accordance with the elapsed time, such as "60%" if the elapsed time after arrival at the current location "XX English Conversation School in front of YY Station" is less than or equal to 10 minutes, "12%" if the elapsed time is greater than 10 minutes and less than or equal to 20 minutes, and "3%" if the elapsed time is greater than 20 minutes and less than or equal to 30 minutes. The type database DB500 is generated in advance on the basis of the visiting history of the user illustrated in the following twenty-first embodiment.

Figure 51:
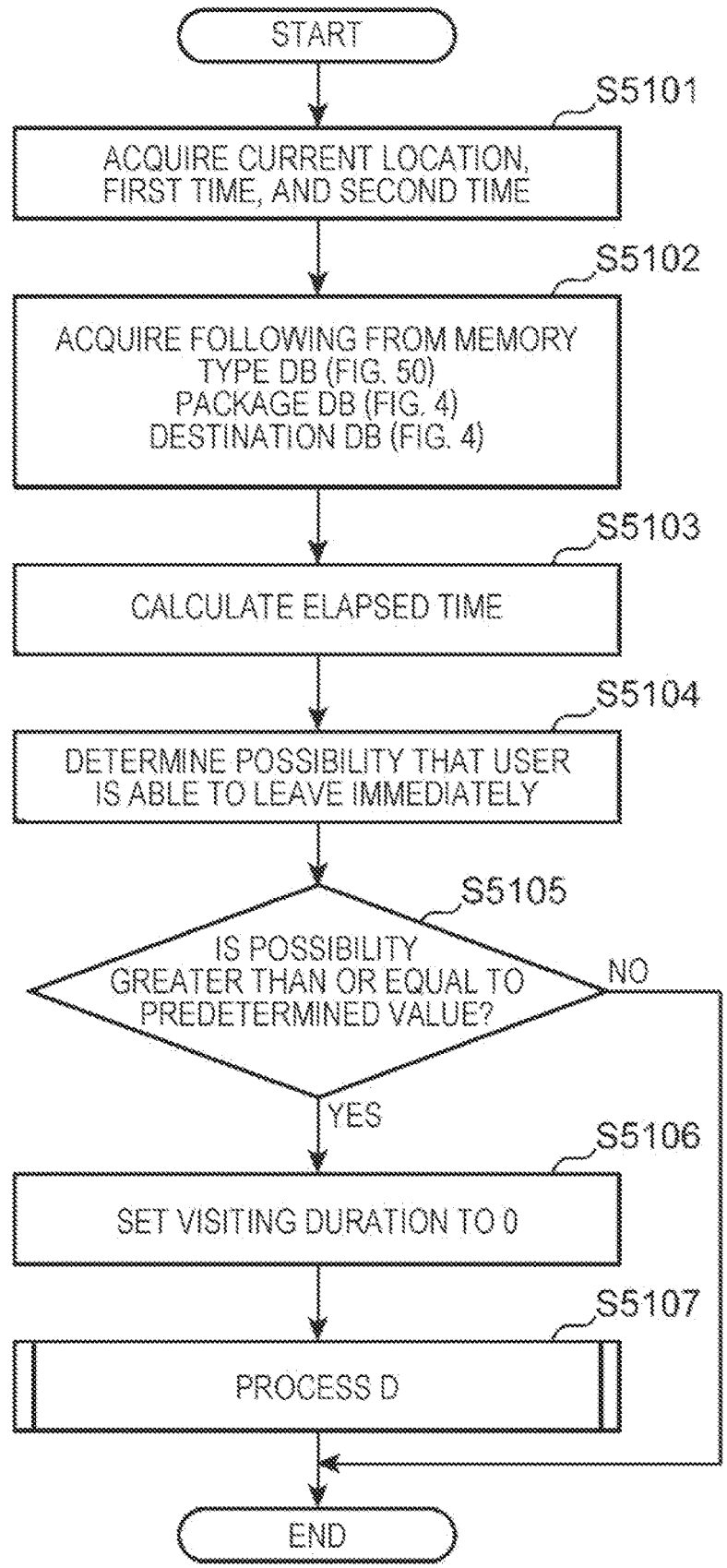
FIG. 51 is a flowchart illustrating an example of a process in an information providing system according to the nineteenth embodiment.

FIG. 51 is a flowchart illustrating an example of a process in an information providing system according to the nineteenth embodiment. In this example, a process for a certain user is illustrated. In S5101, the communication section 15 acquires the current location, the first time indicating the current time, and the second time indicating the time at which the user has arrived at the current location, transmitted from the user terminal 2.

In S5102, the visiting duration determination section 16 acquires the type database DB500, the package database DB43, and the destination database DB42 from the memory 11. In S5103, an elapsed time after the user has arrived at the current location is calculated by subtracting the second time from the first time. In S5104, by reading a possibility corresponding to the elapsed time from the type database DB500, the visiting duration determination section 16 determines the possibility that the corresponding user is able to leave the current location immediately.

In S5105, the visiting duration determination section 16 determines whether the determined possibility is greater than or equal to a predetermined value. As the predetermined value, an appropriate value, such as 50%, 60%, 70%, 80%, or 90%, may be employed. If the possibility is greater than or equal to the predetermined value (YES in S5105), the visiting duration determination section 16 determines that the user is able to leave the current location immediately and sets the visiting duration to 0 (S5106). In S5107, Process D is performed, and it is determined if a message is to be transmitted. Process D is the same as S4704 to S4707 in FIG. 47. However, instead of the expected arrival time (short) and the expected arrival time (long), a single expected arrival time (0) calculated by determining that the visiting duration is 0 is employed in S4705 in Process D. In addition, in S4706, a user for whom the expected arrival time (0) corresponds with the scheduled delivery time is regarded as a borderline customer, and a message is transmitted to the user. In this example, the transmitted massage requests a reply indicating whether reception is possible. Note that although the user for whom the expected arrival time (0) corresponds with the scheduled delivery time is regarded as a borderline customer in this example, instead, a user for whom the expected arrival time (0) belongs to a range of the first threshold after the scheduled delivery time or a user for whom the expected arrival time (0) belongs to a range of the first threshold before or after the scheduled delivery time may be regarded as a borderline customer.

In addition, in the above-described eighteenth embodiment, it may be determined whether a message is to be transmitted by employing the expected arrival time (0) calculated in this embodiment instead of the expected arrival time (average).

In addition, although the process ends in S5105 if the possibility is less than the predetermined value (NO in S5105), the present disclosure is not limited to this, and Process D may be performed. In this case, the expected arrival time (0) is not used, and if the scheduled delivery time is between the expected arrival time (short) and the expected arrival time (long), the corresponding user is regarded as a borderline customer.

In the above manner, according to this embodiment, since the expected arrival time is calculated by using the possibility that the user is able to leave the current location immediately in accordance with the elapsed time after the arrival at the current location, an appropriate expected arrival time may be calculated by taking into account the user's visiting characteristics.

Twentieth Embodiment

In a twentieth embodiment, a borderline customer is determined in a different manner from that in the nineteenth embodiment. That is, in S4705 in Process D (S5107) in FIG. 51 in the nineteenth embodiment, the single expected arrival time (0) is employed instead of the expected arrival time (short) and the expected arrival time (long). On the other hand, in the twentieth embodiment, in S4705 in Process D (S5107) in FIG. 51, the expected arrival time (0) is used instead of the expected arrival time (short). That is, in this embodiment, two expected arrival times, which are the expected arrival time (long) and the expected arrival time (0), are employed.

In addition, in S4706, if the scheduled delivery time is between the expected arrival time (0) and the expected arrival time (long), a corresponding user is determined as a borderline customer, and a message is transmitted to the user. In this example, the transmitted message requests a reply indicating whether reception is possible.

Note that in the twentieth embodiment, as in the nineteenth embodiment, if the possibility is less than the predetermined value in S5105 (NO in S5105), Process D may be performed. In this case, the expected arrival time (0) is not used, and if the scheduled delivery time is between the expected arrival time (short) and the expected arrival time (long), the corresponding user is regarded as a borderline customer.

In the above manner, according to this embodiment, since the user for whom the scheduled delivery time is between the expected arrival time (0) and the expected arrival time (long) is regarded as a borderline customer, the borderline customer may be determined appropriately by taking into account the user's visiting characteristics.

Twenty-First Embodiment

In a twenty-first embodiment, the possibility stored in the cell 501 in the type database DB500 is calculated by using the previous visiting history of the user. FIG. 52 illustrates an example of a data structure of a visiting history database DB520 according to the twenty-first embodiment. The visiting history database DB520 is a database that stores the visiting history of the user at the current location chronologically, and a single visiting history is stored in a single record. Specifically, the visiting history database DB520 stores "user ID", "current location", "arrival time and date", "type", and "visiting duration" in association with one another. "User ID" is an identifier of a user. "Current location" is a place visited by the user. "Arrival time and date" is the time and date at and on which the user arrives at the current location. "Type" is the type of the current location. "Visiting duration" is the visiting duration of the user at the current location.

For example, on the first row, information indicating that a user with the user ID "GUEST0020" arrives at an English conversation school A at 17:58 on Nov. 5, 2017, and spends 65 minutes is stored.

Figure 53:
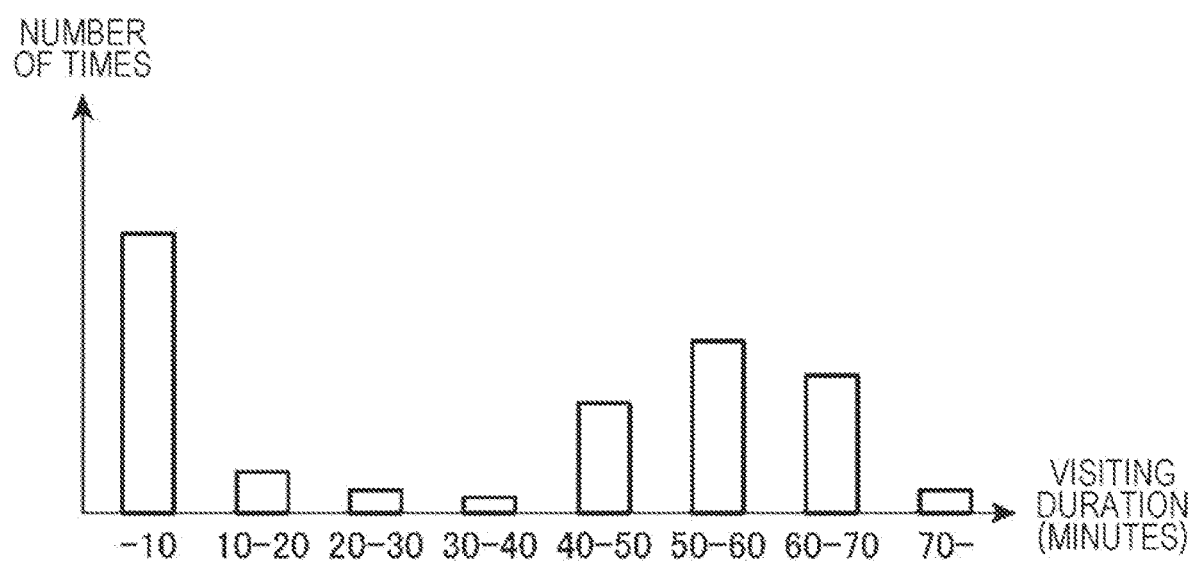
FIG. 53 is a histogram calculated by using the visiting history database.

FIG. 53 is a histogram calculated by using the visiting history database DB520. In this example, a histogram of the visiting duration of the user with the user ID "GUEST0020" at the English conversation school A is illustrated. In this histogram, the horizontal axis indicates the visiting duration of the user at the English conversation school A, and the vertical axis indicates the number of times of the visiting duration obtained when the visiting duration is classified into levels at 10-minute intervals. This histogram indicates that the number of times of the visiting duration of the user at the English conversation school A peaks first at 10 minutes, and after 10 minutes, the number of times largely decreases. After 40 minutes, the number of times increases and peaks again at 50 minutes. After 70 minutes, the number of times largely decreases. The peak at 10 minutes corresponds to the user visiting the English conversation school A to make a reservation of a lesson. The peak at 50 minutes corresponds to the user visiting the English conversation school A to have a lesson. In this manner, the histogram of the visiting history of the user indicates the user's visiting characteristics.

The possibility that "user is able to leave immediately" in a level may be obtained by dividing "total number of times in the level" by "total number of times in all levels higher than or equal to the level".

For example, if the visiting duration is 25 minutes, the possibility is obtained by dividing the number of times in the level "20-30" by the total number of times in the levels "20-30", "30-40", "40-50", . . . , and "70-". In this manner, the possibility in each level is calculated and stored in the cell 501 in the type database DB500.

In the above manner, according to this embodiment, when the possibility in the cell 501 in the type database DB500 is calculated, the previous visiting history of the user is used. Thus, the possibility may be calculated accurately.

Twenty-Second Embodiment

In a twenty-second embodiment, an intermediate location via which the user may travel to arrive at the destination is extracted from the traveling route, traveling history, and the like of the user, and expected arrival times are calculated by taking into account visiting durations at the intermediate location.

FIG. 55 illustrates an example of a data structure of a traveling route database DB550 according to the twenty-second embodiment. The traveling route database DB550 is a database that stores a list of traveling routes frequently used by the user, and a single traveling route of a certain user is assigned to a single record. Specifically, the traveling route database DB550 stores "user ID" and "traveling route" in association with each other. "User ID" is an identifier of the user. "Traveling route" indicates the traveling route of the user.

Figure 54:
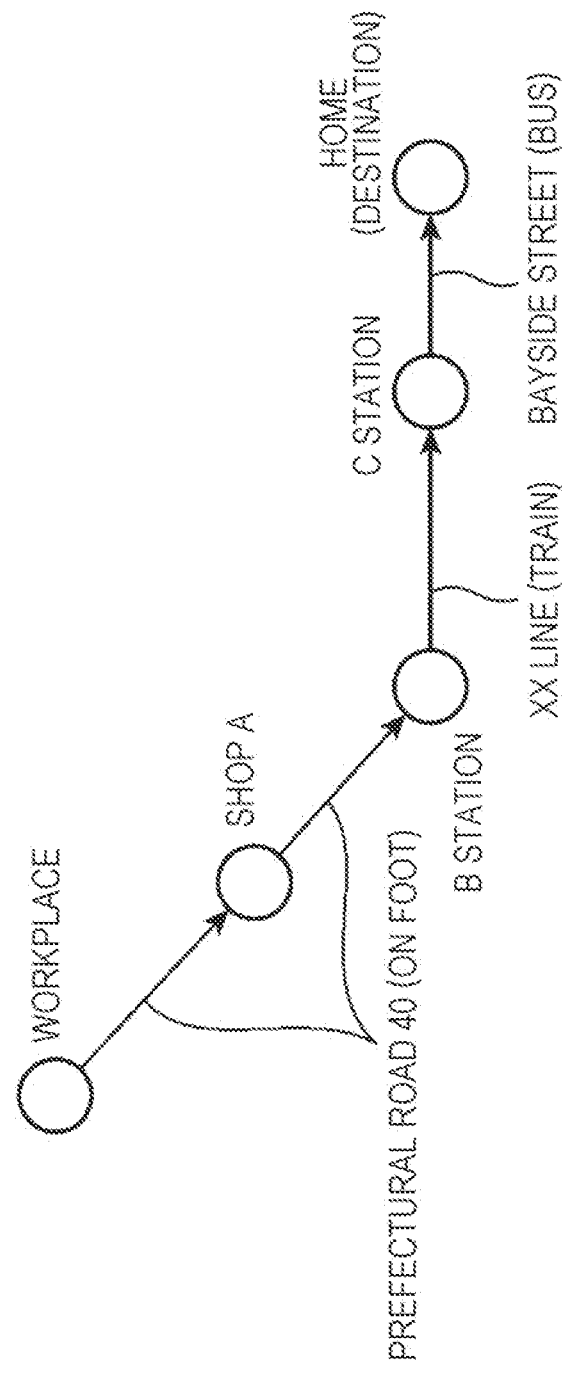
FIG. 54 is a graph indicating a traveling route registered on the second row in the traveling route database by using nodes and edges.

FIG. 54 is a graph indicating the traveling route registered on the second row in the traveling route database DB550 by using nodes and edges. In this traveling route, the use with the user ID "GUEST0020" leaves "workplace", travels along Prefectural Road 40 on foot, arrives at B Station via Shop A, arrives at C Station by taking a train on XX Line, travels along Bayside Street by bus, and arrives home. The traveling routes stored in the traveling route database DB550 are generated in advance by monitoring the traveling history of the user. In this embodiment, as illustrated in FIG. 54, Shop A on Prefectural Road 40 is the intermediate location.

FIG. 56 illustrates an example of a data structure of a traveling history database DB560 that stores the traveling history of a certain user. The traveling history database DB560 is a database that stores the current location of the user chronologically, and stores "user ID", "time and date", and "current location" in association with one another. "User ID" is an identifier of the user. "Time and date" indicates the time and date at and on which the user is at "current location". In this example, since the traveling history is accumulated in every 10 minutes, time/day/month/year in every 10 minutes is stored in "time and date".

"Current location" indicates the location visited by the user. In the example of the traveling history database DB560, a traveling history indicating that the user with the user ID "GUEST0020" is at a workplace at 17:50 on November 2017, a traveling history indicating that the user is at the workplace 10 minutes later, at 18:00, and a traveling history indicating that the user is on Prefectural Road 40 10 minutes later, at 18:10 are stored. In this example, "current location" is, for example, a location determined by collating location information transmitted from the user terminal 2 in every 10 minutes with map information. This location indicates a predetermined area, such as a station, school, workplace, community center, residence, or road on the map information.

The traveling history database DB560 stores a traveling history indicating that the user is on Prefectural Road 40 after leaving the workplace. Thus, when the traveling history database DB560 is collated with the traveling route database DB550, the user is expected to be traveling on the traveling route on the second row. In the traveling route on the second row, a node of Shop A is registered after Prefectural Road 40. Thus, in this case, the user is expected to be traveling toward Shop A. In addition, since Shop A is a location determined in advance as an intermediate location, Shop A is extracted as an intermediate location.

On the other hand, if a most recent traveling history indicating that the user travels along Road 1 on foot after leaving the workplace is obtained, the user is expected to be on the traveling route on the first row or the third row. Furthermore, if the traveling history of the user is accumulated, and if a most recent traveling history indicating that the user travels along Road 246 by bus after leaving C Station is obtained, the user is expected to be on the traveling route on the third row. On the other hand, if a most recent traveling history indicating that the user travels along Bayside Street by bus after leaving C station is obtained, the user is expected to be on the traveling route on the first row. In this manner, in this embodiment, the traveling route stored in the traveling route database DB550 is narrowed down on the basis of the traveling history of the user, and, if a predetermined intermediate location is included as a location after the current location in the narrowed down traveling route, the intermediate location is extracted.

Figure 57:
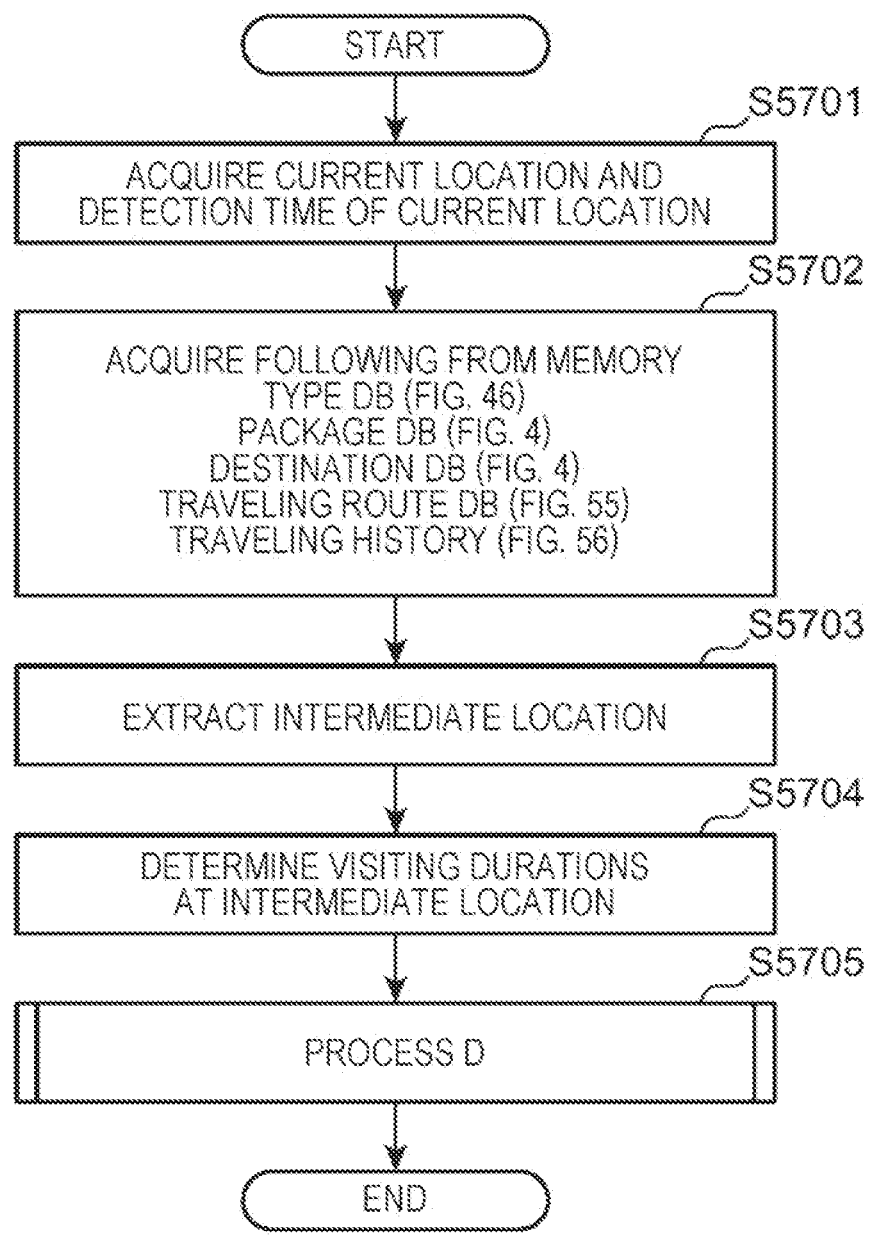
FIG. 57 is a flowchart illustrating an example of a process in an information providing system according to the twenty-second embodiment.

FIG. 57 is a flowchart illustrating an example of a process in an information providing system according to the twenty-second embodiment. In this example, a process for a certain user is illustrated. In addition, for example, this flow is performed each time location information is acquired from the user terminal 2. In S5701, the communication section 15 acquires the current location and the detection time of the current location, transmitted from the user terminal 2. In S5702, the control section 19 acquires the type database DB460, the package database DB43, the destination database DB42, the traveling route database DB550, and the traveling history database DB560.

In S5703, the visiting duration determination section 16 extracts an intermediate location of the user from the traveling history database DB560 and the traveling route database DB550. For example, if the current location acquired in S5701 indicates that the user is on Prefectural Road 40, the visiting duration determination section 16 accumulates a traveling history indicating that in the traveling history database DB560. Subsequently, the visiting duration determination section 16 determines on the basis of the traveling history accumulated in the traveling history database DB560 that the user is currently traveling on Prefectural Road 40 on foot after leaving the workplace. In this case, since the user travels on the traveling route on the second row in the traveling route database DB550 and is currently traveling along Prefectural Road 40 on foot, the visiting duration determination section 16 extracts Shop A as an intermediate location.

In S5704, visiting durations at the intermediate location extracted in S5703 are determined by referring to the type database DB460. In S5705, Process D is performed, and it is determined whether a message is to be transmitted. Process D is the same as S4704 to S4707 in FIG. 47. That is, the expected arrival time (short) and the expected arrival time (long) are calculated from the short visiting duration and the long visiting duration at the intermediate location (Shop A), and, if the scheduled delivery time of a package is between the expected arrival time (short) and the expected arrival time (long), a corresponding user is regarded as a borderline customer, and a message is transmitted to the user.

The expected arrival times are calculated in the following manner, for example. In the example in FIG. 54, if the user is currently located between the workplace and Shop A, first, a traveling duration from the current location to home (destination) via Shop A, B Station, and C Station is calculated. Then, the traveling duration and the short visiting duration at Shop A are added to the current time to calculate the expected arrival time (short). The expected arrival time (long) is calculated in substantially the same manner. In this example, for example, the server 1 may transmit a request for calculating the traveling duration to an external route search system via a network to acquire the traveling duration. Alternatively, the server 1 may calculate the traveling duration by using a route search system included in the server 1.

Although a single intermediate location is present in a single traveling route in the above description, the present disclosure is not limited to this, and intermediate locations may be present in a single traveling route.

For example, in the traveling route on the third row in the traveling route database DB550, D Hospital and E Pharmacy are intermediate locations. In this case, if the user is currently on Road 246, the server 1 calculates a traveling duration from the current location to home via D Hospital, E Pharmacy, and Bayside Street. Subsequently, by referring to the type database DB460, the server 1 acquires short visiting durations and long visiting durations at D Hospital and E Pharmacy. Subsequently, the server 1 adds the traveling duration, the short visiting duration at D Hospital, and the short visiting duration at E Pharmacy to the current time to calculate the expected arrival time (short). In addition, the server 1 may add the traveling duration, the long visiting duration at D Hospital, and the long visiting duration at E Pharmacy to the current time to calculate the expected arrival time (long).

In the above manner, according to this embodiment, if the user stops by a location from the current location, the expected arrival times of the user at the destination may be calculated accurately by taking into account the location to stop by. In addition, if the scheduled delivery time of the package is between the arrival times, the message regarding delivery is presented to the user. Thus, it is possible to appropriately put pressure on the user who stops by such a location to encourage them to return to the destination, and redelivery may be prevented effectively.

Twenty-Third Embodiment

In a twenty-third embodiment, it is determined whether the user is a borderline customer by taking into account, in addition to visiting durations at the current location, a period of an expected delivery time at which the package is to be delivered.

Figure 58:
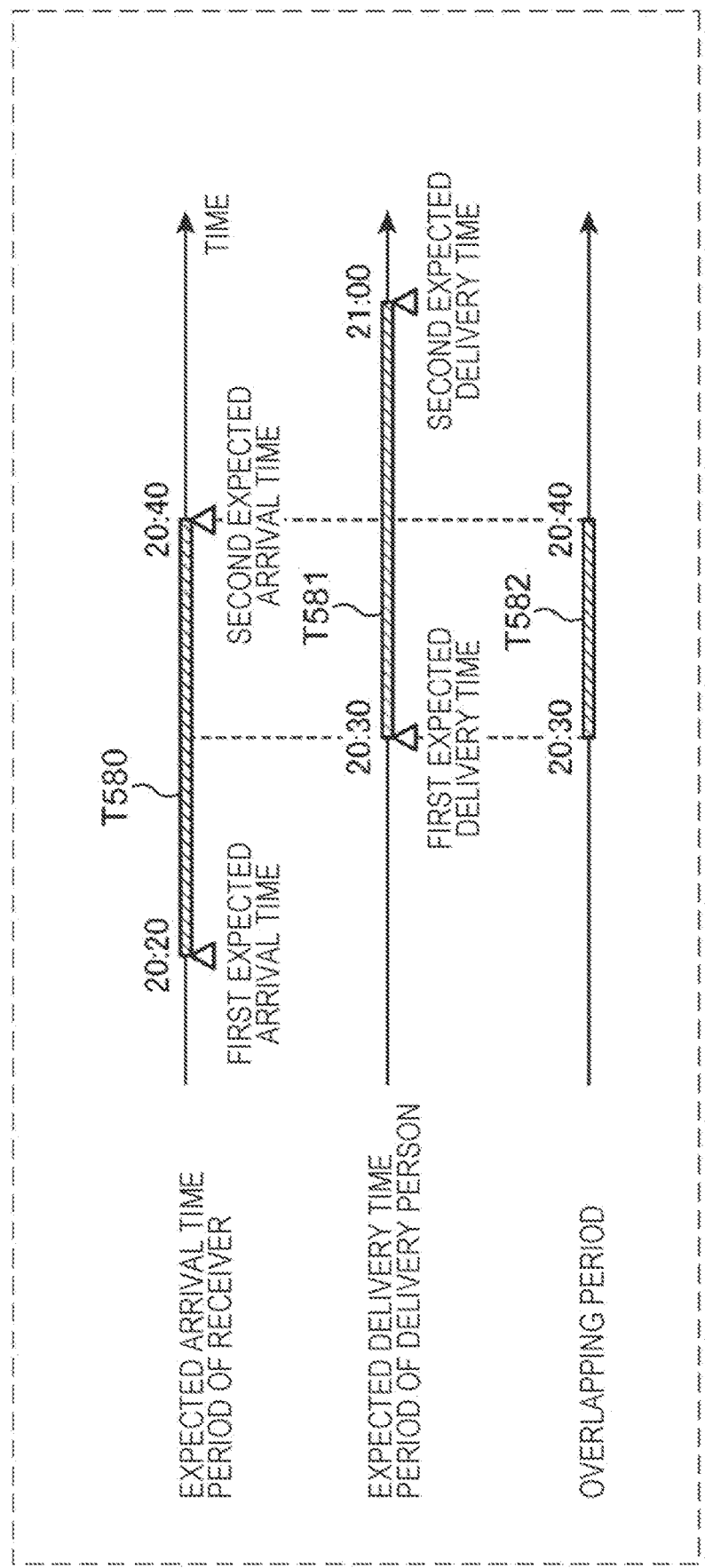
FIG. 58 illustrates an expected arrival time period of a user who is a receiver and an expected delivery time period of a delivery person.

FIG. 58 illustrates an expected arrival time period T580 of a user who is a receiver and an expected delivery time period T581 of a delivery person. The expected arrival time period T580 represents a duration from the first expected arrival time to the second expected arrival time. In this example, the first expected arrival time and the second expected arrival time are, respectively, the expected arrival time (short) and the expected arrival time (long) illustrated in the seventeenth embodiment. In this example, the first expected arrival time is 20:20, and the second expected arrival time is 20:40. Thus, 20 minutes between the two expected arrival times is the expected arrival time period T580.

The expected delivery time period T581 represents a duration from a first expected delivery time obtained if the traveling duration of the delivery person to the destination is estimated to be the shortest to a second expected delivery time obtained if the traveling duration of the delivery person to the destination is estimated to be the longest. The first expected delivery time is, for example, an expected delivery time obtained on the assumption that there is no traffic congestion. The second expected delivery time is, for example, an expected delivery time obtained on the assumption that there is a traffic congestion. In this example, the first expected delivery time is 20:30, and the second expected delivery time is 21:00. Thus, 30 minutes between the two expected delivery times is the expected delivery time period T581.

In this example, the expected arrival time period T580 and the expected delivery time period T581 include an overlapping period T582 from 20:30 to 20:40. In this manner, in this embodiment, if the overlapping period T582 is present, the user who is the receiver is determined as a borderline customer. That is, if at least one of the first expected delivery time and the second expected delivery time is within the expected arrival time period T580, a corresponding user is able to receive a package depending on the leaving time from the current location, and thus is determined as a borderline customer.

FIG. 59 is a flowchart illustrating an example of a process in an information providing system according to the twenty-third embodiment. This flow starts when, for example, the user arrives at the first current location. In S5901, the communication section 15 acquires the first current location and the first time, transmitted from the user terminal 2, the second current location and the second time, transmitted from the delivery person terminal 3, and traffic information transmitted from an external server. The first current location is the location at which the user has arrived. The first time is the detection time of the first current location. The second current location is the current location of a delivery person. The second time is the detection time of the second current location. The traffic information is, for example, Vehicle Information and Communication System (VICS) (registered trademark) information.

In S5902, the control section 19 acquires the type database DB460 and the destination database DB42 from the memory 11. In S5903, the visiting duration determination section 16 determines visiting durations of a corresponding user at the first current location by referring to the type database DB460.

In S5904, the traveling duration calculating section 12 calculates the first traveling duration that is necessary for the user to travel from the first current location to the destination. Details of the calculation of the first traveling duration are the same as those in S4 in FIG. 8.

In S5905, the first expected arrival time and the second expected arrival time of the user who is a receiver at the destination are calculated. Details of the calculation of the first expected arrival time and the second expected arrival time are the same as those in S4705 in FIG. 47. In S5906, the traveling duration calculating section 12 calculates the second traveling duration and the third traveling duration of the delivery person from the current location to the destination. The second traveling duration is, for example, a traveling duration calculated on the assumption that there is no traffic congestion from the second current location to the destination, and the third traveling duration is, for example, a traveling duration calculated on the assumption that there is a traffic congestion from the second current location to the destination.

However, this is an example, and the second traveling duration may be, for example, the shortest traveling duration of traveling durations from the second current location to the destination calculated by navigation systems. In addition, the third traveling duration may be, for example, the longest traveling duration of traveling durations from the second current location to the destination calculated by navigation systems. The navigation systems may be included in the server 1 or may be included in external servers.

In S5907, the expected arrival time calculating section 17 calculates the first expected delivery time and the second expected delivery time at which the delivery person will arrive at the destination. In this example, the first expected delivery time is calculated by, for example, adding the second traveling duration to the second time, and the second expected delivery time is calculated by, for example, adding the third traveling duration to the second time.

In S5908, the message selecting section 18 determines whether the first expected delivery time or the second expected delivery time is between the first expected arrival time and the second expected arrival time. That is, it is determined whether the overlapping period T582 illustrated in FIG. 58 is present. If the overlapping period T582 is present (YES in S5908), the message selecting section 18 determines that a corresponding user is a borderline customer and transmits a message. In this case, the message selecting section 18 transmits a message requesting a reply indicating whether reception is possible, stored on the second row in the customer message database DB51. On the other hand, if the overlapping period T582 is not present (NO in S5908), the message selecting section 18 does not transmit a message, and the process ends.

Although a message is not transmitted if NO is determined in S5908 in the above description, the present disclosure is not limited to this. For example, if the first expected arrival time is after the second expected delivery time, since the user is unlikely to be at home, the message selecting section 18 may transmit a message for a user who is unlikely to be at home, stored on the third row in the customer message database DB51. On the other hand, if the second expected arrival time is before the first expected delivery time, since the user is likely to be at home, the message selecting section 18 may transmit a message for a user who is likely to be at home, stored on the first row in the customer message database DB51.

In the above manner, according to this embodiment, even in a case where the expected delivery time of the package to the destination fluctuates due to a traffic congestion or the like, it is possible to accurately determine whether the user is a borderline customer, and it is possible to appropriately put pressure on the user who is determined as a borderline customer to encourage them to return to the destination, and redelivery of the package may be prevented. The present disclosure is useful in preventing redelivery effectively.

What is claimed is:

1. A method performed by a computer, the method comprising:
    acquiring a first current location of a user and a first time at which the first current location is detected;
    acquiring a destination of a package addressed to the user, a visiting duration corresponding to the first current location, and a first scheduled delivery time;
    acquiring a traveling route that indicates a route of the user from the first current location to the destination;
    acquiring a traveling history of the user including a location of the user and a time at which the location is detected, wherein the traveling route is decided on the basis of the traveling history;
    calculating, on the basis of the traveling route, a first traveling duration that is necessary for the user to travel from the first current location to the destination;
    calculating, on the basis of the first time, the visiting duration corresponding to the first current location, and the first traveling duration, a first expected arrival time of the user at the destination;
    calculating, on the basis of the first scheduled delivery time and the first expected arrival time, a first difference, the first difference being a difference between the first expected arrival time and the first scheduled delivery time; and
    causing a first information terminal of the user to display a first message based on the first difference.

2. The method according to claim 1, further comprising:
    determining whether the first difference is less than or equal to a first threshold, wherein, when the first difference is less than or equal to the first threshold, the first message is a message regarding reception of the package.

3. The method according to claim 1, further comprising:
    acquiring, on the basis of the traveling route, a first location and a visiting duration corresponding to the first location, the first location being a location which the user may visit during the travel from the first current location to the destination,
    the first expected arrival time is calculated on the basis of the visiting duration corresponding to the first location.

* * * * *

UNITED STATES PATENT AND TRADEMARK OFFICE
CERTIFICATE OF CORRECTION

PATENT NO. : 12,101,694 B2
APPLICATION NO. : 18/233998
DATED : September 24, 2024
INVENTOR(S) : Yuri Nishikawa Page 1 of 1

It is certified that error appears in the above-identified patent and that said Letters Patent is hereby corrected as shown below:

On the Title Page

Item (73) Assignee, Please change "Panasonic Corporation" to --Panasonic Holdings Corporation--.

Signed and Sealed this
First Day of April, 2025

Coke Morgan Stewart
*Acting Director of the United States Patent and Trademark Office*